(12) United States Patent
Suzuki

(10) Patent No.: US 6,725,236 B2
(45) Date of Patent: Apr. 20, 2004

(54) PICTURE DATA PROCESS SYSTEM FOR CONTROLLING DISPLAY OF PICTURE DATA

(75) Inventor: Motoyoshi Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 09/739,842

(22) Filed: Dec. 20, 2000

(65) Prior Publication Data

US 2001/0016847 A1 Aug. 23, 2001

(30) Foreign Application Priority Data

Feb. 18, 2000 (JP) ........................................ 2000-042065

(51) Int. Cl.[7] ............................................... G06E 17/30
(52) U.S. Cl. ........................ 707/104.1; 473/409; 707/10
(58) Field of Search .................... 707/104.1, 1; 345/420, 345/428; 283/67; 348/169; 715/541; 473/409; 463/31

(56) References Cited

U.S. PATENT DOCUMENTS

| | | | | |
|---|---|---|---|---|
| 5,923,365 A | * | 7/1999 | Tamir et al. | 348/169 |
| 6,041,053 A | * | 3/2000 | Douceur et al. | 370/389 |
| 6,052,492 A | * | 4/2000 | Bruckhaus | 382/284 |
| 6,082,774 A | * | 7/2000 | Schlauch | 283/67 |
| 6,088,036 A | * | 7/2000 | Morris | 345/428 |

OTHER PUBLICATIONS

European Patent Application (EP10854702) date of publication Mar. 21, 2000 by Sony Computer Entertainment by Katsuyuki Kanetaka et al. (pp. 1–19).*

Abstract—Republic of China (ROC) Patent Application No. 85112595, Publication No. 338872, Publication Date Aug. 21, 1998.

Summary of the Invention—Republic of China (ROC) Patent Application No. 84112558, Publication No. 362209, Publication Date Jun. 21, 1999.

Claims—Republic of China (ROC) Patent Application No. 85104458, Publication no. 316962, Publication Date Oct. 1, 1997.

First Office Action in counterpart patent application of the above–referenced patent application, Taiwanese Patent Office, Date of receipt July 25, 2002.

Taiwanese Office Action in the counter part Taiwanese patent application No. 89127550, Date of Receipt Dec. 8, 2003, including an English translation.

Microsoft, A display screen printout of Microsoft Access database, 1999, 1 page (Attachment 5 of the Dec. 8, 2003 counterpart Taiwanese Office Action).

Gary W. Hansen, et al., *Database Management and Design*, 1992, pp. 178–179 (Attachment 4 of the Dec. 8, 2003 counterpart Taiwanese Office Action).

* cited by examiner

*Primary Examiner*—Diane D. Mizrahi
(74) *Attorney, Agent, or Firm*—Staas & Halsey LLP

(57) ABSTRACT

Picture data segmented in time series for each of the desired scenes (in a delivery unit in a baseball game, for example) of a subject is associated with corresponding retrieval data, and stored as a picture database. Desired picture data is extracted from the picture database, and is stored in CR-ROM. Then, the data is distributed and allowed to be viewed, or is viewed through a network. Especially a score information database is generated in advance, an analysis listing automatically generated based on the database is displayed, and attribute information edited and displayed in graphics is added to each delivery in the listing so that the analysis listing can be associated with the picture data. Thus, a desired picture can be easily viewed only by specifying a desired delivery by referring to the attribute information displayed in graphics and added.

9 Claims, 56 Drawing Sheets

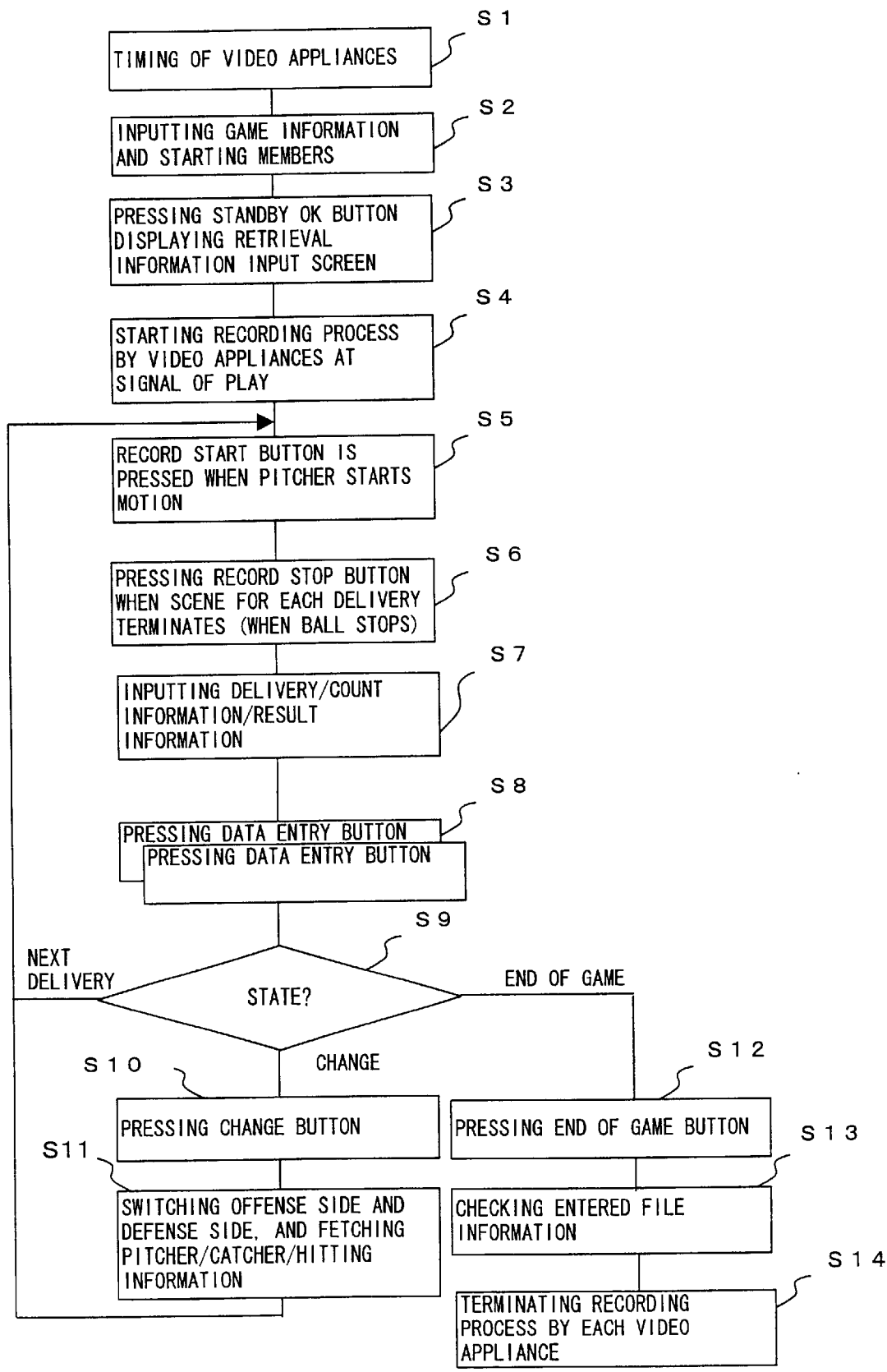
F I G. 4

FIG. 5

DATE OF GAME [2000] YEAR [4] MONTH [15] DAY SUNDAY [18] : [00] START
NAME OF BALL PARK [OO]
GAME OFFENCE IN FIRST HALF [OO]  NAME OF CHIEF REFEREE [OO]
DEFFENCE IN SECOND HALF [OO]  [2] ORDINAL NUMBER OF GAME  [30] TOTAL NUMBER OF GAMES

OFFENCE IN FIRST HALF

| BATTING ORDER | PLAYER NUMBER | NAME OF PLAYER |
|---|---|---|
| 1 | 7 | OO |
| 2 | 8 | OO |
| 3 | 24 | OO |
| 4 | 55 | OO |
| 5 | 6 | OO |
| 6 | 5 | OO |
| 7 | 35 | OO |
| 8 | 9 | OOO |
| 9 | 11 | OO |

OFFENCE IN SECOND HALF

| BATTING ORDER | PLAYER NUMBER | NAME OF PLAYER |
|---|---|---|
| 1 | 2 | OO |
| 2 | 4 | OO |
| 3 | 8 | OO |
| 4 | 23 | OOO |
| 5 | 9 | OO |
| 6 | 7 | OO |
| 7 | 41 | OO |
| 8 | 45 | OO |
| 9 | 11 | OO |

[NEWLY GENERATE] [OPEN] [OPEN FROM LIST] [STORE] [END] [STANDBY OK]

3:32

| Key | ITEM NAME | ITEM ID | DATA LENGTH (Max) | REMARKS |
|---|---|---|---|---|
| * | SEQUENCE NUMBER | | 4 | SEQUENCE NUMBER OF INFORMATION ENTRY IN GAME |
| * | DRD SEQUENCE NUMBER | | 4 | SEQUENCE NUMBER ENTERED IN DRD |
| * | SKIP SECTION | | 1 | 0: NONE  1: SKIP |
| * | RECORD START TIME | | 6 | HHMMSS |
| * | RECORD END TIME | | 6 | HHMMSS |
| | DATE OF GAME | | 8 | YYYYMMDD |
| | NAME OF BALL PARK | | 20 | NAME OF BALL PARK |
| | NAME OF TEAM OF USER | | 12 | ABBREVIATED NAME OF TERM OF USER |
| | NAME OF OPPOSING TEAM | | 12 | ABBREVIATED NAME OF OPPOSING TEAM |
| | ORDINAL NUMBER OF GAME | | 2 | TOTAL NUMBER OF GAMES |
| | STATE OF TEAM OF USER | | 1 | STATE OF TEAM OF USER  OFFENSE IN FIRST OR SECOND HALF |
| | | | | 0: FIRST  1: SECOND |
| | INNING | | 2 | NUMBER OF INNINGS |
| | OFFENSE/DEFENSE | | 1 | STATE OF TEAM OF USER  0: OFFENSE  1: DEFENSE |
| | PLAYER NUMBER OF PITCHER | | 3 | PLAYER NUMBER OF PITCHER |
| | NAME OF PITCHER | | 12 | FORMAL NAME OF PITCHER |
| | TYPE OF PITCHER | | 2 | TYPE OF PITCHER |
| | | | | 01: RIGHT-HANDED  10: LEFT-HANDED |
| | TOTAL NUMBER OF DELIVERIES | | 3 | NUMBER OF TOTAL DELIVERIES |
| | PLAYER NUMBER OF CATCHER | | 3 | PLAYER NUMBER OF CATCHER |
| | NAME OF CATCHER | | 12 | FORMAL NAME OF CATCHER |
| | PLAYER NUMBER OF BATTER | | 3 | PLAYER NUMBER OF BATTER |
| | NAME OF BATTER | | 12 | FORMAL NAME OF BATTER |
| | TYPE OF BATTER | | 2 | TYPE OF BATTER |
| | | | | 01: RIGHT-HANDED  10: LEFT-HANDED |
| | NAME OF REFEREE | | 12 | NAMES OF REFEREES |
| | NUMBER OF TIMES AT BAT | | 2 | NUMBER OF TIMES AT BAT |
| | NUMBER OF DELIVERY TO BATTER | | 2 | NUMBER OF DELIVERIES AT BAT |
| | COUNT (STRIKE) | | 1 | STRIKE COUNT |
| | COUNT (BALL) | | 1 | BALL COUNT |
| | RUNNER STATE  FIRST BASE | | 1 | STATE OF FIRST RUNNER  0: NO RUNNERS  1: RUNNER EXISTING |
| | RUNNER STATE  SECOND BASE | | 1 | STATE OF SECOND RUNNER  0: NO RUNNERS  1: RUNNER EXISTING |
| | RUNNER STATE  THIRD BASE | | 1 | STATE OF THIRD RUNNER  0: NO RUNNERS  1: RUNNER EXISTING |
| | OUT COUNT | | 1 | OUT COUNT  0: NO OUT  1: 1 OUT  2: 2 OUTS |
| | SCORE (TEAM OF USER) | | 2 | SCORE OF TEAM OF USER |
| | SCORE (OPPOSING TEAM) | | 2 | SCORE OF OPPOSING TEAM |
| | DELIVERY | | 2 | TYPE OF DELIVERY |
| | | | | 01: STRAIGHT  02: SHOOT  03: CURVE  04: SLIDER |
| | | | | 05: FORK  06: SINKER  07: PALM  08: KNUCKLE |
| | | | | 09: CHANGE-UP  10: OTHERS  11: CHECKING |
| | COUNT INFORMATION | | 2 | INFORMATION FOR COUNTING (INITIAL VALUE: 00) |
| | | | | 01: MISSING S  02: MISSING B  03: SWING SIDE  04: FOUL |
| | RESULT INFORMATION | | 2 | |
| | | | | 01: HIT  02: GROUNDER OR FLY  03: STRIKE-OUT WITH SWING SIDE |
| | | | | 04: STRIKE-OUT WITH MISSING  05: HR  06: FOR BALLS |
| | | | | 07: DEAD BALL  08: SACRIFICE FLY  09: SACRIFICE HIT |
| | TYPE OF PICTURE | | 2 | TYPE OF PICTURE FILE  01: DRD PICTURE  02: TV BROADCAST |
| | NAME OF PICTURE FILE | | 100 | PICTURE FILE NAME |

※ INDICATES ABSOLUTE TIME OF RECORD START TIME/RECORD END TIME

FIG. 7

○○×××× CD-R GENERATION PROGRAM

RETRIEVAL YEAR　[FISCAL YEAR 1999 ▼]

IMAGE GENERATION FOR　[SETTING BY DEFAULT ▼]

[DECIDE]

RETRIEVAL CONDITION

PERIOD : 1999/12/21 ~ 2000/03/21
GAME : ○○ vs ××
△△

| REPLAY | CONTINUOUS REPLAY | | | | CLEAR | RE-RETRIEVAL |
|---|---|---|---|---|---|---|

| 5 | 1999/12/21 | T | 1 TIME AT BAT / 1 DELIVERY | PLAYER A | CURVE | 1-0 |
| 5 | 1999/12/21 | T | 1 TIME AT BAT / 2 DELIVERY | PLAYER A | CURVE | 2-0 |
| 5 | 1999/12/21 | T | 1 TIME AT BAT / 3 DELIVERY | PLAYER A | SHOOT | 2-1 |
| 5 | 1999/12/21 | T | 2 TIME AT BAT / 1 DELIVERY | PLAYER A | STRAIGHT | 1-0 |
| 5 | 1999/12/24 | T | 2 TIME AT BAT / 2 DELIVERY | PLAYER A | CURVE | 1-2 |
| 5 | 1999/12/25 | T | 2 TIME AT BAT / 3 DELIVERY | PLAYER A | CURVE | 1-3 |
| 5 | 1999/12/26 | T | 4 TIME AT BAT / 1 DELIVERY | PLAYER A | CURVE | 2-3 |
| 5 | 1999/12/31 | T | 4 TIME AT BAT / 2 DELIVERY | PLAYER A | CURVE | 1-0 |
| 5 | 1999/12/21 | T | 1 TIME AT BAT / 1 DELIVERY | PLAYER A | CURVE | 1-0 |
| 5 | 1999/12/21 | T | 1 TIME AT BAT / 2 DELIVERY | PLAYER A | CURVE | 2-0 |
| 5 | 1999/12/21 | T | 1 TIME AT BAT / 3 DELIVERY | PLAYER A | SHOOT | 2-1 |
| 5 | 1999/12/21 | T | 2 TIME AT BAT / 1 DELIVERY | PLAYER A | STRAIGHT | 1-0 |
| 5 | 1999/12/24 | T | 2 TIME AT BAT / 2 DELIVERY | PLAYER A | CURVE | 1-2 |
| 5 | 1999/12/25 | T | 2 TIME AT BAT / 3 DELIVERY | PLAYER A | CURVE | 1-3 |
| 5 | 1999/12/26 | T | 4 TIME AT BAT / 1 DELIVERY | PLAYER A | CURVE | 2-3 |
| 5 | 1999/12/31 | T | 4 TIME AT BAT / 2 DELIVERY | PLAYER A | CURVE | 1-0 |
| 5 | 1999/12/21 | G | 4 TIME AT BAT / 3 DELIVERY | PLAYER A | CURVE | 2-0 |
| 5 | 1999/12/21 | G | 1 TIME AT BAT / 1 DELIVERY | PLAYER B | CURVE | 2-2 |
| 5 | 1999/12/22 | G | 1 TIME AT BAT / 2 DELIVERY | PLAYER B | CURVE | 1-2 |
| 5 | 1999/12/23 | G | 1 TIME AT BAT / 3 DELIVERY | PLAYER B | CURVE | 2-0 |
| 5 | 1999/12/24 | G | 1 TIME AT BAT / 4 DELIVERY | PLAYER B | CURVE | 1-2 |

| ITEM NAME | ITEM ID | DATA LENGTH(Max) | REMARKS |
|---|---|---|---|
| DATE OF GAME | | 8 | YYYYMMDD |
| OFFENCE IN FIRST HALF INNING | | 2 | TYPE OF TEAM OFFENSE IN FIRST HALF INNING |
| OFFENCE IN SECOND HALF INNING | | 2 | TYPE OF TEAM OFFENSE IN SECOND HALF INNING |
| TOTAL NUMBER OF GAMES | | 2 | NUMBER OF GAMES |
| ORDINAL NUMBER OF GAME | | 3 | ORDINAL NUMBER OF GAMES |
| TYPE OF GAME | | 1 | D:DAY GAME N:NIGHT GAMES |
| INNING | | 2 | NUMBER OF INNING |
| BATTING ORDER | | 2 | BATTING ORDER |
| TIMES AT BAT | | 2 | TIMES AT BAT |
| PLAYER MANAGEMENT NUMBER | | 5 | PLAYER MANAGEMENT ID (BATTER) |
| NAME OF PLAYER (BATTER) | | 12 | NAME OF PLAYER (BATTER) |
| DEFENSE POSITION | | 1 | 1: 2: 3: 4: 5: 6: 7: 8: 9: 0: |
| BATTING TYPE | | 2 | 01:RIGHT 10:LEFT 11:BOTH |
| TYPE OF BATTER | | 2 | 10:POWER 20:HIT 30:TECHNICAL |
| NUMBER OF DELIVERIES | | 2 | |
| DELIVERIES | | 2 | 00:DELIVERY **:SERIAL NUMBER OF CHECKS |
| DELIVERY | | 2 | SAME AS DELIVERY OF IMAGE SIDE |
| RESULT | | 2 | SAME AS COUNT INFORMATION AND RESULT INFORMATION ON IMAGE SIDE |
| STRATEGY | | 2 | STRATEGY INFORMATION FOR DELIVERY 10: 11: 20: 21: 22: 30: 31: 32: 40: 41: 50: 51: 52: 60: 70: 90: 00: |
| WILD PITCH | | 2 | DIRECTION OF WILD PITCH(00: 10: 20: 30: 40: ) |
| THROW 1 | | 2 | DEFENSE POSITION + OPERATION |
| THROW 2 | | 2 | DEFENSE POSITION + OPERATION |
| B MISSING | | 2 | 02:WP 03:BK 04:PB 00:OTHERS |
| MIS-DETERMINATION | | 2 | 00:NONE 01:BALL 02:STRIKE |
| X COORDINATE OF DELIVERY | | 8 | |
| Y COORDINATE OF DELIVERY | | 8 | |
| DETERMINATION | | 2 | 01:STRIKE 02:BALL |
| COUNT | | 2 | 01:SCORING 02:NO SCORING 03:OTHERS |
| PLAYER MANAGEMENT ID | | 5 | PITCHER |
| PLAYER NAME | | 12 | PITCHER |
| TYPE OF PITCHING | | 2 | |
| TYPE OF PITCHER | | 2 | |
| PLAYER MANAGEMENT ID | | 5 | CATCHER |
| PLAYER NAME | | 12 | CATCHER |

FIG. 24

| KEY | ITEM NAME | ITEM ID | DATA LENGTH(MAX) | REMARKS |
|---|---|---|---|---|
| | DATE OF GAME | | 8 | YYYYMMDD |
| | TYPE OF TEAM OFFENSE FIRST HALF INNING | | 2 | TYPE OF TEAM OFFENSE IN FIRST HALF INNING |
| | TYPE OF TEAM OFFENSE SECOND HALF INNING | | 2 | TYPE OF TEAM OFFENSE IN SECOND HALF INNING |
| | TOTAL NUMBER OF GAMES | | 2 | NUMBER OF GAMES |
| | ORDINAL NUMBER OF GAMES | | 3 | ORDINAL NUMBER OF GAME |
| | TYPE OF GAMES | | 1 | D:DAY GAME  N:NIGHT GAME |
| | INNING | | 2 | NUMBER OF INNINGS |
| | BATTING ORDER | | 2 | BATTING ORDER |
| | TIMES AT BAT | | 2 | TIMES AT BAT |
| | PLAYER MANAGEMENT NUMBER | | 5 | PLAYER MANAGEMENT NUMBER (BATTER) |
| | NAME OF PLAYER (BATTER) | | 12 | NAME OF PLAYER (BATTER) |
| | DEFENSE POSITION | | 1 | 1:  2:  3:  4:  5:  6:  7:<br>8:  9:  0: |
| | TYPE OF BATTING | | 2 | 01:RIGHT  10:LEFT  11:BOTH |
| | TYPE OF BATTER | | 2 | 10:POWER 20:HIT 30:TECHNICAL |
| | FIRST HITTING HITTING RESULT | | 2 | 10:GROUNDER 20:FLY21:HALF FLY22:FOUL FLY30:LINER31:HALF LINER40:OVER |
| | FIRST HITTING X COORDINATE | | 8 | X COORDINATE OF FIRST HITTING BALL |
| | FIRST HITTING Y COORDINATE | | 8 | Y COORDINATE OF FIRST HITTING BALL |
| | SECOND HITTING HITTING RESULT | | 2 | 10:CROUNDER20:FLY21:HALF FLY22:FOUL FLY30:LINER31:HALF LINER40:OVER |
| | SECOND HITTING X COORDINATE | | 8 | X COORDINATE OF SECOND HITTING BALL |
| | SECOND HITTING Y COORDINATE | | 8 | Y COORDINATE OF SECOND HITTING BALL |
| | THIRD HITTING HITTING RESULT | | 2 | 10:GROUNDER20:FLY21:HALF FLY22:FOUL FLY30:LINER31:HALF LINER40:OVER |
| | THIRD HITTING X COORDINATE | | 8 | X COORDINATE OF THIRD HITTING BALL |
| | THIRD HITTING Y COORDINATE | | 8 | Y COORDINATE OF THIRD HITTING BALL |
| | STRENGTH OF HIT BALL | | 2 | 01:WEAK 02:NORMAL 03:STRONG |

FIG. 25

| ITEM NAME | ITEM ID | DATA LENGTH(MAX) | REMARKS |
|---|---|---|---|
| DATE OF GAME | | 8 | YYYYMMDD |
| TYPE OF TEAM OFFENSE IN FIRST HALF INNING | | 2 | |
| TYPE OF TEAM OFFENSE IN SECOND HALF INNING | | 2 | TYPE OF TEAM OFFENSE IN FIRST HALF INNING |
| TOTAL NUMBER OF GAMES | | 2 | TYPE OF TEAM OFFENSE IN SECOND HALF INNING |
| ORDINAL NUMBER OF GAME | | 3 | TOTAL NUMBER OF GAMES |
| TYPE OF GAME | | 1 | D:DAY GAME  N : NIGHT GAME |
| INNING | | 2 | NUMBER OF INNINGS |
| BATTING ORDER | | 2 | BATTING ORDER |
| TIMES AT BAT | | 2 | TIMES AT BAT |
| PLAYER MANAGEMENT NUMBER | | 5 | PLAYER MANAGEMENT NUMBER (BATTER) |
| NAME OF PLAYER (BATTER) | | 12 | PLAYER NAME (BATTER) |
| DEFENSE POSITION | | 1 | 1:  2:  3:  4:  5:  6:  7:<br>8:  9:  0: |
| TYPE OF BATTING | | 2 | 01:RIGHT  10:LEFT  11:BOTH |
| TYPE OF BATTER | | 2 | 10:POWER 20:HIT 30:TECHNICAL |
| IMPORTANT POINT | | 1 | 0:NONE  1:IMPORTANT |
| BATTING RESULT | | 2 | 00:  01:  02:  03:  04:  05:  10:<br>11:  12:  20:  21:  22:  30:  31:<br>40:  50:  60:  61:  90: |
| BATTING RESULT | | 2 | 1:  2:  3:  4:  5:  6:  7:  8:  9:<br>34:  46:  56:  76:  89: |
| HITTING DIRECTION | | 2 | 00:  10:  20:  30:  40: |
| TIMING | | 2 | :  A:  AB:  B:  BC:  C: |
| NUMBER OF PIECES OF THROW INFORMATION | | 4 | |
| THROW*5 | | | |
|   THROW WILD THROW | | 2 | WILD PITCHING DIRECTION(00: 10: 20: 30: 40: ) |
|   THROW THROW | | 2 | DEFENSE POSITION + OPERATION |
| THROW RESULT | | 2 | DP:DOUBLE TP:TRIPLE ID:INTERFERENCE WITH DEFENSE |
| FINAL RESULT | | 2 | 00: 01: 02: 03: 04: 05: |
| SCORING HIT | | 4 | |
| SCORING | | 2 | 01:SCORING 02:NO SCORING 03:OTHERS |
| ADVANCE TO NEXT BASE | | 2 | 01:ADVANCE TO NEXT BASE 02:NO ADVANCE 03:OTHERS |
| NUMBER OF PIECES OF BASE INFORMATION | | 4 | |
| BASE INFORAMTION*4 | | | |
|   BASE INFORMATION BASE | | 1 | |
|   BASE INFORMATION BATTING ORDER | | 1 | |
|   BASE INFORMATION RESULT | | 2 | 00:  01:  02:  03:  04:  05:  06:  90: |
|   BASE INFORMATION COUNT | | 2 | |
|   BASE INFORMATION WILD PITCH | | 2 | WILD PITCHING DIRECTION(00: 10: 20: 30: 40: ) |
|   BASE INFORMATION THROW 1 | | 2 | DEFENSE POSITION + OPERATION |
|   BASE INFORMATION THROW 2 | | 2 | DEFENSE POSITION + OPERATION |
|   BASE INFORMATION PLAYER ID | | 3 | PINCH-RUNNER |
|   BASE INFORMATION PLAYER NAME | | 12 | PINCH-RUNNER |
| NUMBER OF PIECES OF BATTING INFORMATION | | 4 | |
| BASE INFORMATION*10 | | | |
|   BASE INFORMATION SCORE OF TEAM OF USER | | 2 | |
|   BASE INFORMATION SCORE OF OPPOSING TEAM | | 2 | |
|   BASE INFORMATION OUT | | 1 | OUT COUNT |
|   BASE INFORMATION RUNNER | | 3 | RUNNER POSITION |
|   BASE INFORMATION COUNT | | 2 | COUNT |
| NUMBER OF PIECES OF STRATEGY INFORMATION | | 4 | |
| STRATEGY INFORMATION*10 | | | |
|   STRATEGY INFORMATION STRATEGY | | 2 | |
|   STRATEGY INFORMATION RESULT | | 2 | |
|   STRATEGY INFORMATION COUNT | | 2 | |
| NUMBER OF PIECES OF REPLACEMENT INFORMATION | | 4 | |
| REPLACEMENT INFORMATION*5 | | | |
|   REPLACEMENT INFORMATION DEFENSE POSITION | | 1 | |
|   REPLACEMENT INFORMATION PLAYER ID | | 5 | |
|   REPLACEMENT INFORMATION PLAYER NAME | | 12 | |
|   REPLACEMENT INFORMATION DEFENSE POSITION | | 1 | |
|   REPLACEMENT INFORMATION PLAYER ID | | 5 | |
|   REPLACEMENT INFORMATION PLAYER NAME | | 12 | |

F I G.  2 6

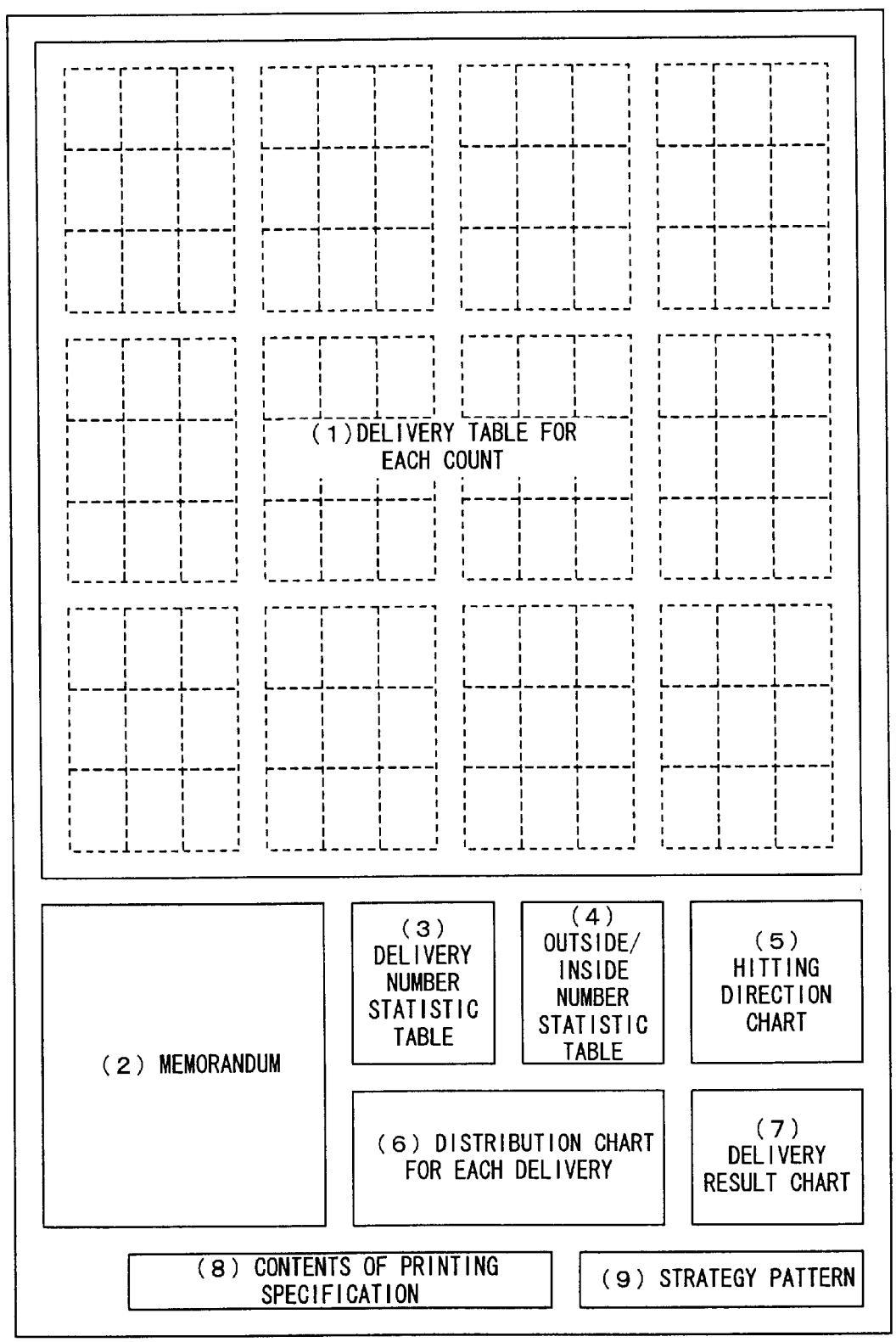
F I G. 30

| NAME | SYMBOL | REMARKS |
|---|---|---|
| SWING WIDE | —⊖— | |
| FOUL | — | |

FIG. 32

| DELIVERY | SYMBOL | COLOR OF DELIVERY | | | |
|---|---|---|---|---|---|
| | | NORMAL | HIT | GROUNDER OR FLY | WITH RUNNER(S) |
| STRAIGHT | ○ | GREEN | RED | BLUE | FULLY PAINTED IN DELIVERY COLOR |
| SHOOT | ◹ | PURPLE | | | |
| CURVE | ▭ | PALE BLUE | | | |
| SLIDER | ◺ | PINK | | | |
| FORK | ▽ | ORANGE | | | |
| SINKER | ○ | YELLOW | | | |
| PALM | ▱ | | | | |
| KNUCKLE | ◇ | | | | |
| CHANGE-UP | △ | | | | |
| SF | ⬭ | | | | |

FIG. 33

|  | GROUNDER | FLY | LINER | ENTITLED HIT | IRREGULAR HIT |
|---|---|---|---|---|---|
| STRONG | − − − | ∼∼∼∼ |  | − ⌒ |  |
| MEDIUM | ·········· | ∼∼ | — | ⌒ | ··· ···· ⌒ |
| WEAK | ········ | ∼ |  |  |  |

FIG. 35

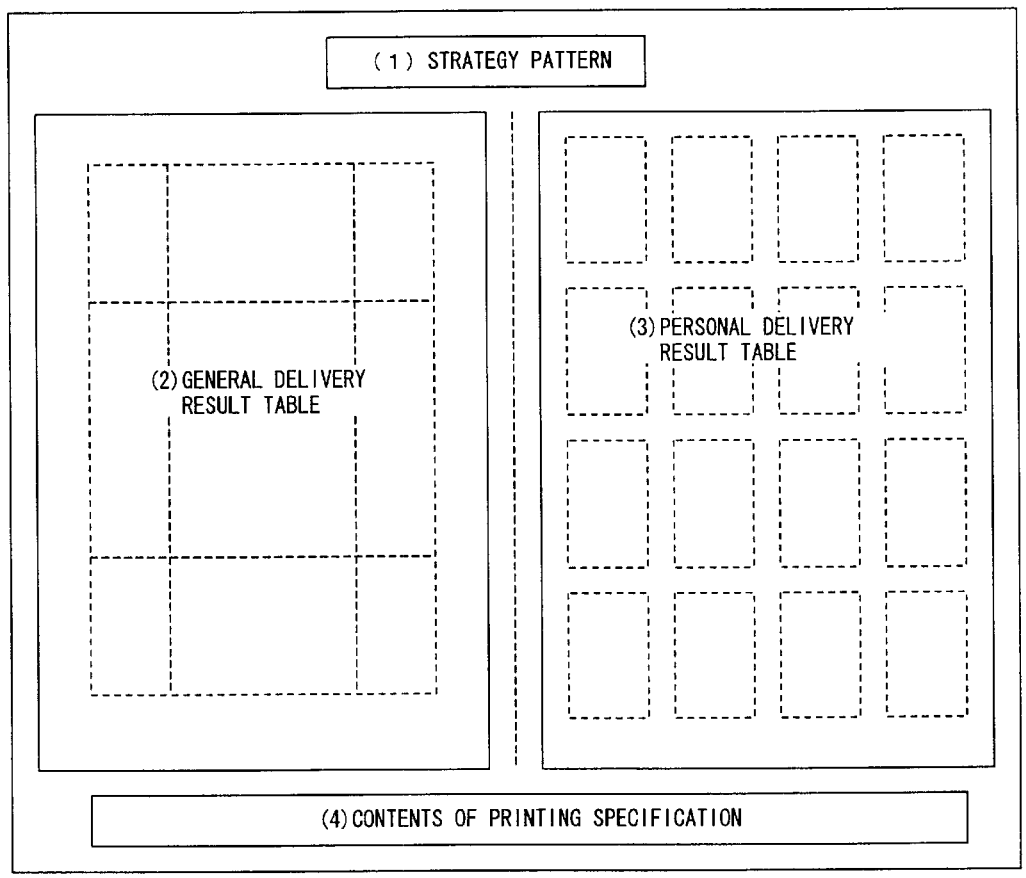
F I G. 4 3

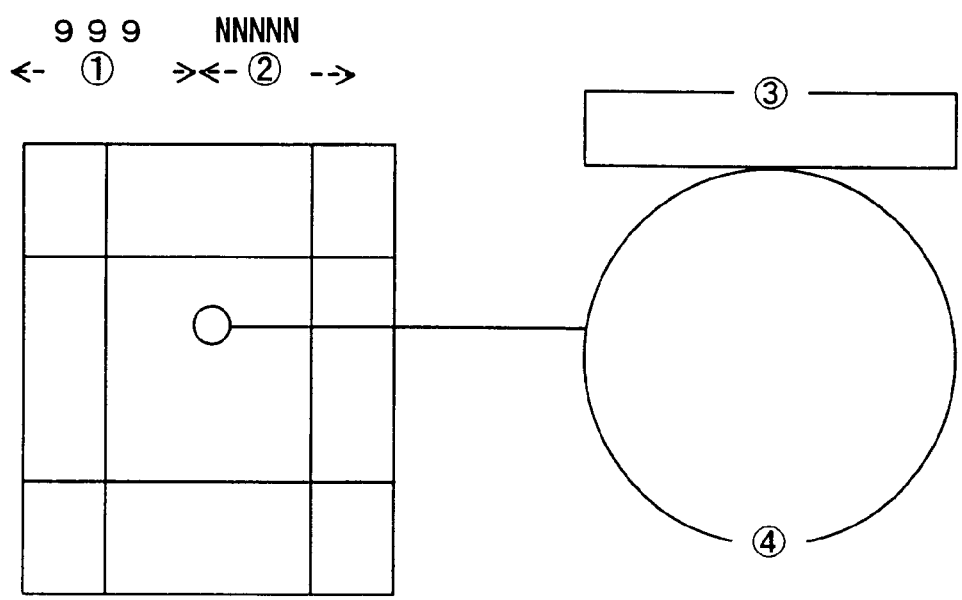
F I G. 4 5

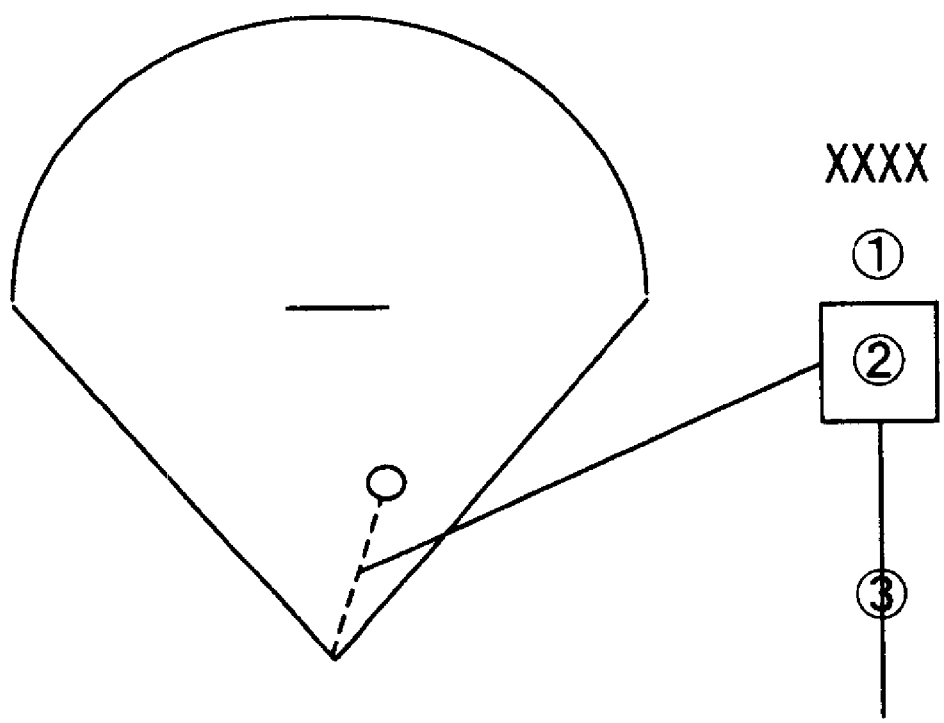
F I G. 5 0

| NAME OF STRATEGY | SIGNAL | REMARKS |
|---|---|---|
| BASE STEALING AND HIT | SH | |
| BASE STEALING | S | WITH ACTION |
| BASE STEALING | R | WITHOUT ACTION |
| BUNT | B | |
| SAFETY BUNT | SB | |
| BUSTER | BS | |
| SQUEEZE | SP | |
| PSEUDO-SQUEEZE | DSP | |
| SAFETY SQUEEZE | SSP | |
| HIT AND RUN | HR | |
| BUSTER HIT AND RUN | BSHR | |
| RUN AND HIT | RH | |
| BUNT AND RUN | BR | |
| DUSTER | D | |
| OTHERS | * | |

F I G. 5 1

PICTURE DATA PROCESS SYSTEM FOR CONTROLLING DISPLAY OF PICTURE DATA

BACKGROUND OF THE INVENTION

1. Field of the Invention

The present invention relates to a picture data process system for searching a database storing various picture data about a subject, and enabling desired picture data to be viewed.

The present invention processes picture data in various fields, and especially makes picture data of various sports such as baseball, soccer, tennis, golf, etc. be retrieved and viewed. Otherwise, the present invention is applicable in retrieving and viewing picture data in other fields such as a fashion show, etc.

2. Description of the Related Art

For example, considering a professional baseball team, there can arise a request to refer to or study for future games the previous games, the performances of various players in the games, etc. In this case, normally, the contents of the games which are broadcast on TV are recorded by a video recorder, or the games are shot using a personal video camera, and a video tape is stored for future use so that the games can be played back later as necessary.

However, when such a video tape is used in displaying a desired picture on the screen, it is necessary to forward or rewind the video tape while watching the screen until the desired picture can be correctly displayed on the screen. In addition, when a user wants to repeatedly see a specific picture, the user has to repeat the forwarding and rewinding operations each time, thereby requiring much labor and time. As a result, the process is inefficiently performed.

SUMMARY OF THE INVENTION

The present invention aims at solving the above mentioned problems, and providing a picture data process system capable of immediately retrieving picture data of a desired scene to be viewed by a user.

The present invention is configured as follows to attain the above mentioned purpose.

That is, the present invention is configured as a picture data process system including a storage unit for storing the picture data associated with the attribute information about the data, an edition display unit editing the attribute information and displaying the information as graphics, and a display control unit for displaying picture data associated with the attribute information selected from a graphical display by the edition display unit.

With the configuration, desired picture data associated with the attribute information can be easily displayed only by selecting the attribute information displayed as graphics by the edition display unit.

The present invention can also realize various configurations and embodiments within the range of the gist of the present invention.

The present invention can also obtain preferable results from the processes of the picture data of the players of ball games such as baseball, soccer, tennis, golf, etc., but is not limited to these applications.

BRIEF DESCRIPTION OF THE DRAWINGS

The foregoing and other objects, features and advantages will be apparent from the following more particular description of preferred embodiments of the invention as illustrated in the accompanying drawings.

FIG. 4 is a flowchart of the operation procedure of a picture capturing process and retrieval information inputting process in the picture data retrieval and distribution system shown in FIG. 1;

FIG. 5 shows an example of a game information setting screen;

FIG. 7 shows the file format of a retrieval information/picture management database;

FIG. 14 shows an example of the activation screen for generation of CD-ROM;

FIG. 20 shows an example of the retrieval result list screen;

FIG. 24 shows an example of the file format of a delivery information database;

FIG. 25 shows an example of the file format of a hitting information database;

FIG. 26 shows an example of the file format of a result information database;

FIG. 30 shows an example of a delivery table for each count (expressed in graphics) which is one of the listings;

FIG. 32 shows an example of swing wide and foul symbols;

FIG. 33 shows an example of a delivery symbol;

FIG. 35 shows an example of a hitting locus;

FIG. 43 shows an example of the general result table for each batter (for coaches) which is one of the listings;

FIG. 45 shows an example of the format of a personal delivery result table;

FIG. 50 shows an example of the format of a bunt hitting direction table;

FIG. 51 shows an example of a symbol indicating a strategy;

DESCRIPTION OF THE PREFERRED EMBODIMENTS

The embodiments of the present invention are described below by referring to the attached drawings.

Figure 1:
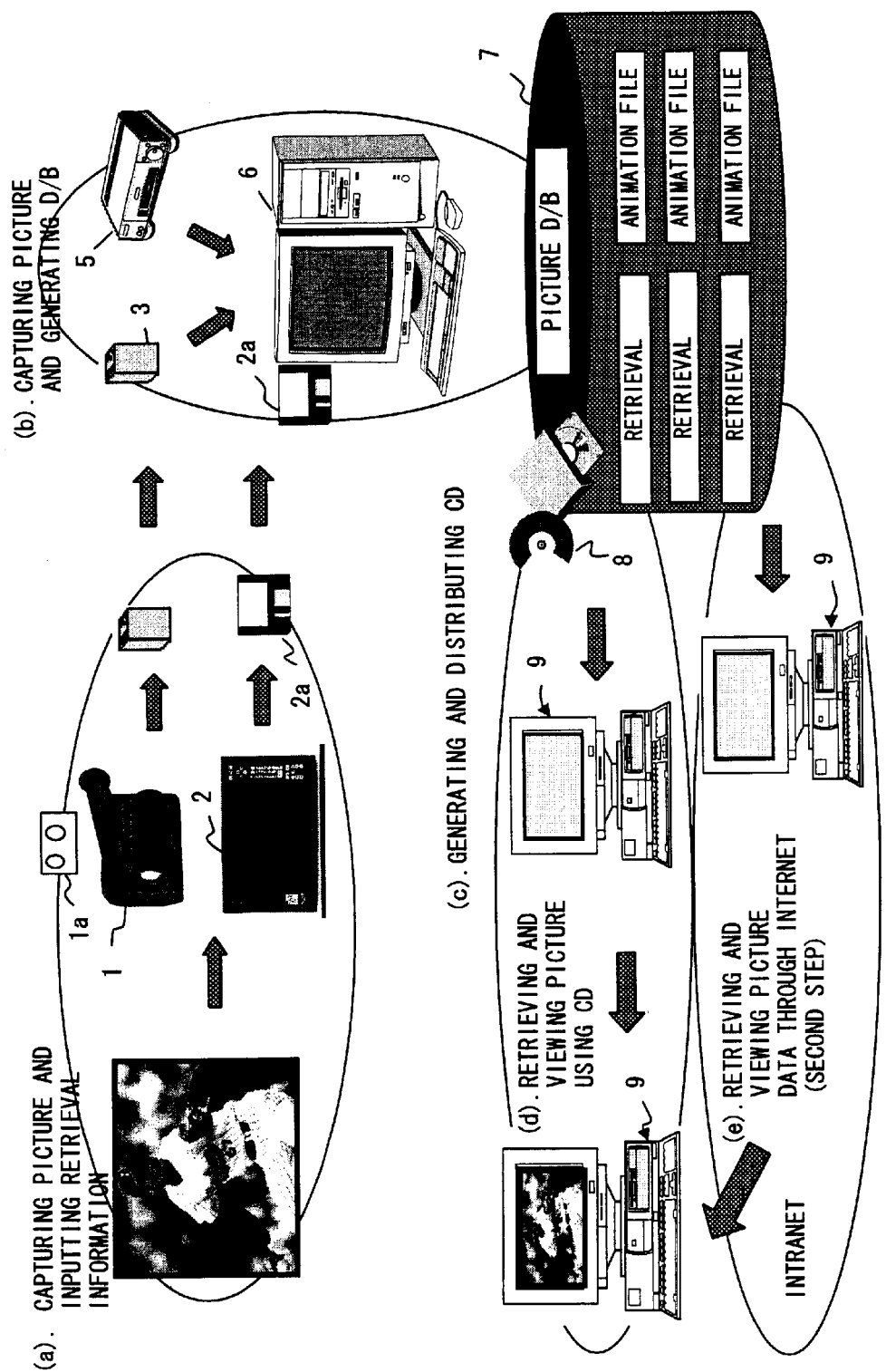
FIG. 1 shows the entire flow of the picture data retrieval and distribution system to a part of which the picture data process system according to an embodiment of the present invention is applied.
Figure 2:
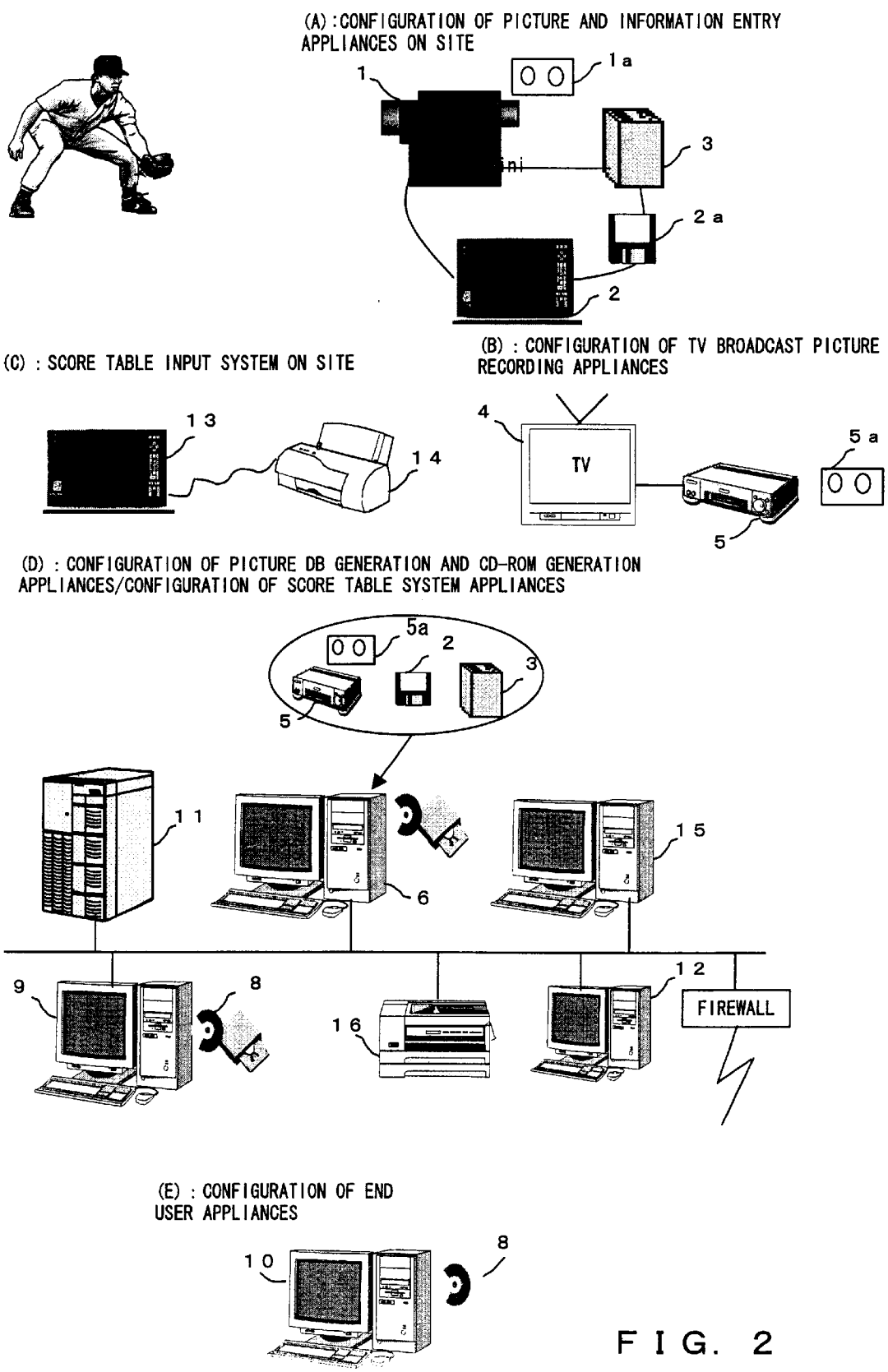
FIG. 2 shows the configuration of the appliances of the picture data retrieval and distribution system shown in FIG. 1.

The data retrieval and distribution system shown in FIGS. 1 and 2 is designed for support of a professional baseball team as a practical example. Therefore, the location is a ball park in which a baseball game is performed. Picture data of a desired scene in a baseball game is stored in a database to be checked and viewed.

First, the entire flow of the process performed by the picture data retrieval and distribution system is simply described below by referring to FIGS. 1 and 2. The following items (a) through (e) respectively correspond to (a) through (e) shown in FIG. 1.

(a) Taking a Picture and Inputting Retrieval Information

A flow of a baseball game currently being performed is taken by a video camera (especially a digital video camera) 1. At this time, as shown in (A) in FIG. 2, the video camera 1 is set to be driven and controlled by a personal computer 2, and the personal computer 2 is operated such that only the picture data of a desired scene can be recorded by a digital recording device (DRD) 3. Picture data of a desired scene refers to, for example, picture data in a ball unit (that is, a series of movements of a ball from the beginning to the end represented by 'a delivery of a ball by a pitcher', 'the ball hit by a batter', and 'a result', etc.).

In this case, retrieval data (for example, the name of a pitcher, the name of a catcher, the name of a batter, the type of delivery, etc.) indicating the attribute of a subject in each scene is input in the range of predetermined contents on the retrieval information input screen displayed on the personal computer 2. The data is stored in a floppy disk 2a, etc. It is desired that the video camera 1 is driven and controlled (for the start and the end of the recording process) on the above mentioned retrieval information input screen.

It is desired that the personal computer 2 can be a portable and operable notebook which can receive data input with a pen and can be easily carried to a location.

The picture data output from the video camera 1 is recorded by the digital recording device 3, and simultaneously the video camera 1 can record the data on a video tape (digital video tape) 1a.

Furthermore, there can be one or more video cameras 1 mounted at different places so that plural pieces of picture data can be simultaneously obtained for one subject. In this case, one video camera 1 is driven and controlled by the personal computer 2, and other video cameras are set to obtain picture data in time series from the start to the end of a game.

Since a professional baseball game is normally broadcast on TV, it is also desired that, as shown in (B) in FIG. 2, a video deck 5 records the picture displayed on a television 4 currently receiving the picture of the baseball game, and stores the picture data on a video tape 5a.

(b) Capturing a Picture and Generating a Database (D/B)

The picture data of each scene obtained as described in (a) above, and the retrieval data input in (a) above are associated with each other, and stored as a database. The operation is performed by a large personal computer 6 functioning as a picture edition/CD-R management generation terminal and a picture management server 11 connected to the terminal through a network.

At this time, as described in (a) above, if there is picture data serially recorded for the entire game by the video cameras other than the video camera 1, and the video deck 5 for recording data received on TV, then an editing process is performed such that only the picture data of a desired scene can be extracted from the series of picture data. This editing process can be performed by fetching the portion corresponding to the picture data (that is, the picture data segmented by each of the desired scenes) recorded by the digital recording device 3. In this editing process, the entire picture data is represented as picture data segmented for each of the desired scenes (for example, for each delivery of a ball). The editing process can also be performed by the personal computer 6 and the picture management server 11.

Then, the individually obtained picture data is converted into animation files in, for example, an MPEG 1 format by the personal computer 6 and the picture management server 11. They are associated with the retrieval data (retrieval information) stored in the floppy disk 2a, etc., and are stored together as a picture database in, for example, the picture management server 11. It is obviously possible that each piece of picture data is converted into a file after the picture data, which has not been converted into a file, is associated and stored with the related retrieval data.

(c) Generating and Distributing CD-ROM

At a request from a user (for example, a baseball player) to view the picture data in the database, a desired condition (for example, for a pitcher, for a batter, etc.) is set as a retrieval condition, and all animation files satisfying the retrieval condition are extracted from the picture database 7. Then, a CD-ROM 8 can be generated by setting on the CD-R the extracted animation files and the retrieval condition which has been converted into a file. This operation is performed by the domain server/CD-ROM generation terminal 9 as shown in (D) in FIG. 2.

Thus, the obtained CD-ROM 8 is distributed to the above mentioned user who requests to view the picture data.

(d) Retrieving and Viewing Picture using CD-ROM

A user who requests to view picture data can view the data on a personal computer 10 available by the user using the CD-ROM 8 distributed as described in (c) above.

In this case, it is desired that a retrieval screen is set to be automatically activated when the CD-ROM 8 is connected to the personal computer 10 so that desired picture data satisfying the retrieval condition can be viewed only by selecting necessary retrieval condition on the retrieval screen.

(e) Retrieving and Viewing Picture Data through Internet

Instead of generating and viewing the CD-ROM as described in (c) and (d) above, desired picture data can be retrieved and viewed through a network such as Internet, Intranet, etc.

In this case, a user who requests to view picture data connects the personal computer 10 for retrieving and viewing data to the network in advance, and inputs an ID and a password, thereby obtaining permission to retrieve and view data. After obtaining the permission, a retrieval screen is set to be displayed. It is preferable that desired picture data satisfying a retrieval condition can be viewed only by selecting a necessary retrieval condition on the retrieval screen. This function is mainly performed by the picture management server 11 and an Internet server 12 shown in (D) in FIG. 2.

When data is retrieved and viewed through a network, it is desired that the following process is performed such that a retrieval condition can be easily input. That is, a score table of a baseball game is generated in advance as a database (store table database), a listing (analysis listing) indicating an analysis result obtained according to the delivery information, hitting information, etc. contained in the store table is automatically generated, the attribute information (for example, the name of a pitcher, the name of a batter, the course, height, and result of a delivery of a ball, etc.) is added for each delivery indicated on the analysis listing, and the information is linked with the picture data. A user who requests to view picture data only checks the analysis listing displayed on the screen of the personal computer 10 and specifies a desired delivery on the screen to extract the picture data linked with the attribute information from the picture database 7, and display the data on the screen of the personal computer 10.

In this case, in the location of the baseball game, a score table is input in a personal computer 13 as shown in (C) in FIG. 2. The data is printed later on a printer 14 in a hotel, etc. where the player stays, stored in a personal computer 15 for storing a score table shown in (D) in FIG. 2 through a network, etc. Furthermore, the personal computer 15 automatically generates various listings based on the score table database. When data is retrieved and viewed, the picture database can be searched and viewed at an instruction from the listing screen as a retrieval condition using the listing screen specified by the user who requests to view data as a retrieval information input screen. The listing can be printed on a printer 16 as shown in (D) in FIG. 2.

Next, before explaining (c) through (e) above according to an embodiment of the present invention, the above mentioned capture of a picture and the input of retrieval information ((a) above), and the capture of a picture and the generation ((b) above) of a database are described below in more detail by referring to FIGS. 3 through 13.

Figure 3:
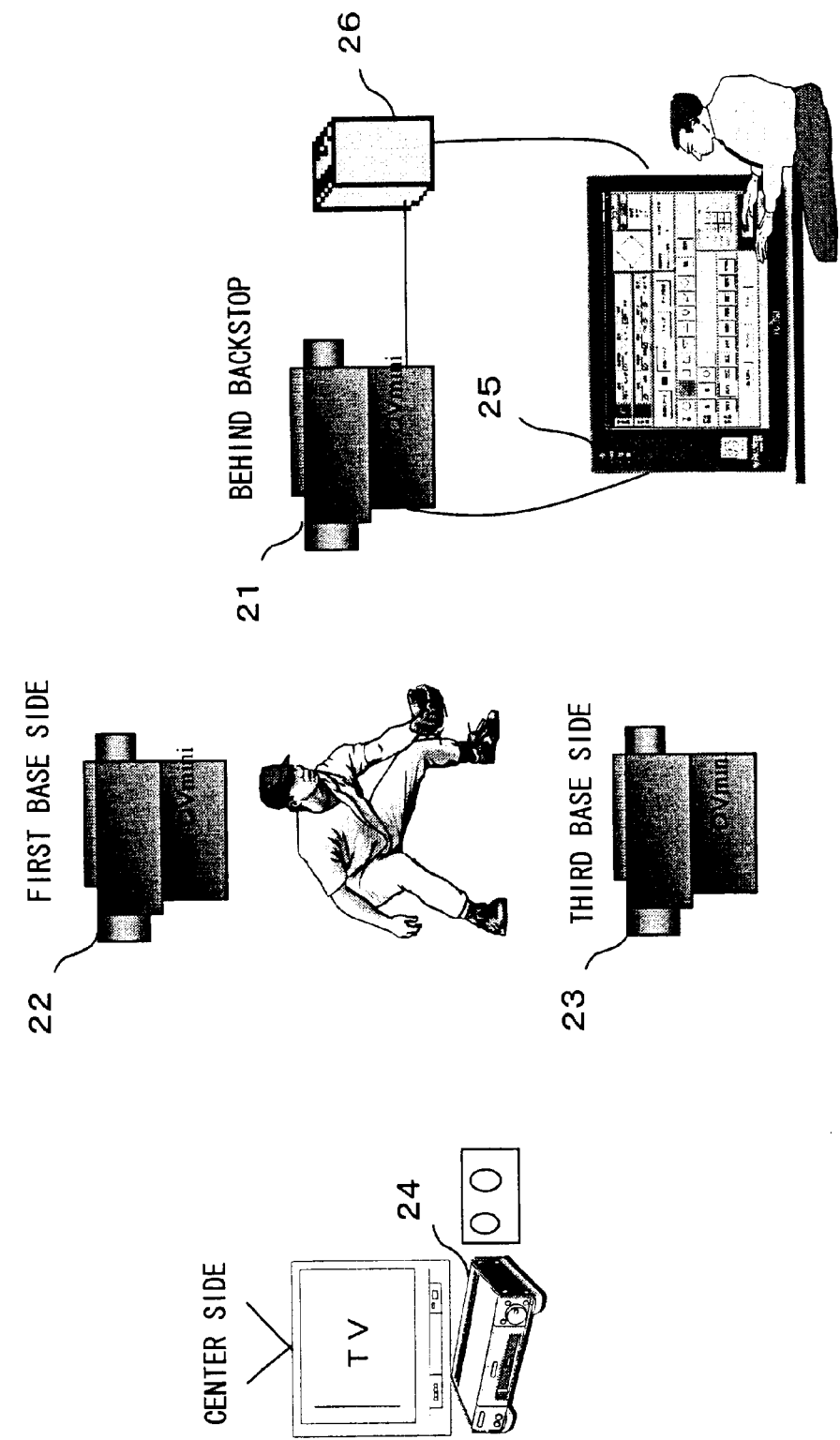
FIG. 3 shows an example of the arrangement of the video appliances in the picture data retrieval and distribution system shown in FIG. 1.

FIG. 3 shows the arrangement of video appliances when a plurality of cameras are used to record a baseball game. In FIG. 3, the flow of a baseball game being performed is taken by a first, a second, and a third video cameras 21, 22, and 23, and also a video deck 24 records the picture being broadcast on TV. Otherwise, only the first video camera 21 is driven and controlled by a personal computer 25 to allow a recording device 26 to record the picture data for each of the desired scenes. The video camera 21, the personal computer 25, and the recording device 26 respectively correspond to the video camera 1, the personal computer 2, and the digital recording device 3 shown in (A) in FIG. 2. In this example, the three video cameras 21, 22, and 23 are mounted behind the backstop, on the first base side, and the third base side, and the game is broadcast on TV from the center field side.

First, as described in (a) above, the procedure of the operations performed when a picture is taken and retrieval information is input is described below by referring to FIG. 4.

(a1) First, the time is set for the video appliances such as the video cameras 21, 22, 23, etc. (step S1). The time setting is required to associate various pieces of picture data obtained by the video appliances with one another correctly in time.

(a2) The personal computer 25 displays a game information setting screen, and game information, starting members, etc. are input on the screen (step S2).

FIG. 5 shows an example of the game information setting screen. The features of the screen are briefly described below.

A 'date of game (date and day of week)' and a 'starting time' are displayed by invoking the built-in timer when the system is activated. They can be manually input and changed.

A 'name of ball park' is selected from a predetermined ball park name group. List data is read from a ball park master when the system is activated. The data can be manually input.

A 'name of chief referee' is selected from a predetermined chief referee name group. List data is read from a chief referee master when the system is activated. The data can be manually input.

'Names of teams playing offense in the first and second half of an inning' are selected from a predetermined team name group. List data is read from a team master when the system is activated. The data can be manually input.

An 'ordinal number' of the game and the 'accumulated number of games' are manually input.

The names of teams selected in the game column are displayed in the 'offense in the first half of an inning' column and 'offense in the second half of an inning' column. In these columns, the starting members of the teams are set.

A number is input in a 'player's number' column. When the focus is moved, the corresponding name of the player is displayed.

A 'name of a player' is read from the player master when the system is activated.

The above mentioned ball park master, chief of referee master, baseball team master, player master, etc. are databases storing respective data, and are prepared in advance.

(a3) The 'OK' button shown on the above mentioned game information setting screen (FIG. 5) is pressed. Then, a retrieval information input screen replaces the game information setting screen (step S3).

Figure 6:
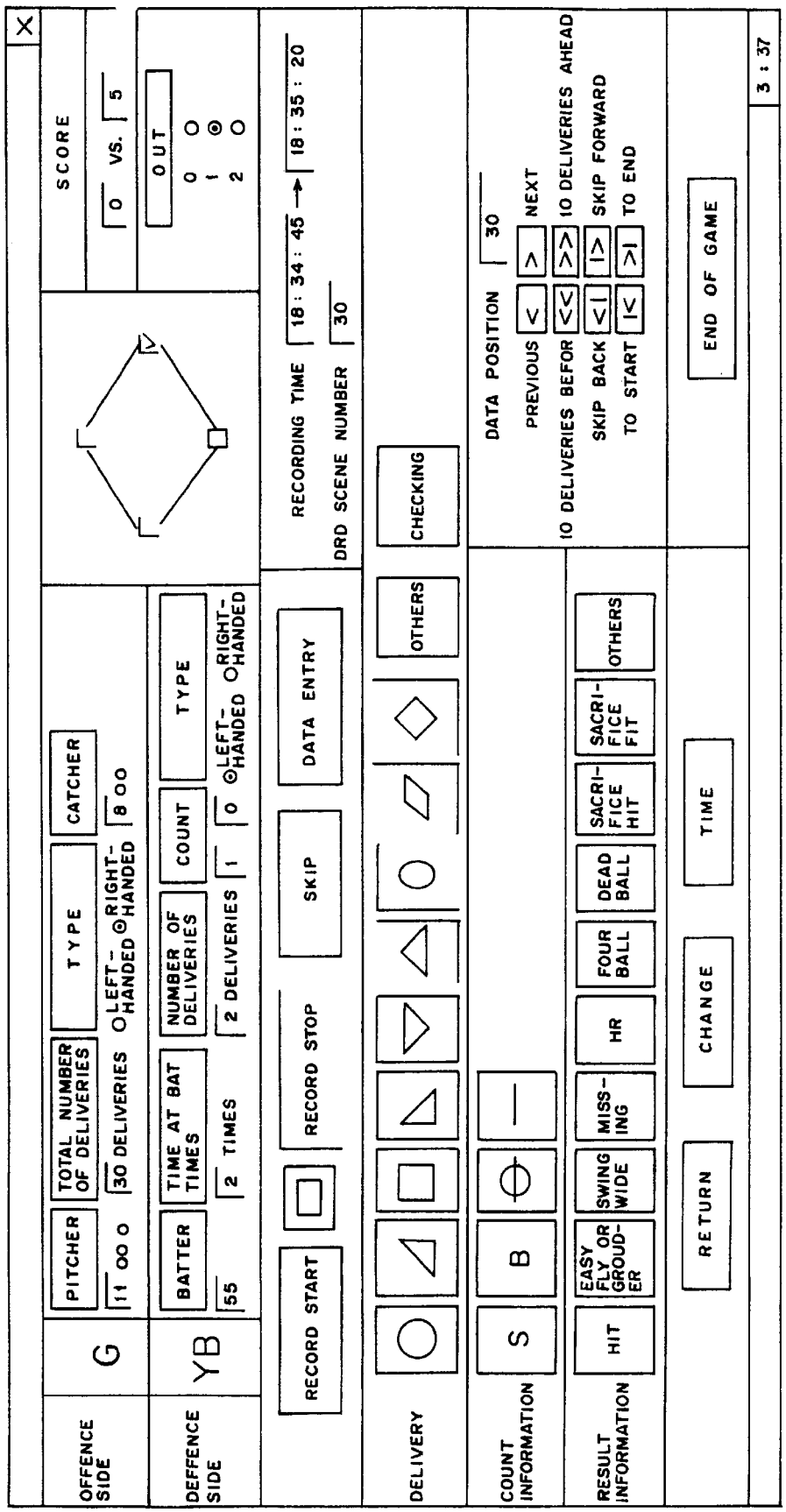
FIG. 6 shows an example of the retrieval information input screen.

FIG. 6 shows an example of the above mentioned retrieval information input screen. The features of the screen are briefly described below.

The abbreviated names of the teams are displayed in the columns of 'defense' and 'offense'

The player numbers of the pitcher and the catcher of the offense are those entered as the starting members when the initial screen is displayed. The player names are automatically displayed. When a plurality of pitchers or catchers are entered as the starting members, those assigned larger ordinal numbers in the batting order are displayed.

A 'total number of deliveries' is automatically counted when a 'data entry' or 'skip' button is pressed. However, a checking pitch is not counted. The number can be manually amended.

When a 'pitcher' is replaced, the player number of a replacing player is input. The player name is automatically displayed. At this time, the 'total number of deliveries' is cleared.

A 'type' contains a left-hand delivery or a right-hand delivery. The default is the value in the player master.

When a 'catcher' is replaced, the player number of a replacing player is input. The player name is automatically displayed.

The numbers and the names of the players of the 'offense' are automatically displayed in the batting order. An amendment can be made by inputting the player number of a batter. At this time, the player name can be automatically displayed.

When a 'batter' is changed, the 'number of times at bat' and the 'number of deliveries' are cleared, but the 'count' is maintained.

The 'number of times at bat' is automatically counted and displayed as the number of times at bat of a player. The value can be manually amended.

The 'number of deliveries' is automatically counted and displayed for a batter. The value can be manually amended. The 'number of deliveries' is not cleared when a pitcher is replaced.

The 'count' indicates the number of strikes on the left, and the number of balls on the right. When the 'B' button of the 'count information' is pressed, the number of 'balls' is increased. When other buttons are selected, the number of 'strikes' is increased. For a foul, the number of strikes is increased up to 2 strikes.

The 'runner position' information is obtained by manually specifying the position of a runner. When a check box is clicked, a check mark is displayed to indicate the existence of a runner. When it is clicked again, the indication is cleared.

The 'score' information is manually input. The count for the offense in the first half inning is input on the left, and the count for the offense in the second half inning is input on the right.

An out count is manually input in the 'OUT' column. It is cleared by pressing the 'change' button.

When the 'start of record' button is pressed, data is recorded by the video camera 21 and the recording device 26 shown in FIG. 3. During the recording process, the indicator beside the 'start of record' button turns to red. When the recording process is started, the starting time is displayed in the 'recording time' column.

When the 'stop of record' button is pressed, the recording process performed by the video camera 21 and the recording device 26 shown in FIG. 3 is suspended, and the end of record time is displayed.

When the recording process is completed, the 'type of delivery' and the 'count information' or the 'result information' for the delivery are entered.

The 'type of delivery' selects the type of delivery by the pitcher. However, when the 'check' button is pressed, the total number of deliveries and the number of deliveries are not counted. The 'type of delivery' is selected from among various symbols one-to-one corresponding to the type of deliveries (straight, shoot, curve, slider, fork, change-up, sinker, palm, knuckle, etc.).

The course of a pitched ball can be selected although it is not shown in the drawings. The 'course of a ball' is expressed by a combination of left and right information (in baseball, insider, center, and outsider) and high and low information (in baseball, high, middle, and low). Various symbols one-to-one corresponding to these combinations are prepared, and a desired course can be selected from among the symbols.

The 'count information' is the information about the action against a pitched ball (missing a strike, leaving a ball, swing wide, and foul). For a target batter, data is input when the next delivery is started.

The 'result information' is the final result of a batter for the target time at bat. That is, it indicates that the batter can be the next batter in the current inning, or the offense side is changed.

In the present specification, the 'play state' refers to the information about one of, a combination of, or all of the 'pitcher', 'batter', 'total number of deliveries', 'number of times at bat', 'number of deliveries', 'count', 'runner position', 'OUT', and 'result information'.

The 'attribute of subject' refers to the information about the attribute of a subject including one of, a combination of, or all of the 'type of delivery', 'course of a ball', and 'play state'.

Furthermore, a 'subject' is selected from among players (for example, a pitcher, other players) depending on the purpose of the use of the present invention. For example, when the habits of an opposing pitcher are to be checked to increase base stealing, the pitcher is the main 'subject'. When a batter intends to overcome a difficult course and type of delivery, the batter is the main 'subject'.

The 'data entry' button enters each piece of input retrieval information. If the 'count information' is selected when the 'data entry' button is pressed, the next delivery is expected. On the other hand, if the 'result information' is selected and the offense side is not changed, then the next batter is automatically displayed.

The 'skip' button is used when the 'type of delivery', 'count information', 'result information', etc. are not input in time. When the 'skip button' is pressed, a skip mark is added to the data for use later when any of them is input again.

When the 'change' button is pressed, the offense and defense sides are switched, and the target player information is automatically displayed.

The 'end of game' button closed the retrieval information input screen, thereby terminating the system.

(a4) At the signal of 'Play!' of a game, the video appliances (the video cameras 22 and 23, and the video deck 24) except the video camera 21 start recording data (step S4).

(a5) When a desired scene starts (when the pitching motion of the pitcher start if a scene for each delivery is requested as described above), the 'start of record' button is pressed on the above mentioned retrieval information input screen (step S5). Thus, the recording process by the video camera 21 and the recording device 26 is started.

(a6) When the scene for each delivery (movement of a ball of each delivery) is completed, the 'stop of record' button is pressed on the above mentioned retrieval information input screen (FIG. 6) (step S6). Thus, the recording process by the video camera 21 and the recording device 26 is stopped, and the recording device 26 records the picture data segmented for each delivery.

(a7) On the above mentioned retrieval information input screen (FIG. 6), for example, the 'type of delivery', 'count information', 'result information', etc. are input as the retrieval information relating to the recorded scenes (step S7).

(a8) When all retrieval data is completely input, the 'data entry' button is pressed on the above mentioned retrieval information input screen (FIG. 6) (step S8). Thus, the retrieval information relating to the picture data for each scene is entered on the floppy disk (floppy disk 2a shown in FIG. 2), etc. as the retrieval information in the picture database (picture management database) in the file format as shown in FIG. 7. In this database, for example, the relationship between the retrieval information and the picture data is displayed with sequence numbers.

(a9) It is determined whether the state of the game at the time when the 'data entry' button is pressed is 'awaiting the next delivery', 'change', or 'end of game' (step S9).

If the 'awaiting the next delivery' state is entered, control is passed to step S5, and the processes in and after steps S5 through S8 are repeated.

(a10) If the 'change' state is entered in step S9, the 'change' button is pressed on the retrieval information input screen (FIG. 6) (step S10). Then, the defense and offense sides are switched on the retrieval information input screen, and the target player information (pitcher, catcher, batter) is fetched and automatically displayed (step S11).

Then, control is passed to step S5, and the operations in and after steps S5 through S8 are repeated.

(a11) If the 'end of game' state is entered in step S9, the 'end of game' button is pressed on the retrieval information input screen (FIG. 6) (step S12). Then, the retrieval information input screen is closed.

Finally, the entered file information is checked (step S13), and the recording process being performed by the video appliances (the video cameras 22 and 23, and the video deck 24) is terminated (step S14).

As described above, the picture capturing process and the retrieval information inputting process are terminated.

Then, as described in (b) above, a picture is captured and a database is generated using the personal computer 6 and the picture management server 11 for editing pictures as shown in (D) in FIG. 2. The procedure of the practical operations performed in the processes is described below by referring to FIG. 8.

(b1) First, it is determines whether the picture data to be processed in the capturing operation has been obtained by the recording device (DRD) 26 or by other video appliances (the second and third video cameras 22 and 23, and the video deck 24) (step S21).

(b2) In the above mentioned step S21, if the picture data is obtained by the recording device (DRD) 26, the capturing process screen is displayed on the personal computer 6 (in (D) in FIG. 2) (step S22).

Figure 9:
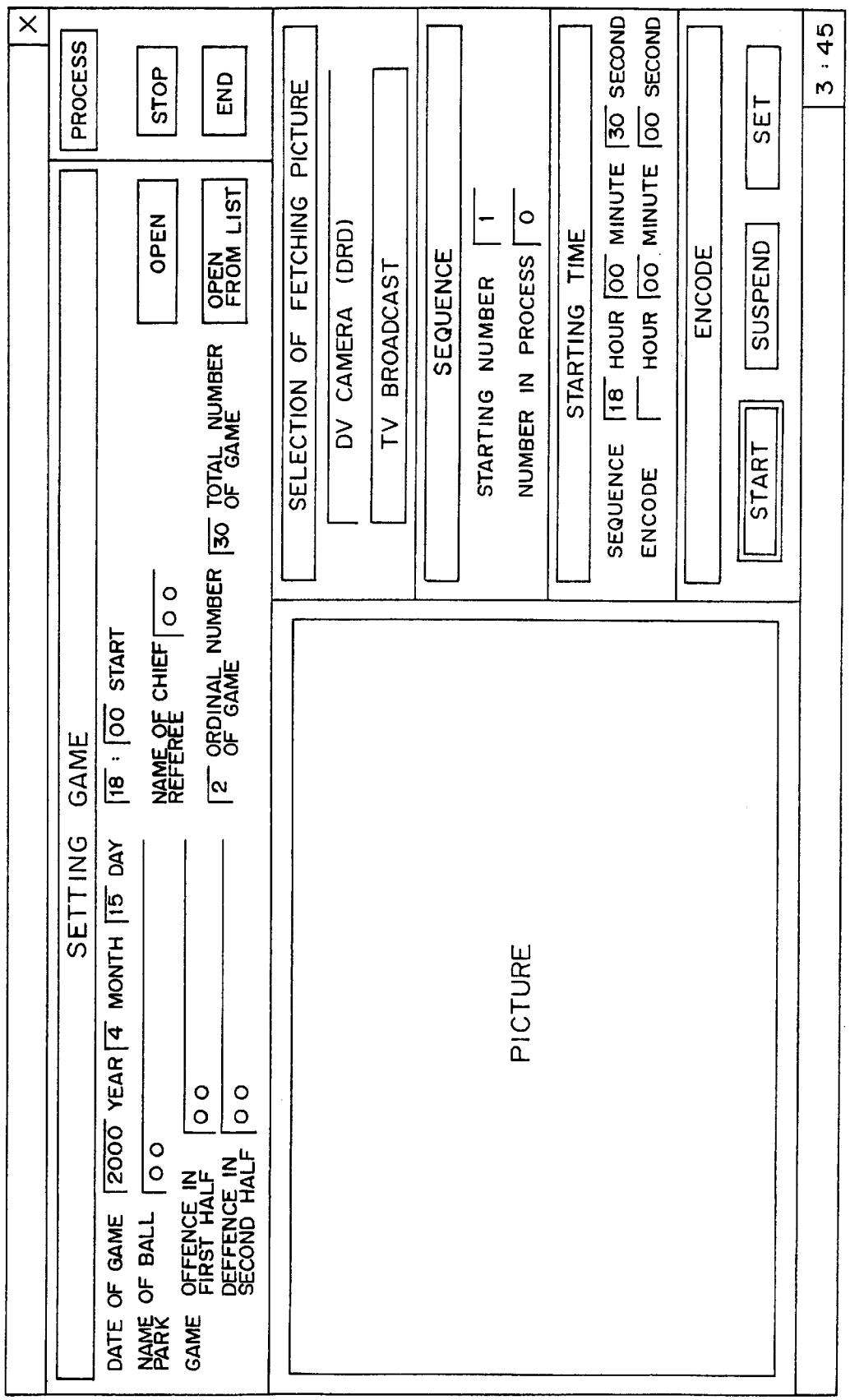
FIG. 9 shows an example of the capturing process screen.

FIG. 9 shows an example of the above mentioned capturing process screen. The features of the screen are briefly described below.

If a game is performed, the 'date of game' and the 'total number of games' are input with the retrieval information entered (step S8 shown in FIG. 4), and the 'open' is clicked, then the retrieval information is read, and the 'starting time of game', 'name of ball park', 'name of opposing team', 'name of chief referee', and 'ordinal number of the game' are automatically displayed.

In the 'open from a list' process, a list of games currently accumulated on the hard disk is displayed, and a game to be read from the list is selected and read.

The 'encode' (capturing) process is continuously performed to the end once it is started. The process can be automatically performed without an operator.

The image in the encoding process is displayed in the monitor display column on the left.

When the encoding operation is suspended without continuously performing to the end of the sequence, the 'stop' button in the 'process' column is pressed. Thus, when the sequence in the current encoding process terminates, the process temporarily terminates.

When the encoding process is performed, it is determined whether the picture data of the recording device (DRD) is encoded or the pictures of other video appliances are encoded.

The sequence number is specified for the encoding process. The sequence number indicates the relationship between the retrieval information and the picture data (FIG. 7). When a sequence number is specified, the starting time at which the picture data corresponding to the sequence number is recorded is automatically displayed. Immediately after opening the data, No. 1 is automatically selected as a sequence number.

When the picture data of the recording device (DRD) is encoded, the 'DV camera (DRD)' in the 'selecting fetch of picture' column is first selected, and then the 'start' in the 'encode' column is selected. According to the data entered in the retrieval information, the DRD pictures are sequentially called and captured.

When picture data (especially the picture data being received on TV) other than the data of the recording device is encoded, the time at which the 'start' button is pressed is set in the 'encode' column of the 'starting time' column. The time value is specified as a value smaller than the starting time of the sequence by a value equal to or longer than 5 seconds.

Since the date and time is recorded in a tape format when they are recorded on a DV video deck, they are displayed on the screen, the tape is read more than 5 seconds before the time set at the encode start time, and the 'start of encode' button is pressed at the input start of encode time. Then the timing of the encoding process can be correctly set. The actual encoding process is performed at the state of sequence time.

When the encoding process is suspended, the 'suspend' button is pressed.

When the encoding process is completed, a predetermined holder is generated in a directory to be shared with the database server (the drive mapping is completed when the system is activated), and data is transmitted. When the data transmission is completed, a data entry file is generated.

(b3) When the capturing process screen is displayed, the game information (date of game, total number of games) about the picture data to be captured is input, and the corresponding retrieval information is fetched from the floppy disk 2a (in (A) in FIG. 2), etc. (step S23). The fetched retrieval information is stored in a predetermined holder of the picture management server 11 (in (D) in FIG. 2).

(b4) After the 'DV camera (DVD)' is selected on the above mentioned capturing process screen, the 'start' of 'encode' button is pressed (step S24).

Then, each piece of picture data (picture data sectioned for each of the desired scenes) of the recording device (DVD) is sequentially captured in one animation file in the MPEG 1 format (step S25), and the process is performed until all picture data has been completely captured (step S26). The animation file is stored in a predetermined holder of the picture management server 11 (in (D) in FIG. 2).

(b5) Finally, when the capturing process is completed as described above, the retrieval information fetched in step S23 is associated with the animation file obtained in steps S25 and S26, and a picture database (picture management database) is generated (step S27).

First, to perform the operation, the 'picture management database generation start' button displayed on the personal computer 6 (in (D) in FIG. 2) is pressed. Then, the picture entry screen is displayed on the editing personal computer 6, and the picture database can be automatically generated according to the retrieval information and animation file.

Figure 10:
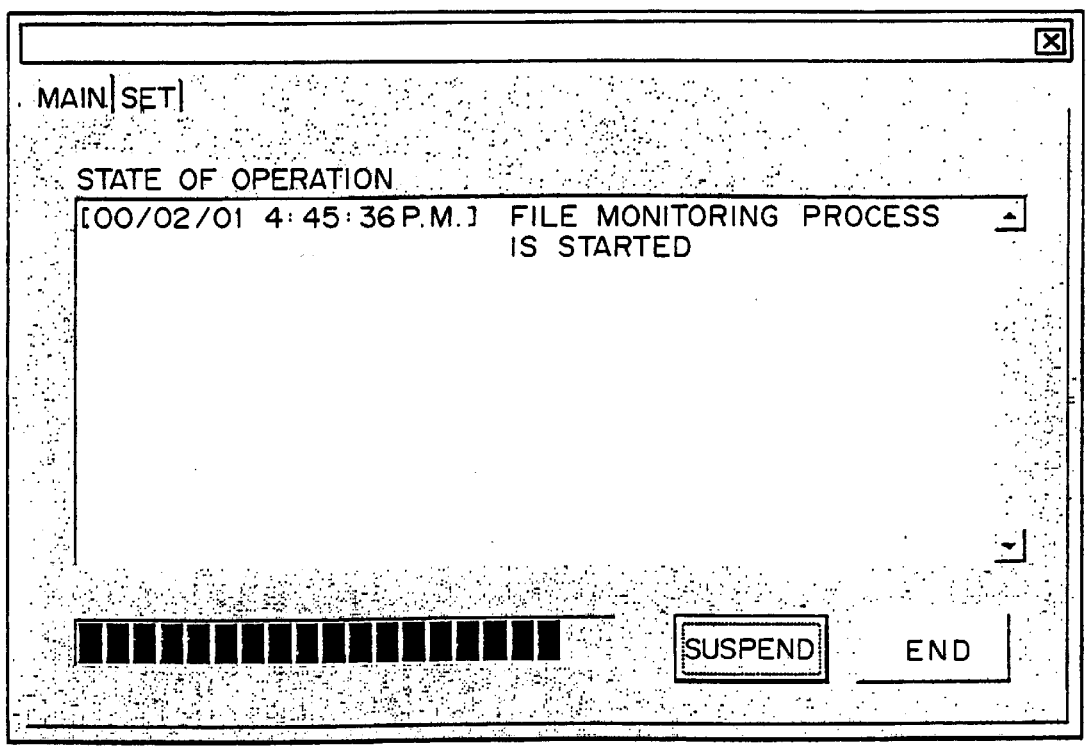
FIG. 10 shows an example of the picture entry screen (main screen)

FIG. 10 shows an example of the above mentioned picture entry screen (main screen). On the picture entry screen, it can be monitored whether or not an image file has been written in the predetermined picture holder.

Figure 11:
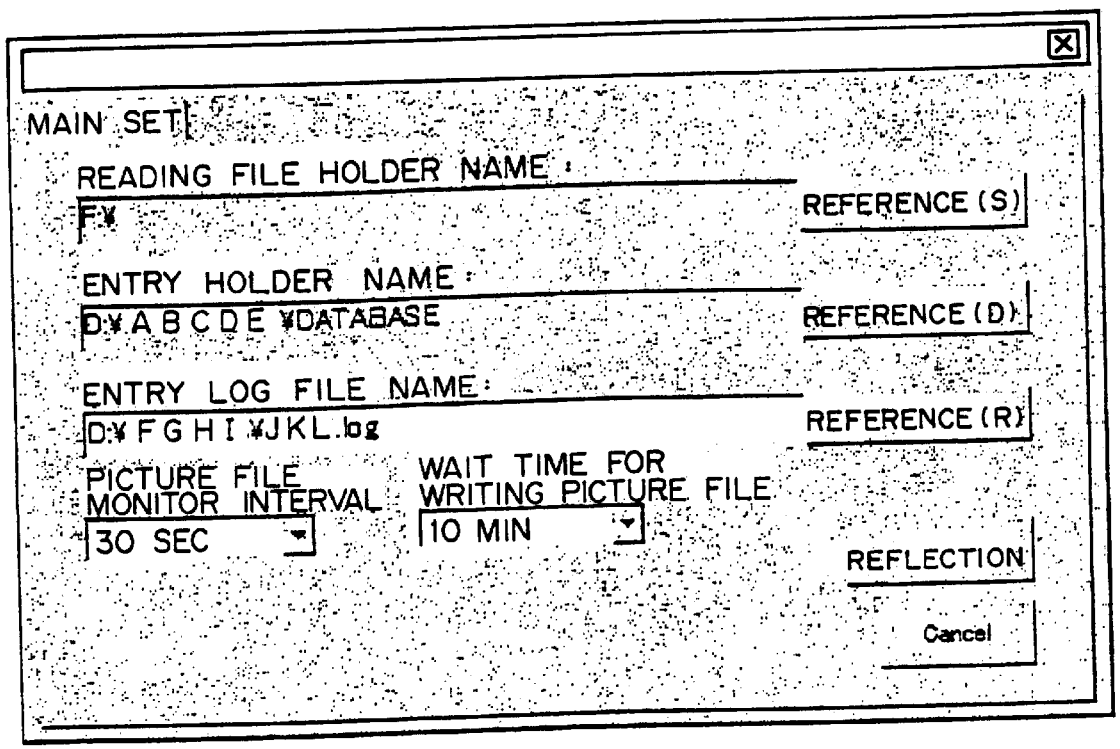
FIG. 11 shows an example of the picture entry screen (initialization screen)

A picture holder, etc. to which an image file is written is set on the picture entry screen (initialization screen) as shown in FIG. 11. A 'read file holder' is a holder in which an image file to be entered is generated. An 'entry holder' is a holder for storing pictures. An 'entry log file name' is the name of a file for storing an operation history. A 'picture file monitor interval' is an interval at which it is checked whether or not an image file (picture file) has been completed. A 'wait time for writing picture file' is the maximum time (for example, 4 hours) in which the present program continuously monitors a 'reading file holder'.

(b6) On the other hand, if picture data is obtained from video appliances (the video cameras 22 and 23, or the video deck 24 for recording TV program in real time) other than the recording device (DRD) in step S21, then the capturing process screen is displayed on the personal computer 6 (in (D) in FIG. 2) (step S28). This capturing process screen is the same as the capturing process screen displayed in step S22.

(b7) When the capturing process screen is displayed, the game information (the date of game, and the total number of games) about the picture data to be captured is input, and the corresponding retrieval information is fetched from the floppy disk 2a (in (A) in FIG. 2), etc. (step S29). The fetched retrieval information is stored in a predetermined holder of the picture management server 11 (in (D) in FIG. 2).

(b8) Since the picture data obtained by the video appliances other than the recording device (DRD) is continuous picture data not segmented for each of the desired scenes, it is necessary to fetch only the portion corresponding to the picture data segmented for each of the desired scenes obtained by the recording device (DRD) to store the picture data obtained by the video appliances other than the recording device as a database. Therefore, one of the three methods, that is, 'referring to a picture itself', 'referring to an absolute time', and 'referring to a time difference', is selected as a method of fetching picture data (step S30).

(b9) In step S30, when the method of referring to a 'picture itself' is selected, the 'start' of 'encode' button is pressed on the capturing process screen (FIG. 9), and the capturing process is started by pressing the 'confirmation' button while referring to the picture displayed on the monitor display column on the left (step S31).

(b10) In step S30, when the method of referring to an 'absolute time' is selected, the capturing process is started at an absolute input time at which the encoding process is started on the capturing process screen (FIG. 9) by pressing the 'start' button and the 'confirmation' button (step S32).

(b11) In step S30, when the method of referring to a 'time difference' is selected, the capturing process is started at a time based on an input time difference, which is a differential sequence time, on the above mentioned capturing process screen (FIG. 9) by pressing the 'start' button and the 'confirmation' button (step S33).

(b12) After starting the capturing process when any fetching method is selected in step S30, the target picture data is segmented and extracted for each of the desired scenes at the 'record starting time' and the 'record ending time' of the retrieval information. Furthermore, the capturing process is performed on one animation file in the MPEG 1 format (step S34), and the process continues until all picture data is completely captured (step S35). The animation file is stored in a predetermined holder of the picture management server 11 (in (D) in 2).

Figure 12:
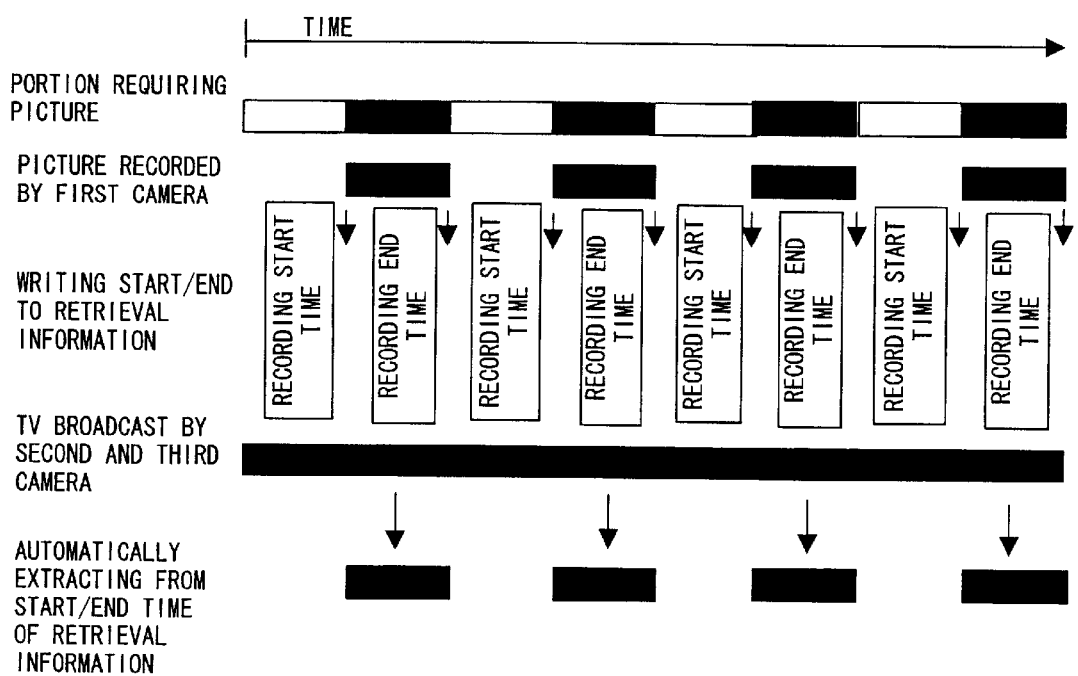
FIG. 12 shows a general image of the process of entering pictures of a plurality of video appliances by automatically segmenting them.

FIG. 12 shows a general concept of the process of entering a picture by automatically segmenting it by a plurality of video appliances.

(b13) When the capturing process is completed, the retrieval information fetched in step S29 is associated with the animation file obtained in steps S34 and S35, and a picture database (picture management database) is generated (step S27). FIG. 7 shows an example of the file format of the picture database.

As described above, the picture capturing process and the database generating process are completed on all picture data obtained by each of the video appliances.

Figure 13:
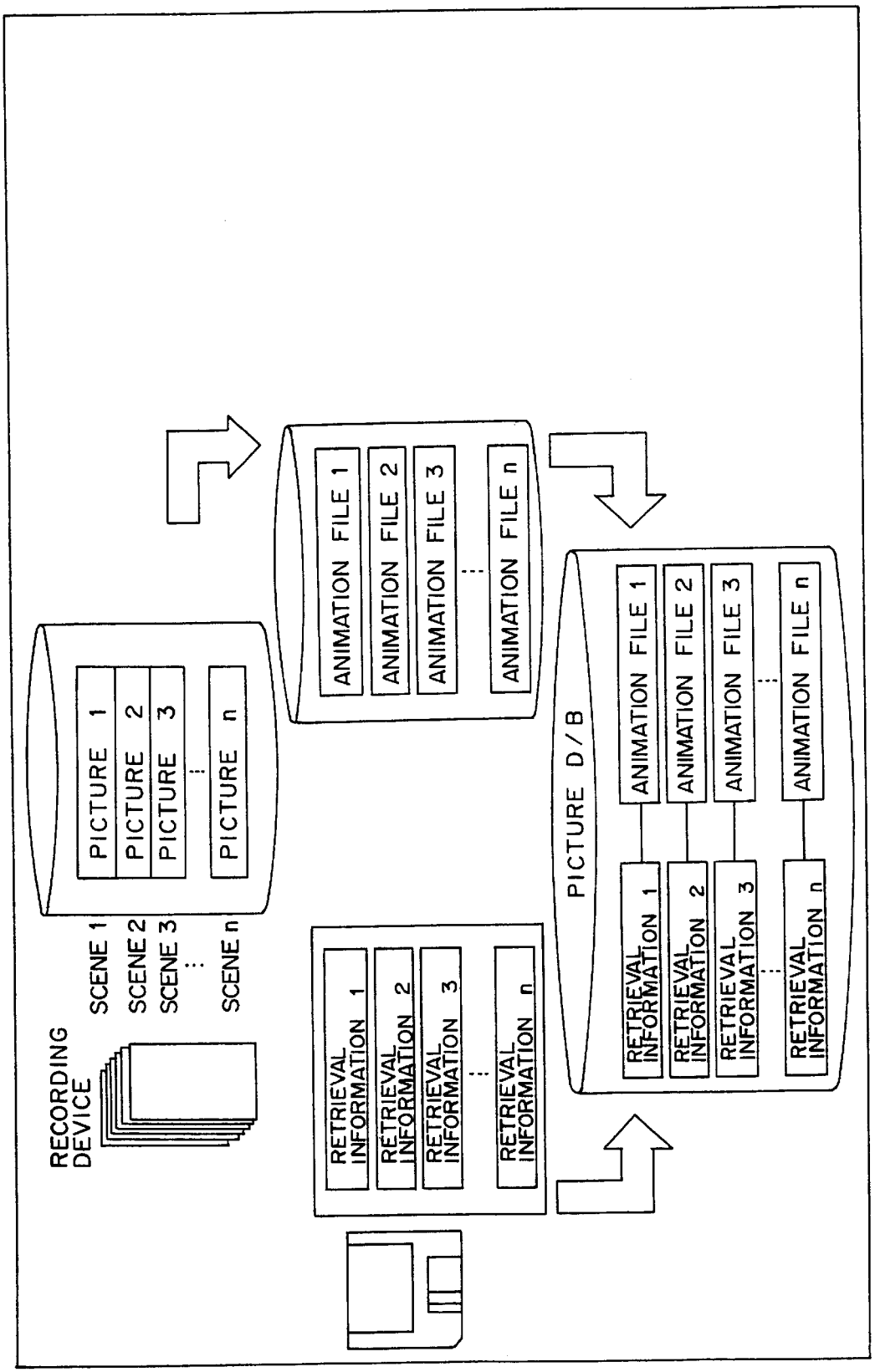
FIG. 13 shows the outline of a changing image as data format from the picture capturing process to the database generating process.

For information, FIG. 13 shows an outline of the transition image of the data structure from the picture capturing process to the database generating process. As apparent in FIG. 13, each of the picture data 1 through n of each of the desired scenes (for each delivery) obtained by recording by the recording device is separated from each other, segmented, and converted into animation files 1 through n in the MPEG 1 format, and is then associated with each of the retrieval information 1 through n input for each piece of the picture data, and stored in the picture database (D/B).

Figure 8:
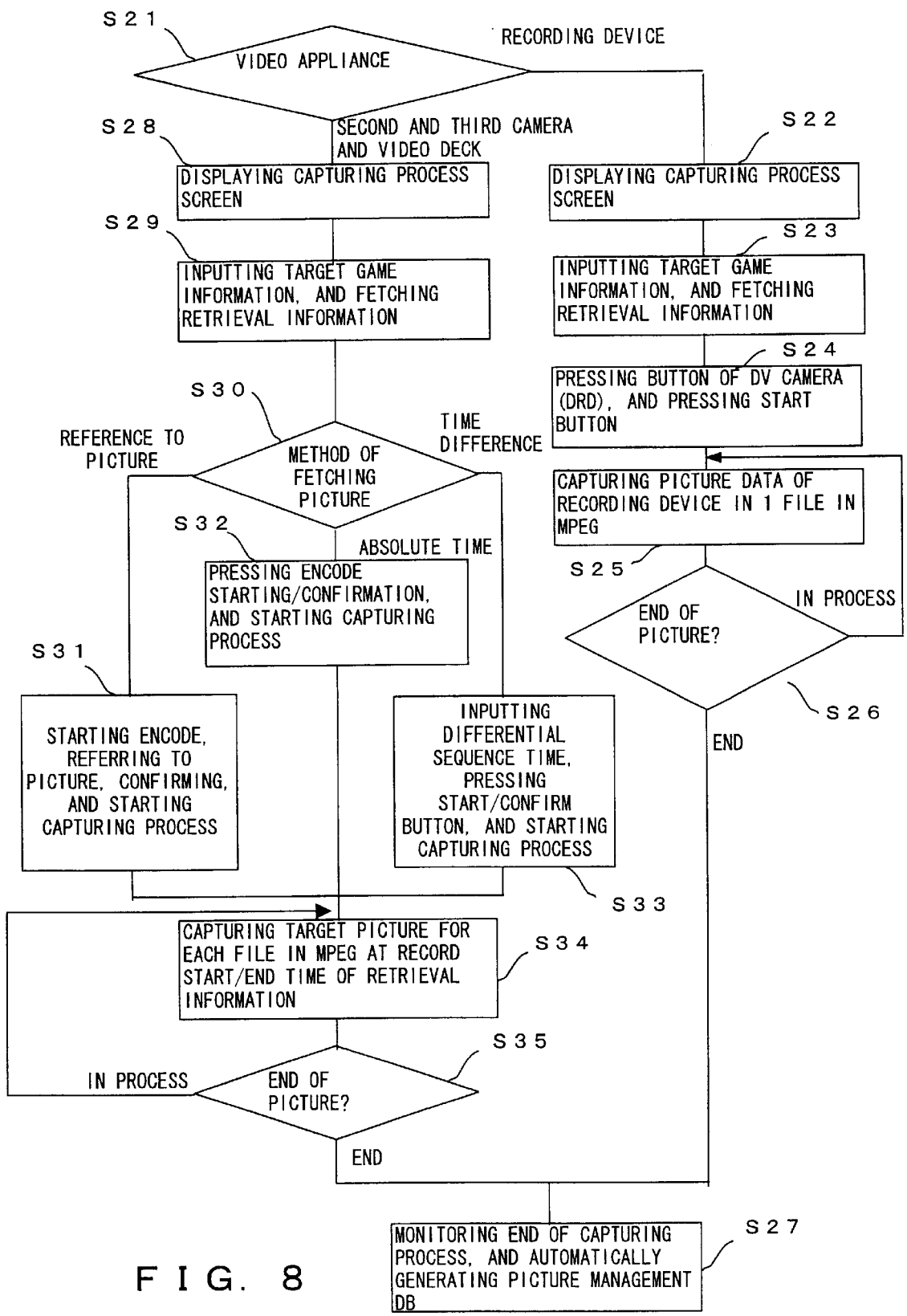
FIG. 8 is a flowchart of the operation procedure of capturing a picture and generating a database in the picture data retrieval and distribution system shown in FIG. 1.

In this example, when there are plural pieces of picture data captured from a subject from a plurality of directions although not shown in the attached drawings, each step shown in FIG. 8 is performed for each piece of data. In this case, the picture database (D/B) shown in FIG. 13 stores a piece of retrieval information associated with a plurality of animation files. For example, retrieval information 1 is associated with an animation file 1-1 (a picture from the backstop), an animation file 1-2 (a picture from the first base side), and the animation file 1-3 (a picture from the third base side).

The obtained picture database is, as shown in FIG. 1, stored in the CD-ROM and a picture can be retrieved and viewed, or a picture can be retrieved and viewed through Internet.

Next, the CD generating and distributing processes, the picture retrieving and viewing process ((d) described above) using a CD, and the picture data retrieving and viewing process through Internet ((e) described above) are described below in detail by referring to FIGS. 14 through 55.

First, using the personal computer 9 for generating CD-ROM shown in (D) in FIG. 2, the CD-ROM is generated for distribution (described in (c) above). The practical operation procedure is described below.

(c1) The personal computer 9 displays an activation screen for generation of CD-ROM (CD-R). FIG. 14 shows an example of the screen.

On the activation screen, the fiscal year to be checked is selected in the 'fiscal year to be checked' column.

(c2) If a fiscal year is selected, the 'decision' button is pressed. Thus, the next screen, that is, a picture data extraction screen, is displayed.

Figure 15:
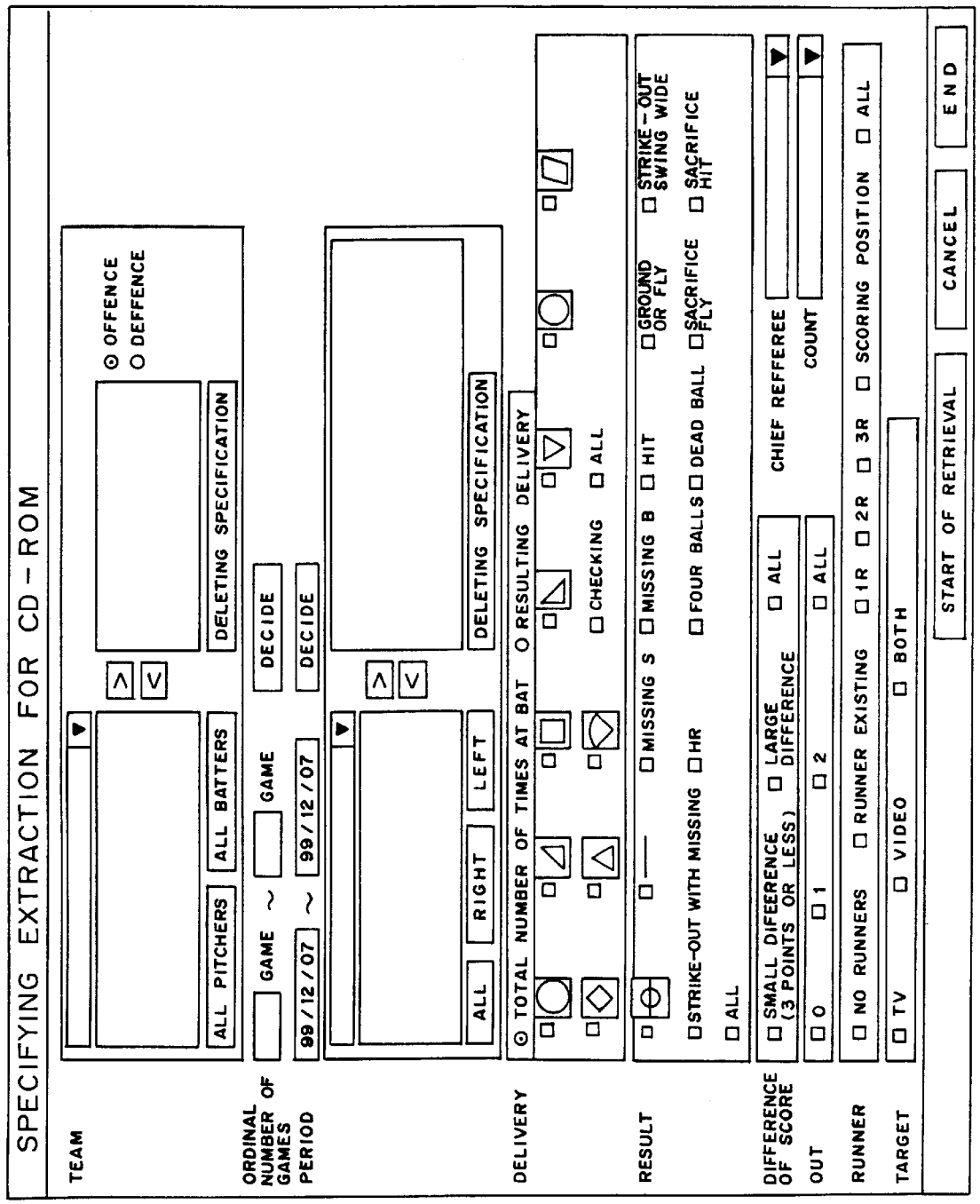
FIG. 15 shows an example of the picture data extraction screen.

FIG. 15 shows an example of the above mentioned picture data extraction screen. The features of the screen are briefly described below.

The retrieval conditions of large segments are linked by 'AND'. That is, the conditions of the 'total number of games', 'period', 'opposing team', 'type of delivery', 'result', 'difference between gained and lost points', 'OUT', 'runner', 'target', 'score', and 'chief referee' are linked with 'AND'. The conditions can be connected with 'OR' when a plurality of conditions can be selected.

The range of the 'total number of games' can be set by pressing the 'decision' button after inputting a value, thereby the input value becomes effective. When the start of the range is not input, the 'first game' is the default. When the end of the range is not input, the current maximum value is the default. When the 'decision' button is pressed, the value of the range of the date depends on the range.

When the range of the 'period' is set, an input value becomes effective after inputting the value and pressing the 'decision' button. When the start of the range is not input, the date of the 'first game' is the default. When the end of the range is not input, the current maximum value is the default. When the 'decision' button is pressed, the range of the 'total number of games' depends on the range.

Upper column of 'opposing team'

An upper column of the 'opposing team' columns contains the name of the team to be extracted. The name of the team can be set using a mouse when a drop-down list is displayed.

When the upper column of the 'opposing team' columns is set, a list of players belonging to the team is displayed in the list box on the left.

When the 'all pitchers' button is pressed, the names of all pitchers belonging to the team are displayed.

When the 'all batters' button is pressed, the names of all players belonging to the team are displayed.

The players are determined by pressing the '>' button after selecting a plurality of players with the names of desired players selected from the list box on the left by pressing the 'shift' key or the 'ctrl' key. When the players are determined, the names of the selected players are moved to the list box on the right.

When a player is selected from the list box on the right, and the '<' button is pressed, the name of the selected player disappears, thereby deleting the selection.

The 'defense/offense' check automatically outputs 'offense' when a fielder is selected, and automatically outputs 'defense' when a pitcher is specified.

The 'defense/offense' check depends on the following rules.

TABLE 1
CONTENTS OF UPPER COLUMNS OF GAME
PLAYER SELECTION COLUMN CHECK COLUMN
FIELDER OFFENSE
PITCHER DEFENSE
FIELDER, PITCHER OFFENSE
BUTTONS OF LOWER COLUMNS OF GAME
MEANINGS OF 'ALL', 'RIGHT', 'LEFT'
ALL PITCHERS, RIGHT-HANDED PITCHERS, LEFT-HANDED PITCHERS
ALL BATTERS, RIGHT-HANDED BATTERS, LEFT-HANDED BATTERS
ALL PITCHERS, RIGHT-HANDED PITCHERS, LEFT-HANDED PITHCERS

Lower column of game columns

The lower portion of the opposing team column contains the name of the opposing team. A list is displayed in the drop-down list box in which the name of a team can be selected and set. A single team or all teams ('all teams' is displayed in the list) can be specified.

When the name of a team is set, a player list is displayed.

When 'offense' is selected in the upper column, the 'all', 'right', and 'left' buttons respectively indicating all pitchers, right-handed pitchers, and left-handed pitchers are displayed in the lower list box.

When 'defense' is selected in the upper column, the 'all', 'right', and 'left' buttons respectively indicating all batters, right-handed batters, and left-handed batters are displayed below the lower list box.

When any of 'all pitchers', 'right' (right-handed pitchers), 'left' (left-handed pitchers), 'all batters', 'right' (right-handed batters) and 'left' (left-handed batters) is pressed, a list of target players is displayed.

A plurality of players are selected from the list on the left with the target players and the 'shift' key or the 'ctrl' key pressed, and then the '>' button is pressed, thereby determining the players.

The '<' button indicates a player to be deleted from the determined players.

Pattern

The 'total number of times at bat' and the 'result of delivery' are expressed in an exclusive format.

When the 'total number of times at bat' is specified, all performances at bat containing a retrieved delivery are extracted.

When the 'result of delivery' is specified, only a retrieved delivery is extracted.

Columns of 'type of delivery', 'result', 'difference between gained and lost points', 'OUT', 'runner', 'target', and 'chief referee'

The type of delivery to be extracted is selected in the 'type of delivery' column. A plurality of types can be selected.

A result to be extracted is selected in the 'result' column. A plurality of results can be selected.

A difference between gained and lost points (in the process of the game) is selected in the 'difference between gained and lost points' column. For example, a 'small difference' refers to 3 or smaller points, and a 'large difference' refers to 4 or larger points.

An out count to be extracted is selected in the 'OUT' column.

Runner information to be extracted is selected in the 'runner' column. The 'scoring position' refers to a runner at the second base and/or the third base. A plurality of positions can be selected.

A target to be extracted (TV picture or video picture, or both of them) can be selected in the 'target' column.

The name of a chief referee to be extracted is selected in the 'chief referee' column. Either a specific chief referee of all referees can be selected.

When the 'start of retrieval' button is pressed, the picture extracting process is performed. When the data cannot be contained in one sheet of CD, then the message is output.

The extracting process can be canceled by pressing the 'cancel' button.

The 'termination' button terminates the present screen.

(c3) The retrieval condition depending on the request of a user who requests to view data (to whom the CD-ROM is to be distributed) is appropriately input on the picture data extraction screen.

(c4) When the retrieval condition is completely input, the 'start of retrieval' button is pressed on the picture data extraction screen. Then, the picture data satisfying various retrieval conditions input as described above is extracted from the picture database (FIGS. 1 and 13) stored in the picture management server 11. In this case, the picture file (animation file) and the record itself of the picture database storing the files are extracted as files.

(c5) The total volume of the extracted picture data is computed. If the total volume can be contained in one sheet of CD-ROM, then the extraction result screen (normal termination) is displayed. If the total volume cannot be contained in one sheet of CD-ROM, then the extraction result screen (abnormal termination) is displayed.

Figure 16:
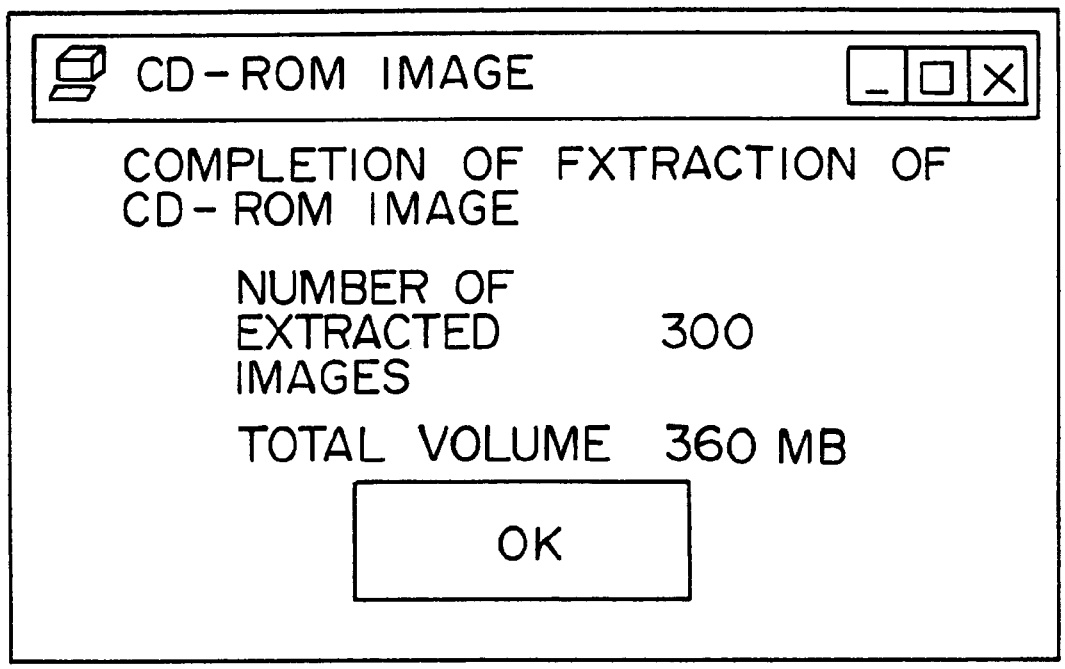
FIG. 16 shows an example of the extraction result screen (normal termination)
Figure 17:
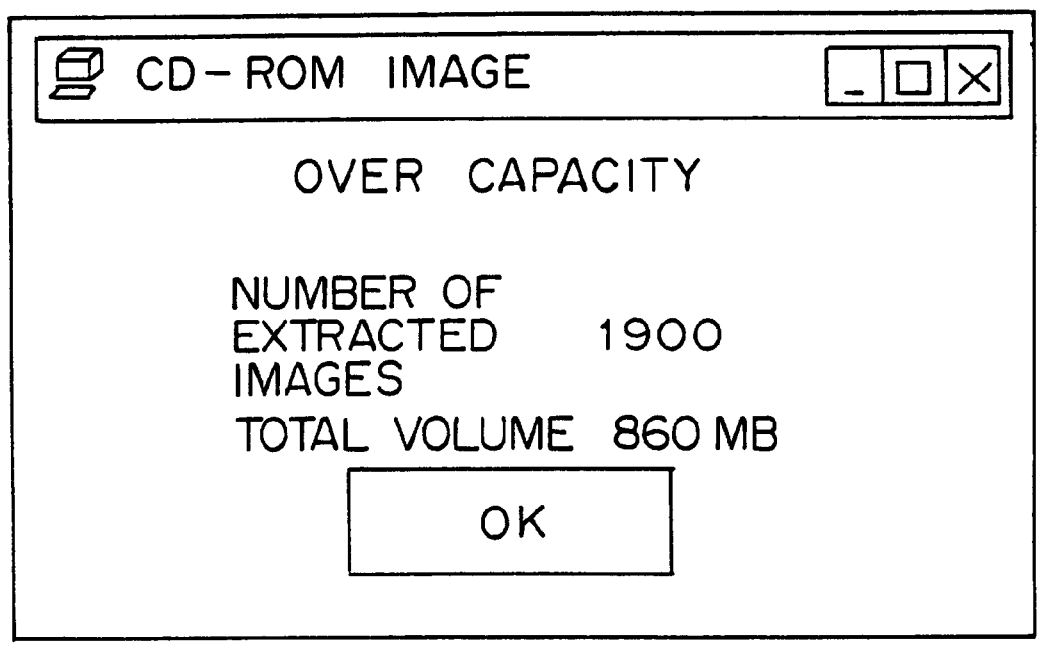
FIG. 17 shows an example of the extraction result screen (abnormal termination)

FIG. 16 shows an example of the above mentioned extraction result screen (normal termination). FIG. 17 shows an example of the above mentioned extraction result screen (abnormal termination).

(c6) When the 'OK' button is pressed on the extraction result screen (normal termination), the retrieval condition for the retrieving process is stored as a file with the extracted picture data (image file) in the CD-R. Thus, the CD-ROM (CD-ROM 8 shown in FIG. 2) for retrieval and view at a request of a user (to be provided with the CD-ROM) requesting to view data can be obtained.

The retrieval condition for the retrieving process is stored so that the retrieval condition not corresponding to the picture data in the CD-ROM cannot be placed when data is retrieved in the CD-ROM.

(c7) When the above mentioned extraction result screen (abnormal termination) is displayed, control is returned to the above mentioned picture data extraction screen (FIG. 15) by pressing the 'OK' button. Thus, the retrieval condition can be input again to extract data again.

Then, the CD-ROM obtained as described above is distributed to the user requesting to view data, and the user can retrieve and view the data. The required practical operation procedure is described below.

(d1) When the distributed CD-ROM is set in the personal computer 10 (in (E) in FIG. 2) for use in viewing data, a retrieval program is automatically activated. Otherwise, the retrieval program can be activated by double clicking an activation file using an explorer.

Figure 18:
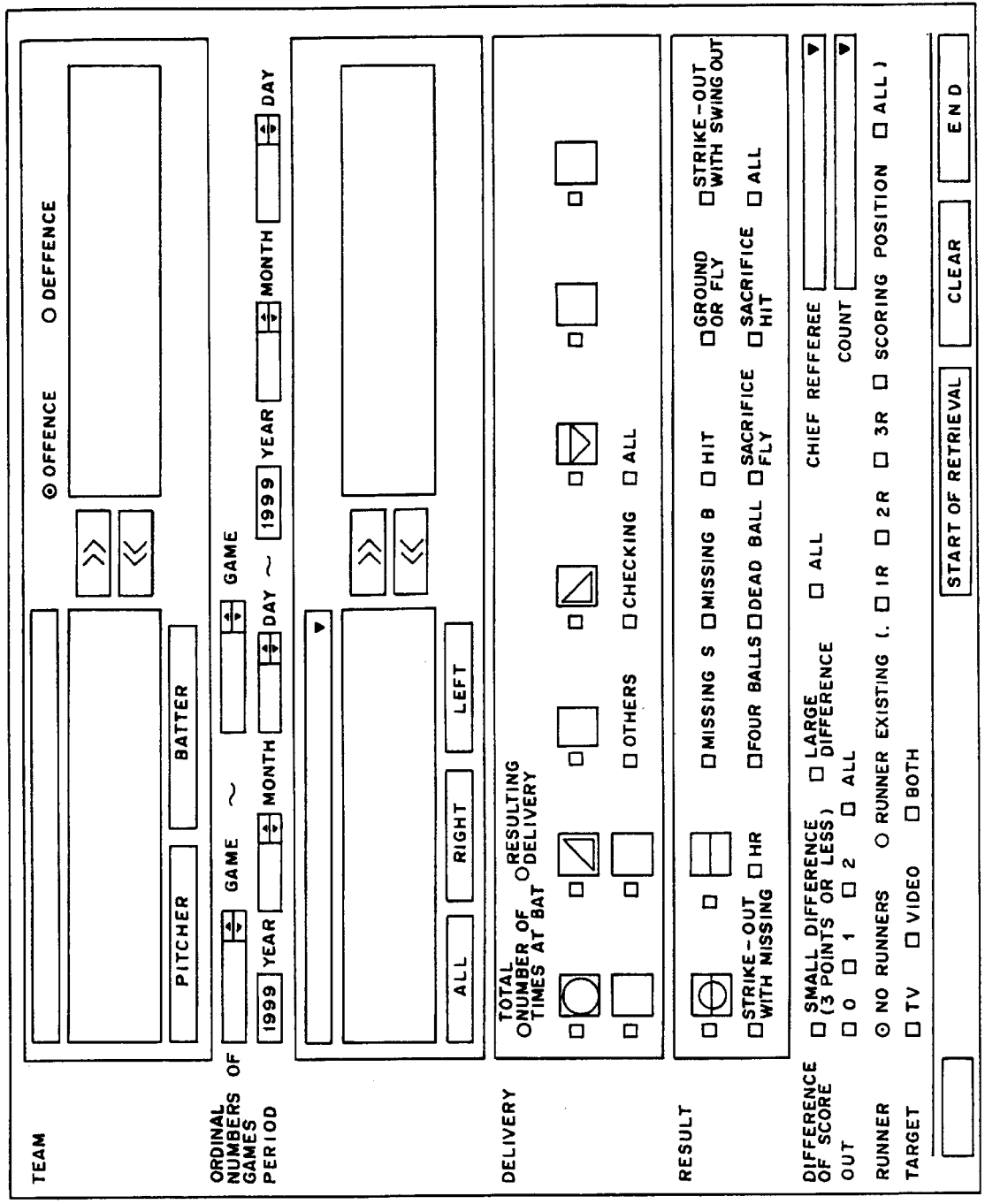
FIG. 18 shows an example of the picture retrieval screen.

(d2) When the retrieval program is activated, the picture retrieval screen is displayed first. FIG. 18 shows an example of the picture retrieval screen.

On this screen, various retrieval conditions can be input. Basically, it is the same as the picture data extraction screen shown in FIG. 15. Therefore, the detailed explanation of this screen is omitted here. However, the initial value of the retrieval condition on the picture retrieval screen reflects a condition set when the CD-ROM is generated. Furthermore, to prevent a picture file not existing in the CD-ROM when the retrieving process is performed from being specified, the condition not set when the CD-ROM is generated is masked on the above mentioned picture retrieval screen.

(d3) When the picture retrieval screen (FIG. 18) is displayed, a desired retrieval condition is input, and finally the 'start of retrieval' button is pressed. Then, the retrieving process is performed, and the retrieval result number screen indicating the number of retrieval results is displayed.

Figure 19:
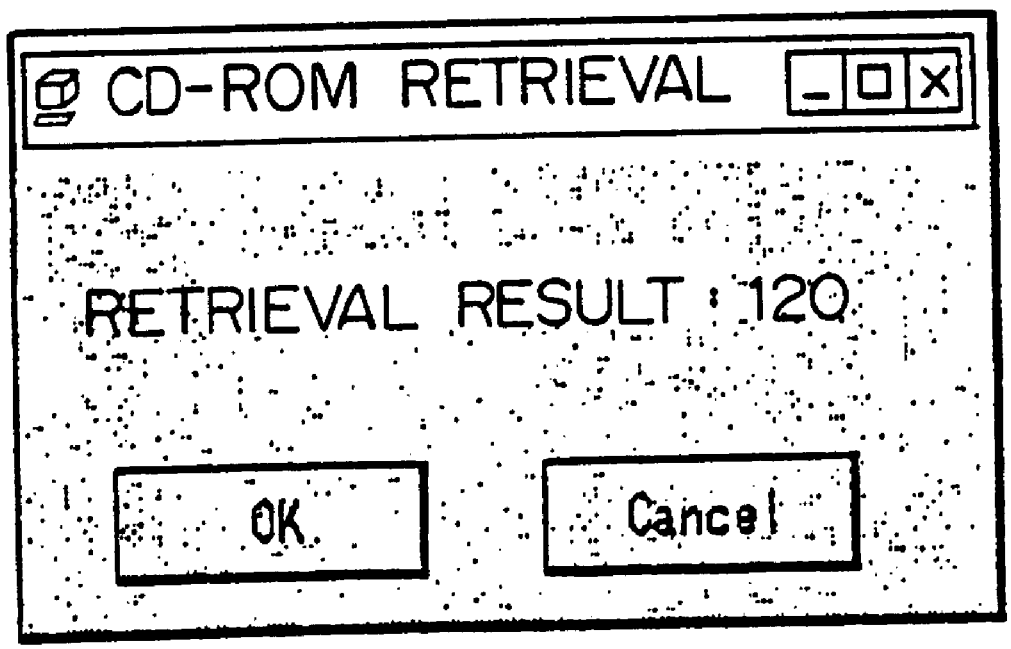
FIG. 19 shows an example of the retrieval result number screen.

FIG. 19 shows an example of the above mentioned retrieval result number screen. The total number of retrieval results is displayed on the screen.

(d4) If it is determined that the number of retrieval results is too large to be displayed in a list after confirming the number of retrieval results on the above mentioned retrieval result number screen, then the 'cancel' button is pressed. Since control is returned to the above mentioned picture retrieval screen (FIG. 18), the retrieving process can be performed again by further adding a retrieval condition.

(d5) If it is determined that the number of retrieval results is appropriate after confirming the number of retrieval results on the above mentioned retrieval result number screen (FIG. 19), then the 'OK' button is pressed. As a result, a retrieval result list screen is displayed.

FIG. 20 shows an example of the retrieval result list screen. The features of the screen are briefly described below.

The retrieval result list shows a result for each delivery.

The relationship between the 'replay' button and the 'continuous replay' button is described below.

When a plurality of pictures are checked,

'replay' button—All checked pictures are continuously replayed.

'continuous replay' button—The pictures are sequentially replayed from the highest order picture in the checked pictures.

When only one picture is checked,

'replay' button—Checked pictures are replayed.

'continuous replay' button—All checked pictures are sequentially replayed.

When the 'clear' button is pressed, the check is all deleted.

When the 're-retrieval' button is pressed, the present screen is closed, and the picture retrieval screen (FIG. 18) is displayed again.

Figure 21:
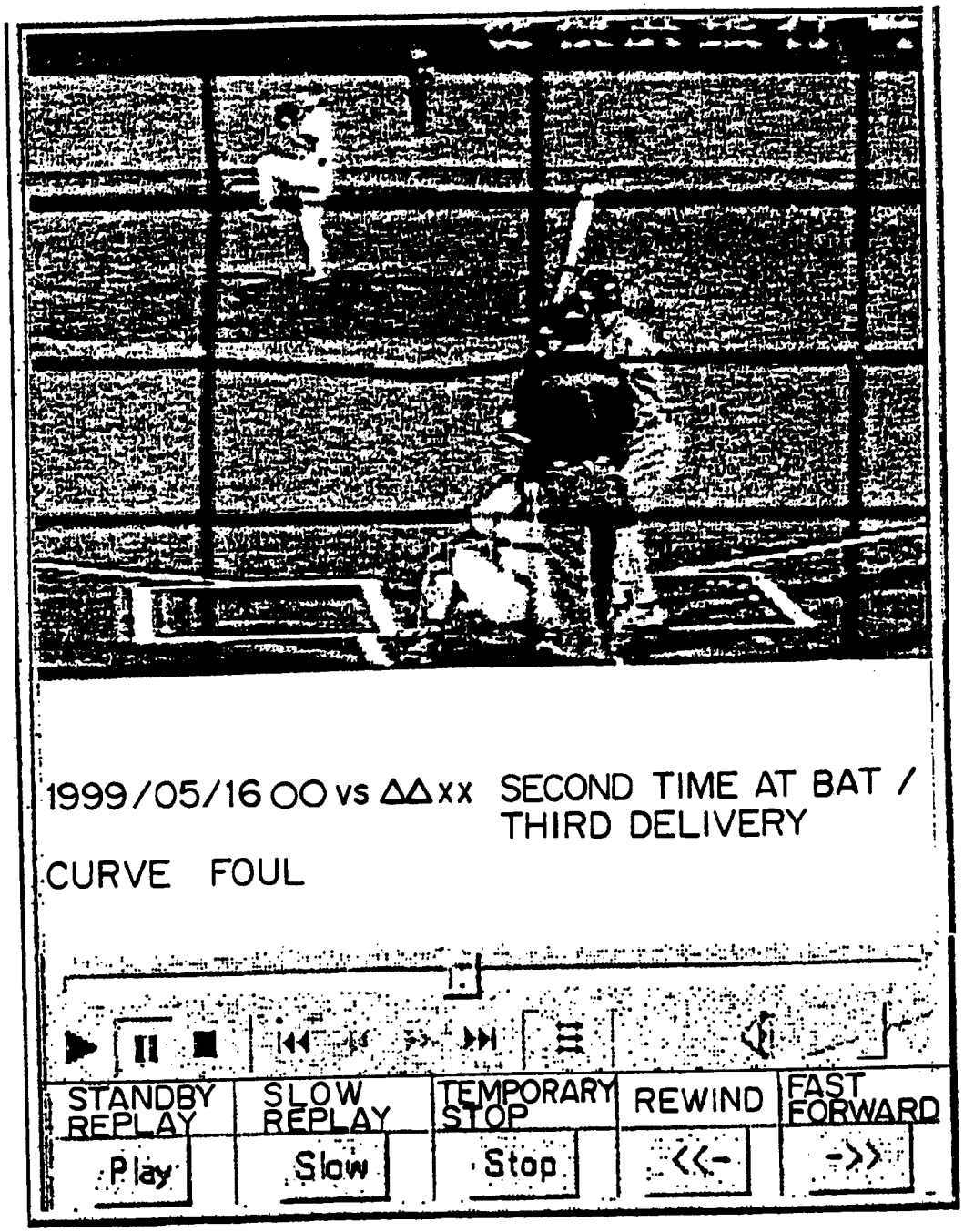
FIG. 21 shows an example of the picture display screen.

(d6) A desired scene is selected (checked) on the above mentioned retrieval result list screen (FIG. 20), the 'replay' or 'continuous replay' button is pressed, and a corresponding picture is replayed. FIG. 21 shows an example of the picture display screen.

In FIG. 21, the 'play' button starts a replaying process, the 'slow' button starts a slow replaying process (the speed is fixed), the 'stop' button temporarily stops the replaying process, the '<<-' button returns scenes, the '->>' button forwards scenes. The slow replaying process and the scene returning/forwarding process are controlled at predetermined time intervals.

As described above, a user requesting to view data can retrieve and view a desired picture using the distributed CD-ROM.

Figure 22:
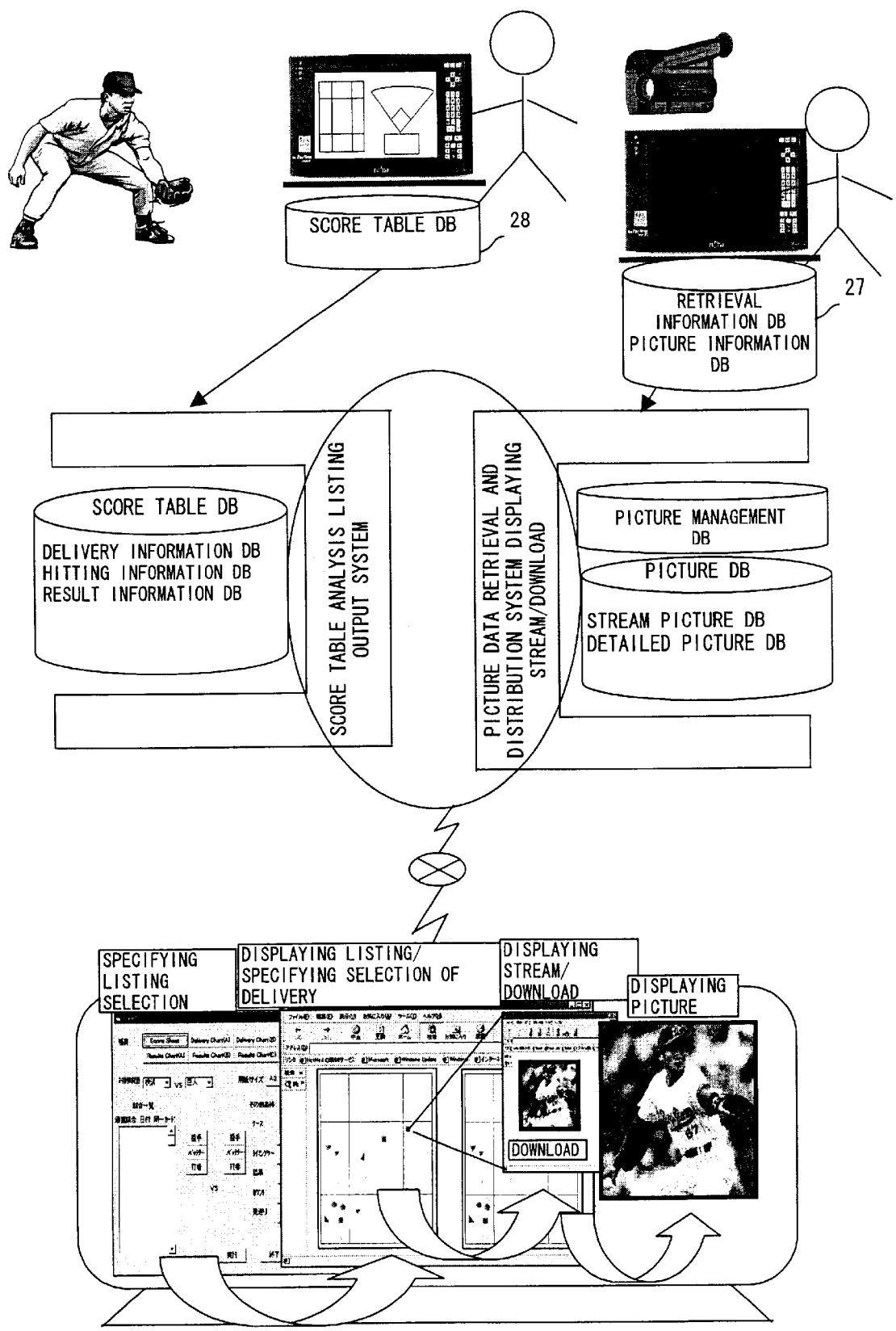
FIG. 22 shows an entire system image of the picture data process system according to an embodiment of the present invention.
Figure 23:
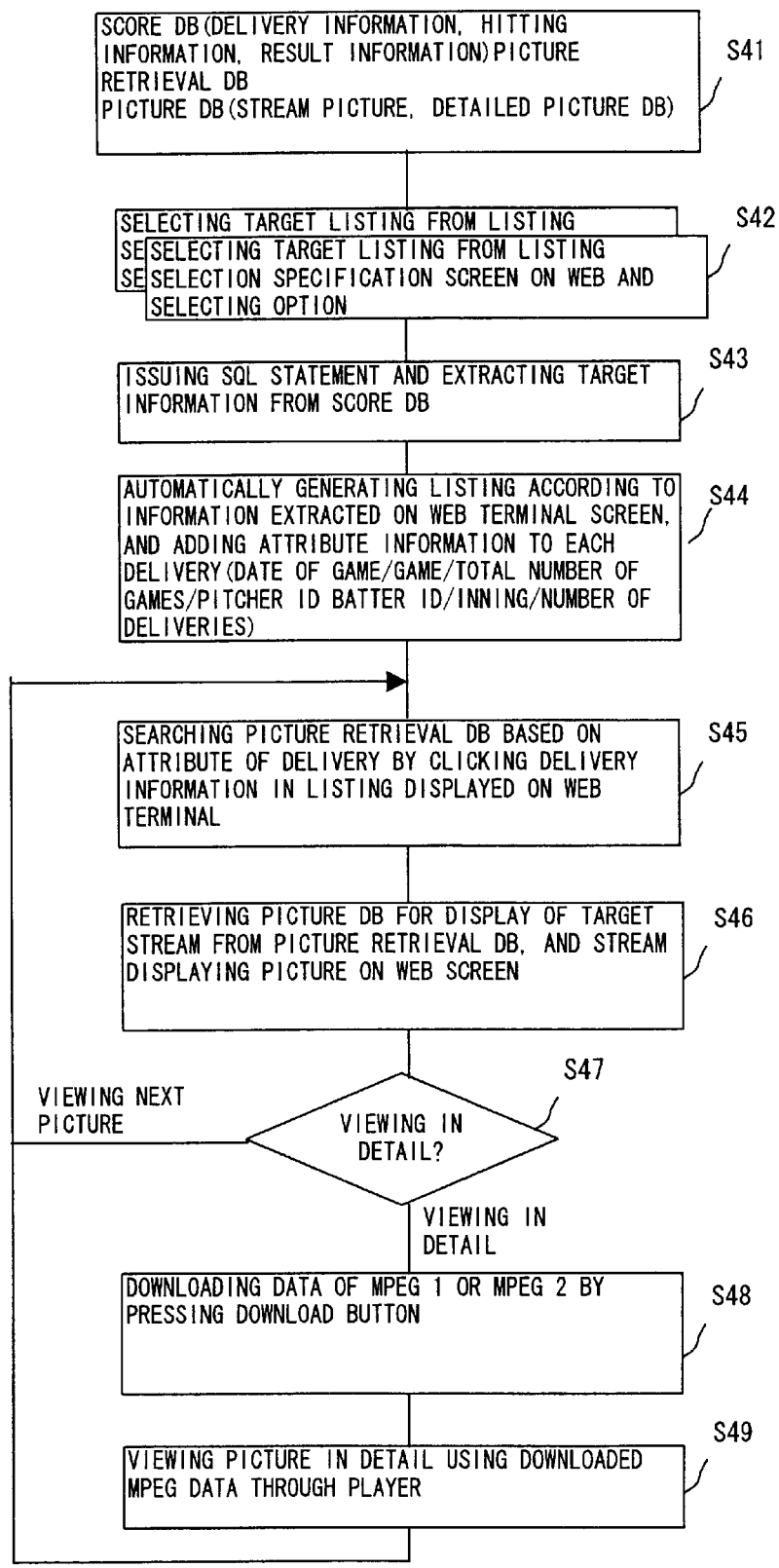
FIG. 23 is a flowchart of the operation procedure of retrieving and viewing picture data through Internet according to an embodiment of the present invention.

The process of retrieving and viewing picture data (refer to (e) above) through Internet (or Intranet) according to an embodiment of the present invention is described below. FIG. 22 shows the entire system image of the embodiment.

In the example shown in FIG. 22, a picture database 27 (same as the picture database 7 shown in FIG. 1) containing the picture data and the retrieval data as described in (a) and (b) above is generated in advance, and the score information (delivery information, hitting information, result information, etc.) is input using the personal computer 13, etc. shown in FIG. 2, thereby generating a score table database 28 and assigning the link information to the data for each delivery.

Using the two types of picture databases 27 and 28, the retrieving and viewing process through Internet or Intranet can be performed. That is, in the Internet/Intranet environment, a desired analysis listing screen is displayed based on the above mentioned score table database 28 by specifying it on the browser screen. In this case, at the specification and according to the score information, an analysis listing indicating analysis result information is automatically generated and displayed. In addition, the attribute information (for example, the course of a ball, the type of delivery, result information, the state of a game, etc.) is assigned to each delivery shown in this analysis listing, the information is edited into graphics and displayed, and is linked with the corresponding picture data in the score table database 28.

When a desired delivery is specified on the listing screen, the picture data linked according to the attribute information about the delivery is extracted from the picture database 27 and downloaded for display.

The practical operation procedure in this case is described below by referring to 23.

(e1) First, as shown in FIG. 22, the picture database 27 containing the picture data and the retrieval data, and the score table database 28 containing the store information (delivery information, hitting information, result information, etc.) are generated (step S41). The picture data stored in the picture database 27 contains the stream picture data for brief display of a picture, and the detailed picture data for detailed display of a picture.

For information, FIGS. 24 through 26 show an example of each file format of a delivery information database, a hitting information database, and a result information database forming the above mentioned score table database 28. An example of the file format of the picture database 27 has already been shown in FIG. 7.

(e2) The listing selection specification screen is displayed on the Web terminal screen. On this screen, a target listing is selected, and other conditions are selected as necessary (step S42).

Figure 27:
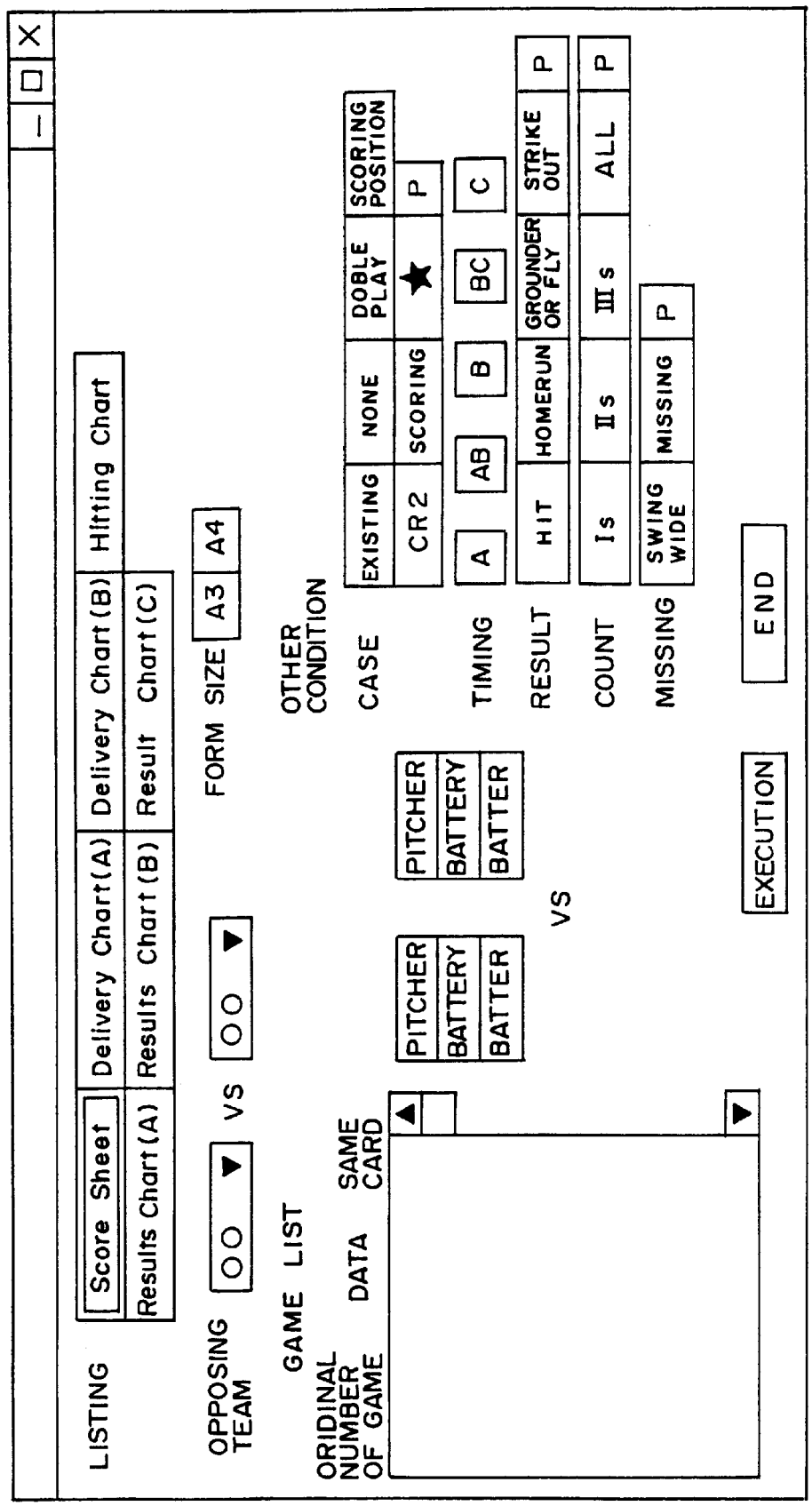
FIG. 27 shows an example of the listing selection specification screen.

FIG. 27 shows an example of the above mentioned listing selection specification screen. This screen is provided with seven listing selection buttons, that is, 'score sheet', 'results chart (A)', 'results chart (B)', 'results chart (C)', 'delivery chart (A)', 'delivery chart (B)', and 'hitting chart' buttons. From the seven buttons, a desired button can be selected. Each listing is briefly described below.

Figure 28:
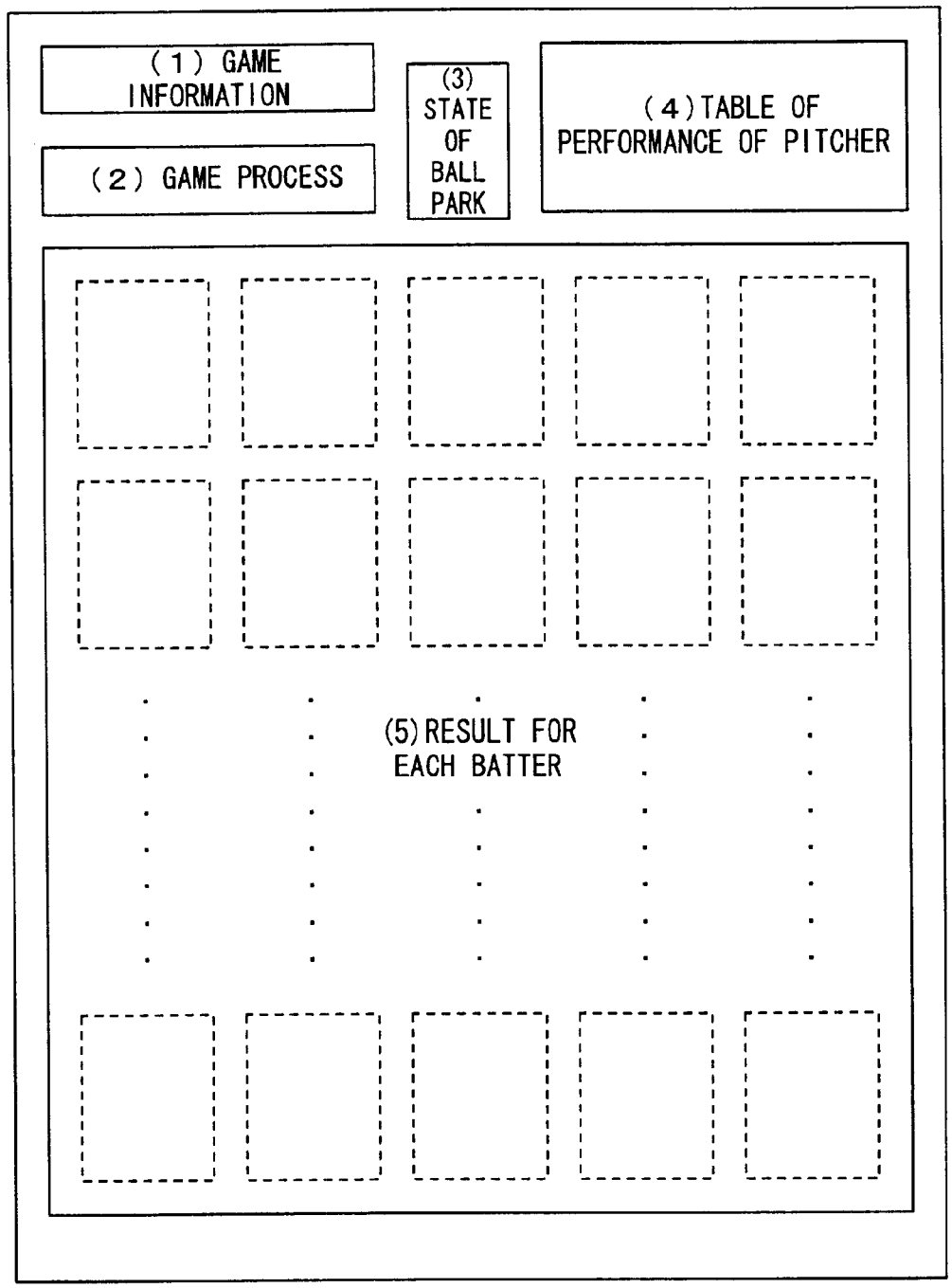
FIG. 28 shows an example of a score table which is one of the listings.

A 'score sheet' refers to a score table, and FIG. 28 shows an example. In this listing, game information, a scoring process, the state of a ball park, the performance of a pitcher, results for each batter, etc. are displayed.

Figure 29:
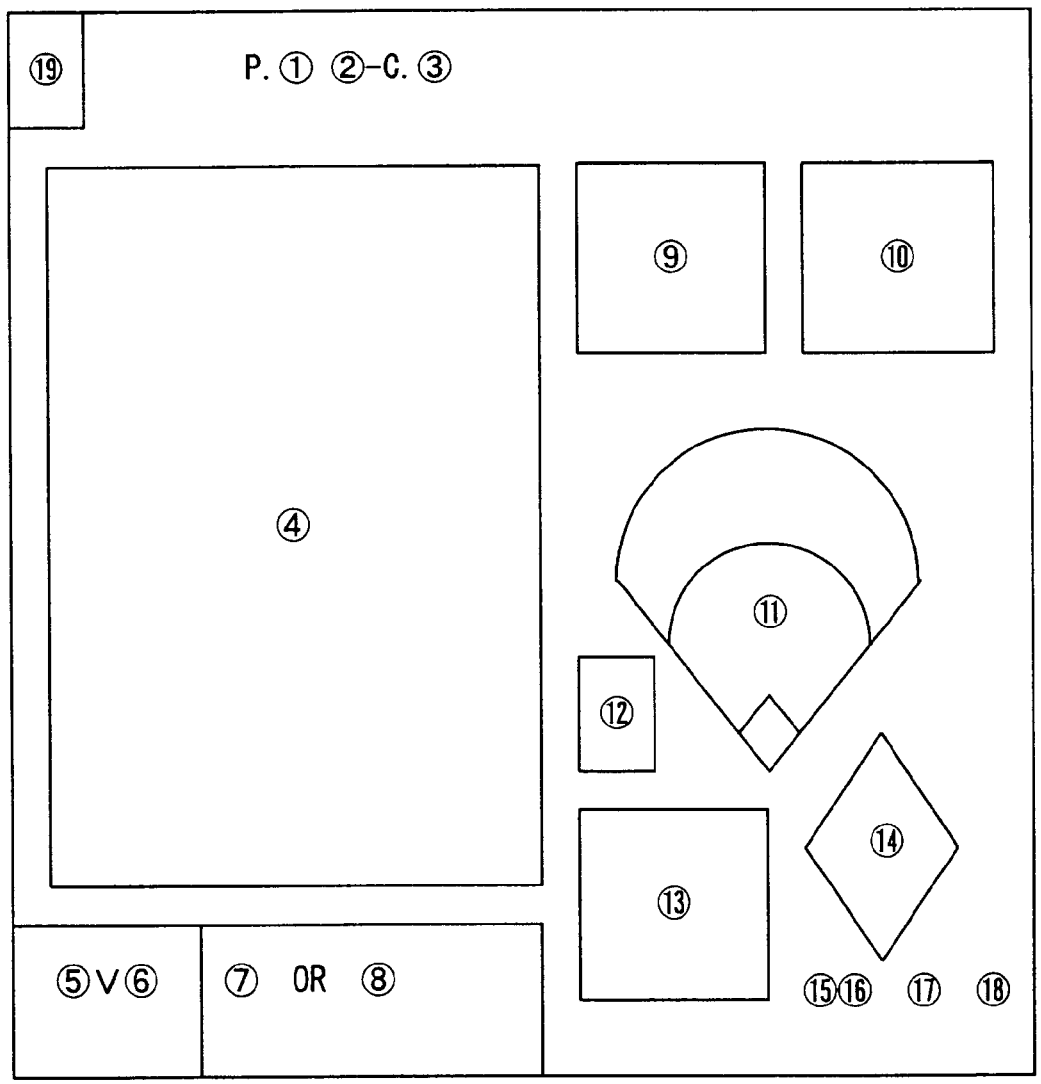
FIG. 29 shows an example of the format of a result for each batter.

FIG. 29 shows an example of the format of the results for each batter. FIG. 29 shows 1. type of pitcher (right- or left-handed), 2. name of pitcher, 3. name of catcher, 4. delivery table, 5. score of offense, 6. score of defense, 7. out count, 8. runner position, 9. defense player replacement information, 10. strategy, checking pitch information, 11. hitting direction, 12. number of pitches, 13. offense player replacement information, 14. runner, stealing, score information, 15. batting order, 16. type of batter (right- or left-handed), 17. name of batter, 18. contents of batting, and 19. innings.

'Results chart (A)' refers to a table of delivery for each count expressed by graphics. FIG. 30 shows an example of the table. This listing contains in graphics a table of delivery for each count, memorandum, pitch number statistic table, outsider/insider statistic table, hitting direction view, delivery distribution view, delivery result view, etc.

Figure 31:
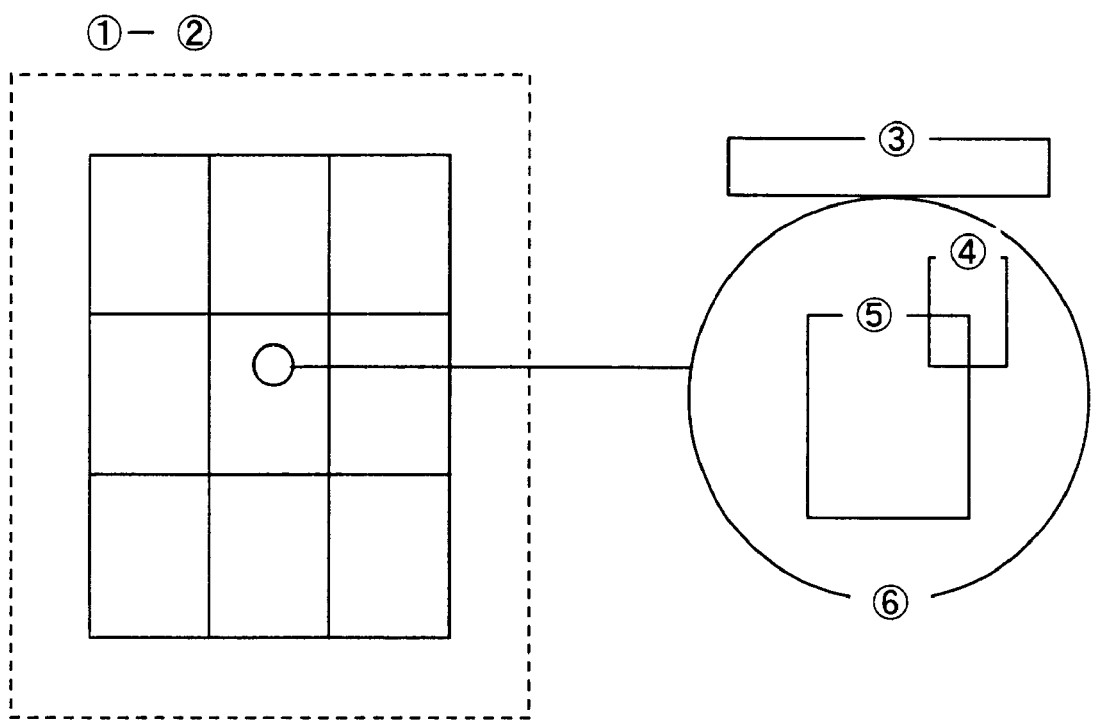
FIG. 31 shows an example of a format of a delivery table for each count.
Figure 32:
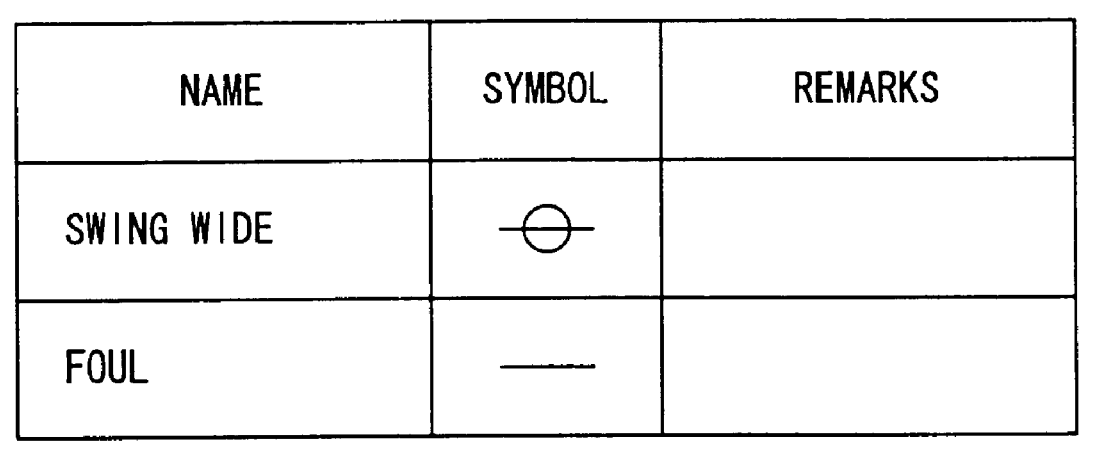

The above mentioned table of delivery for each count is output for all deliveries to a specified batter for each count in the format as shown in FIG. 31. FIG. 31 shows 1. strike count, 2. ball count, 3. swing wide and foul symbols, 4. number of fouls after 2 strikes, 5. identification number, and 6. delivery symbol. In FIG. 31, the rectangle by broken lines indicates a ball zone, and the inside rectangle by solid lines indicates a strike zone. The strike zone is divided into nine parts depending on the position of a delivered ball (high/middle/low and inside/center/outside). The delivery symbol is positioned corresponding the actual delivery position. For example, the lower left area in the strike zone refers to the position of a low insider, and the upper right area refers to a higher outsider. FIG. 32 shows an example of a swing wide symbol and a foul symbol used in the table of delivery for each count (FIG. 31), and FIG. 33 shows an example of a delivery symbol.

Figure 34:
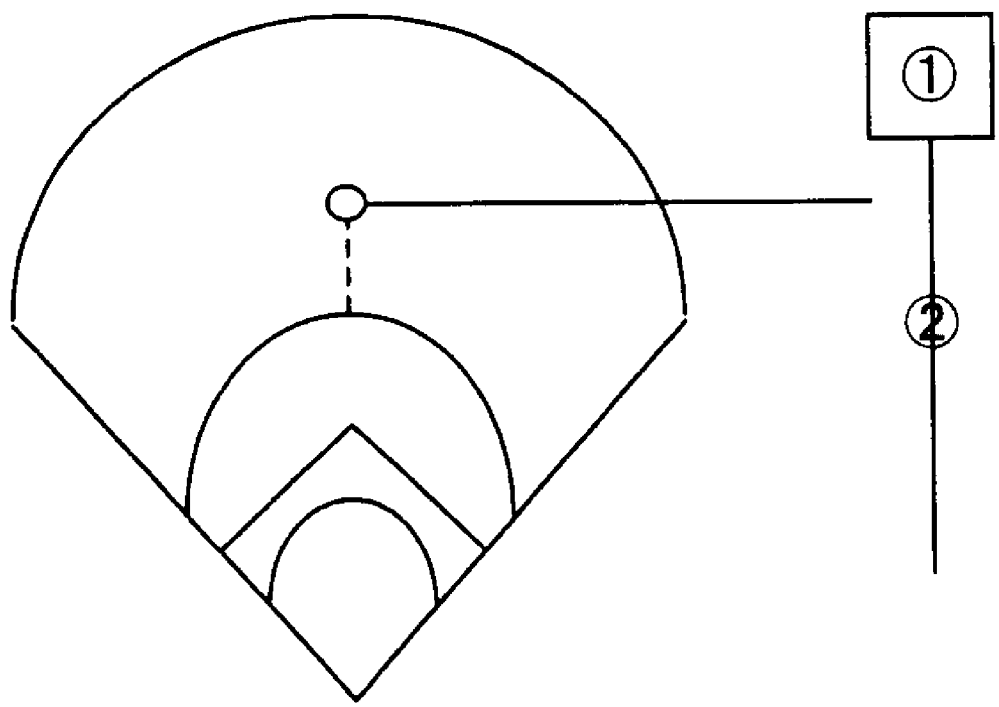
FIG. 34 shows an example of the format of a hitting direction.

The above mentioned hitting direction view shows the hitting information in the format shown in FIG. 34, for example. FIG. 34 shows 1. a delivery symbol, and 2. a hitting locus. An example of a delivery symbol is shown in FIG. 33. FIG. 35 shows an example of a hitting locus.

Figure 36:
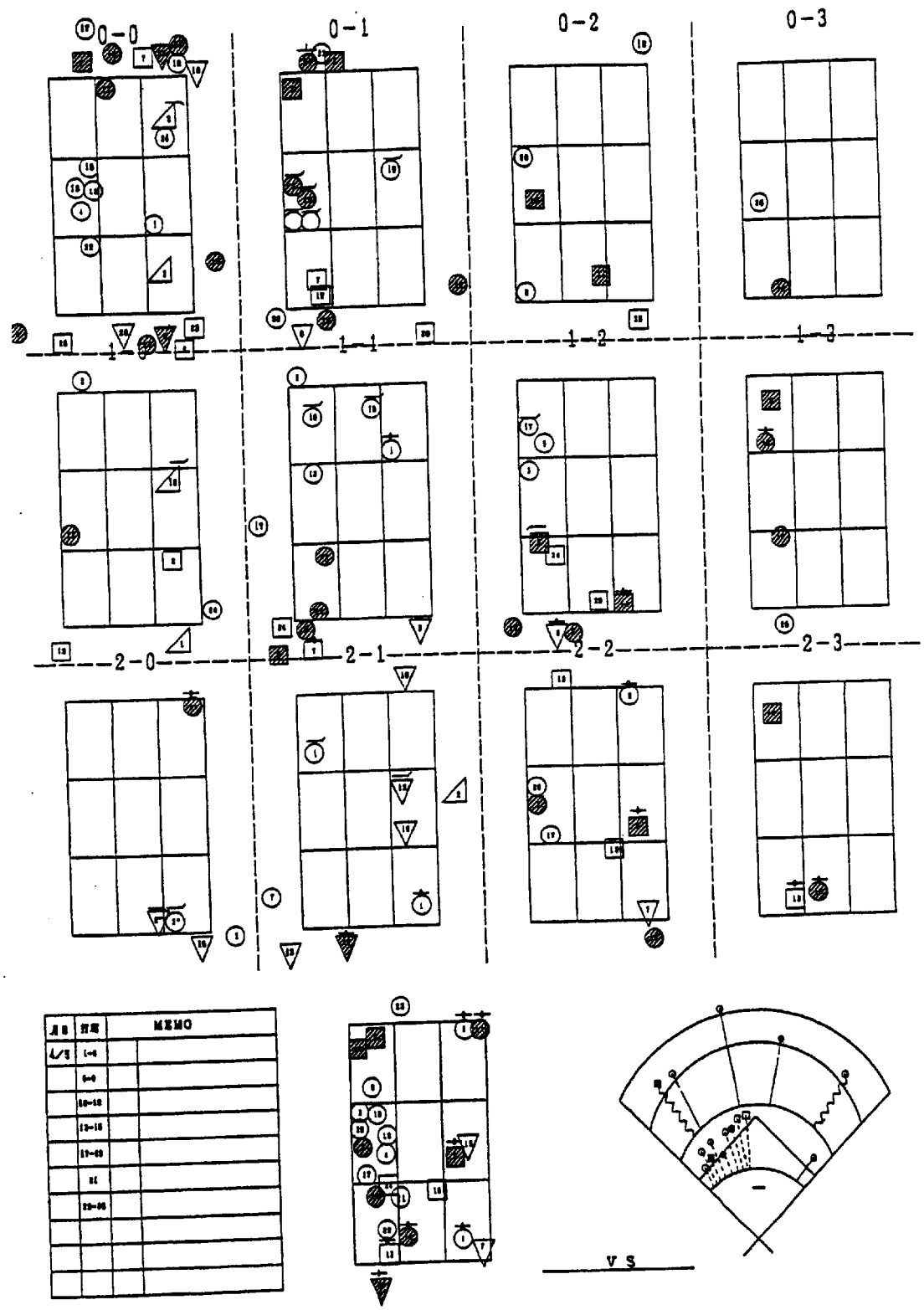
FIG. 36 shows a practical example of the delivery table for each count.
Figure 37:
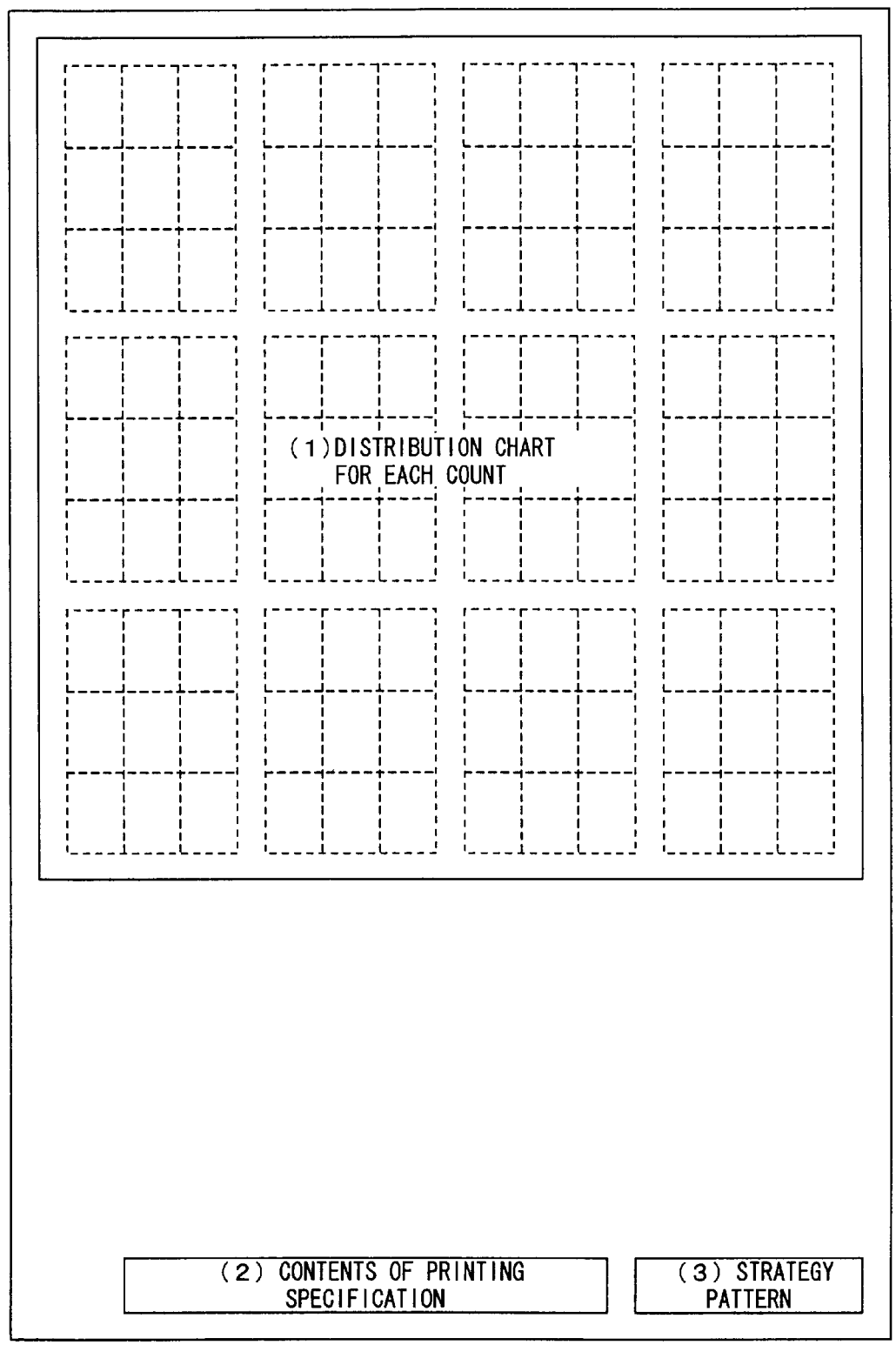
FIG. 37 shows an example of the delivery table for each count (expressed as a distribution chart) which is one of the listings.

FIG. 36 shows a practical example of a table of delivery for each count in the format shown in FIG. 31. As clearly shown in FIG. 36, the attribute information (course, type, and result, etc. of a delivery) is edited and displayed in graphics for each delivery. The attribute information in this case especially refers to the course of a pitched ball (delivery course), and it is desired that one or more of type of delivery, result information, and state of play are contained in the information.

'Results chart (B)' refers to a list of delivery for each count expressed as a distribution chart. The listing shows, for example, the contents of all deliveries to a specified batter for respective counts.

Figure 38:
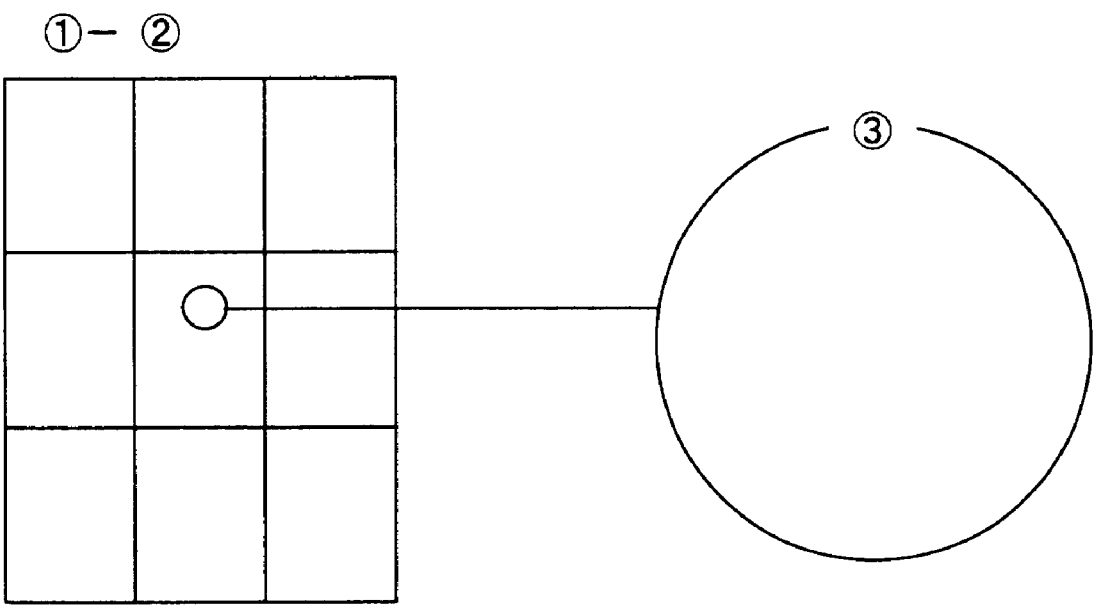
FIG. 38 shows an example of the format of a distribution chart.

Each of the above mentioned distribution charts showing the type of delivery with the position information to a specified batter for each count is output in the format shown in FIG. 38. In FIG. 38, 1 indicates a strike count, 2 indicates a ball count, and 3 indicates a delivery symbol.

Figure 39:
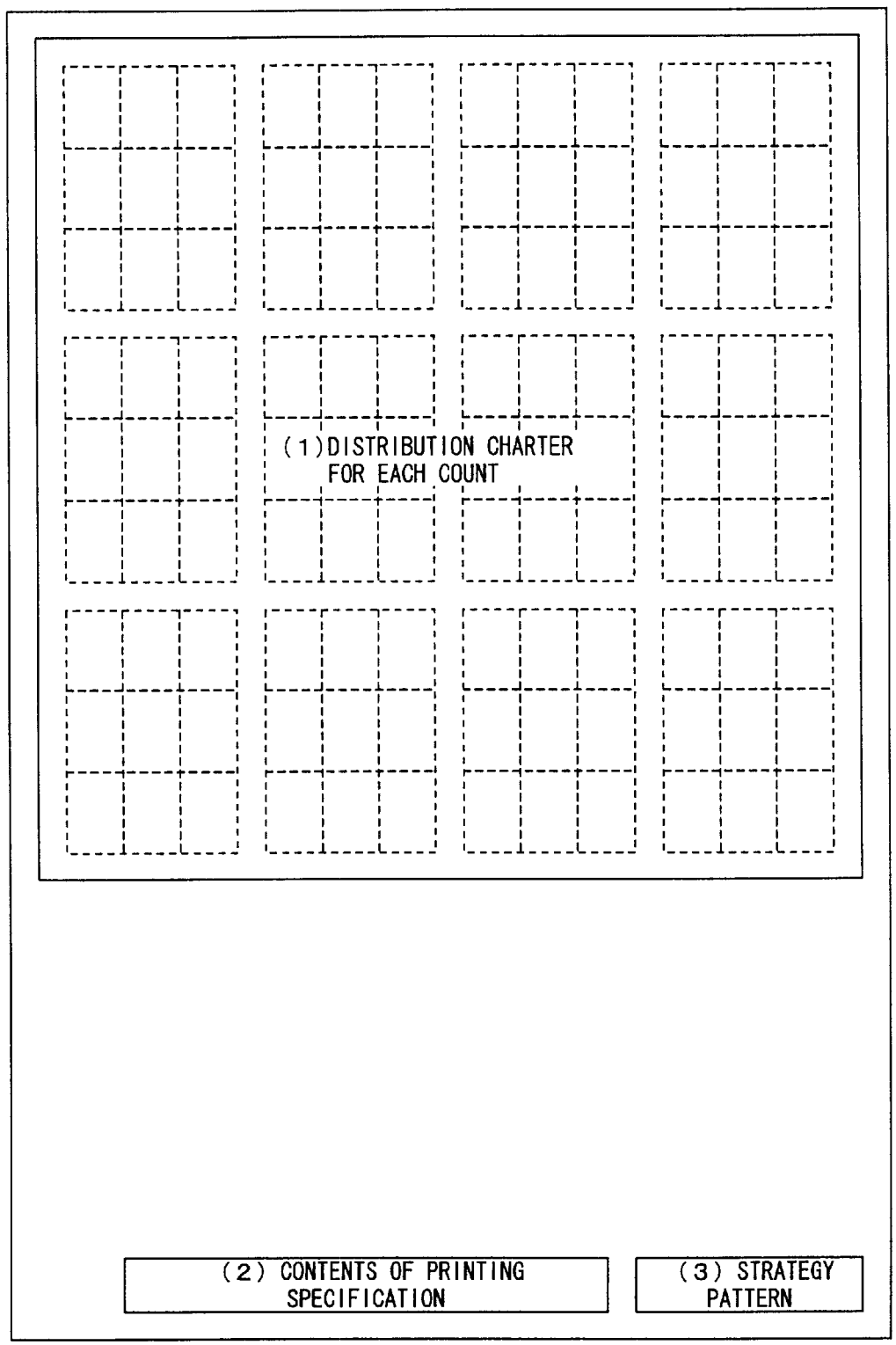
FIG. 39 shows an example of the delivery table for each count (expressed as a statistic chart) which is one of the listings.

'Results chart (C)' refers to a list of delivery for each count expressed as a statistic chart. FIG. 39 shows an example of the list. The list displays the contents of all deliveries to a specified batter for respective counts.

Figure 40:
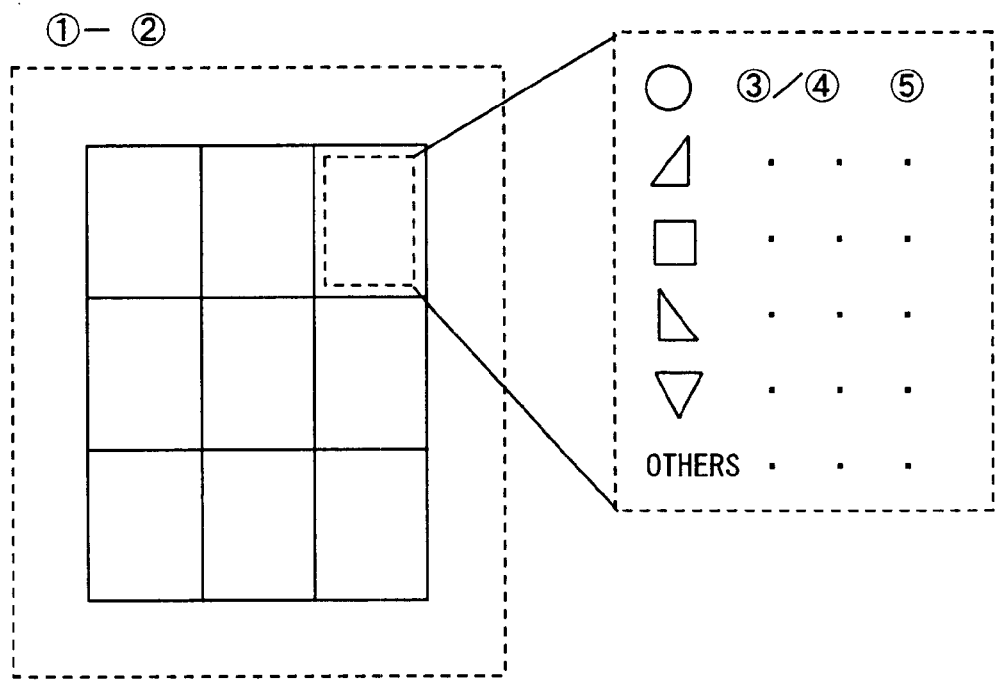
FIG. 40 shows an example of the format of a statistic table.

The above mentioned statistic table indicating the ratio of each type of delivery of for each delivery count in the format shown in FIG. 40, for example. In FIG. 40, 1 indicates a strike count, 2 indicates a ball count, 3 indicates the number of identical type of delivery in the same area, 4 indicates the number of deliveries in the same area, and 5 indicates the rate of delivery.

Figure 41:
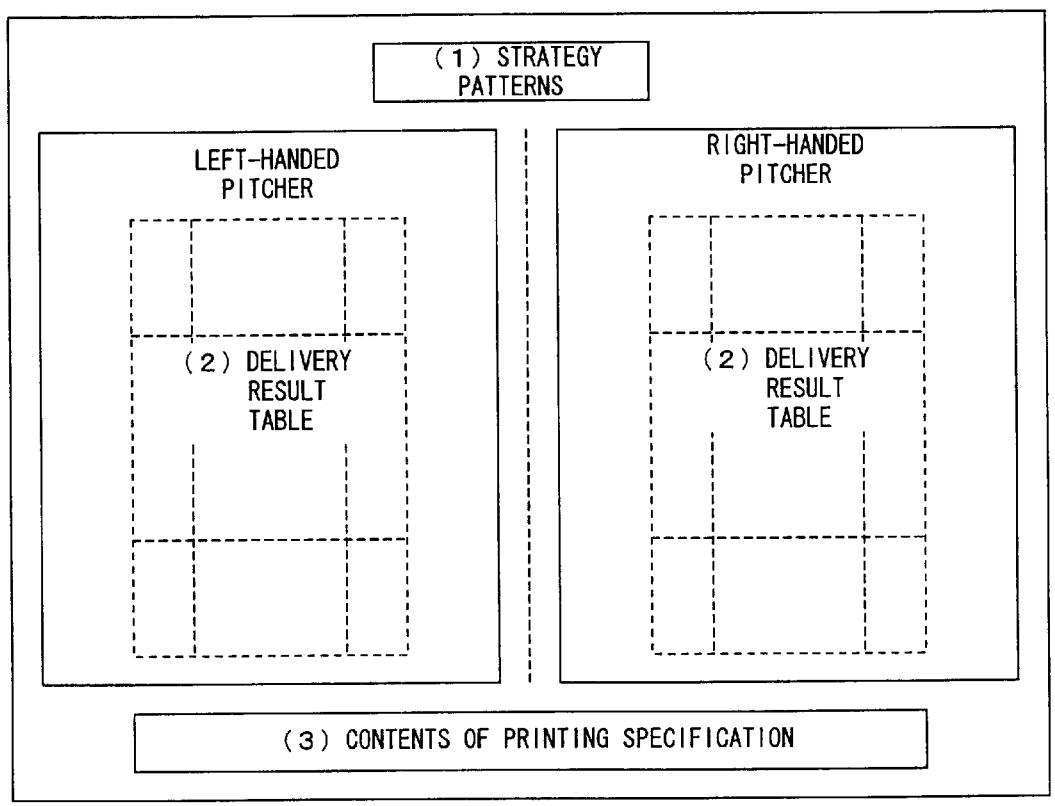
FIG. 41 shows an example of the general result table for each batter (for meetings) which is one of the listings.

'Delivery chart (A)' refers to a general result list for each batter for meetings. FIG. 41 shows an example. This listing shows, for example, ten pitchers who have played for a larger number of innings in a specified game pattern (pitcher to batter), and the results of the deliveries of right-handed pitchers/left-handed pitchers to each batter.

Figure 42:
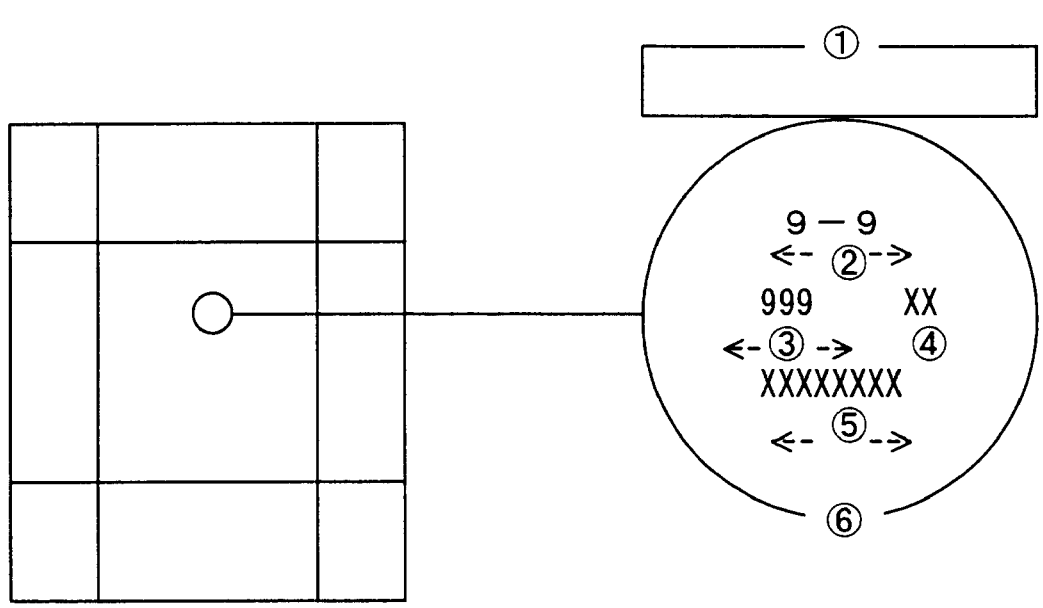
FIG. 42 shows an example of the format of a delivery result table.

The above mentioned delivery result list showing the delivery results to batters of other teams when a pitcher of the team of the user is selected, and the delivery results from pitchers of other teams when a batter of the team of the user is selected is output in the format shown in FIG. 42, for example. FIG. 42 shows 1. swing wide and foul symbols, 2. batting count, 3. player number (batter, pitcher), 4. timing (BC,C), 5. final result, and 6. delivery symbol.

'Delivery chart (B)' refers to a general result list for each batter for use by a coach. FIG. 43 shows an example. The listing shows, for example, ten pitchers who have played for a larger number of innings in a specified game pattern (pitcher to batter), and the general results of the deliveries and the personal results of deliveries.

Figure 44:
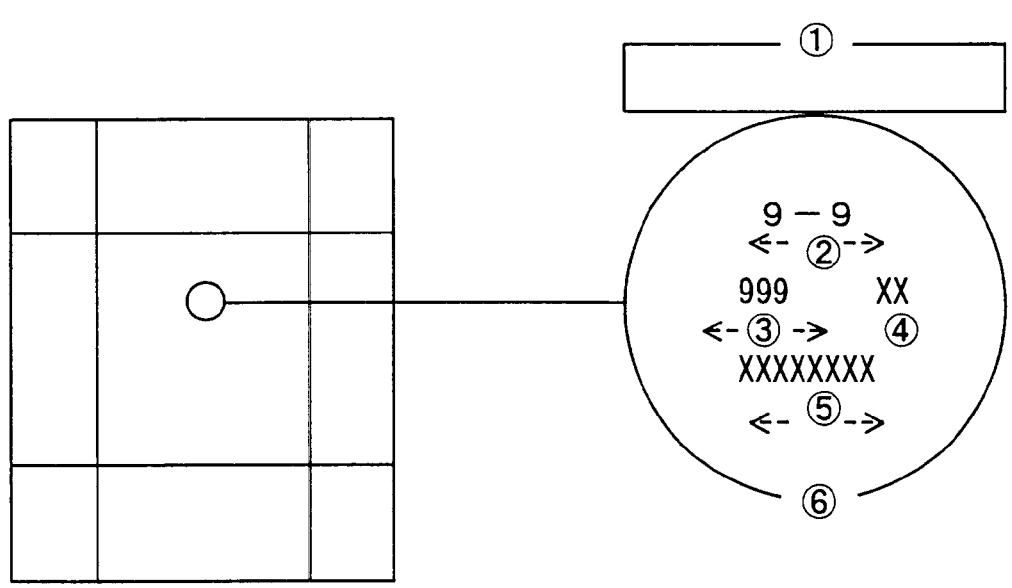
FIG. 44 shows an example of the format of a general delivery result table.

The above mentioned delivery result list showing the delivery results to batters of other teams when a pitcher of the team of the user is selected, and the delivery results from pitchers of other teams when a batter of the team of the user is selected is output in the format shown in FIG. 44, for example. FIG. 44 shows 1. swing wide and foul symbols, 2. batting count, 3. player number (batter, pitcher), 4. timing (BC,C), 5. final result, and 6. delivery symbol.

The above mentioned delivery result list showing the delivery results of pitchers of the team of the user when a batter of another team is selected, and the delivery results to the batters of the team of the user when a pitcher of another team is selected is output in the format shown in FIG. 45, for example. FIG. 45 shows 1. player number, 2. player name, 3. swing wide and foul symbols, and 4. delivery symbol.

Figure 46:
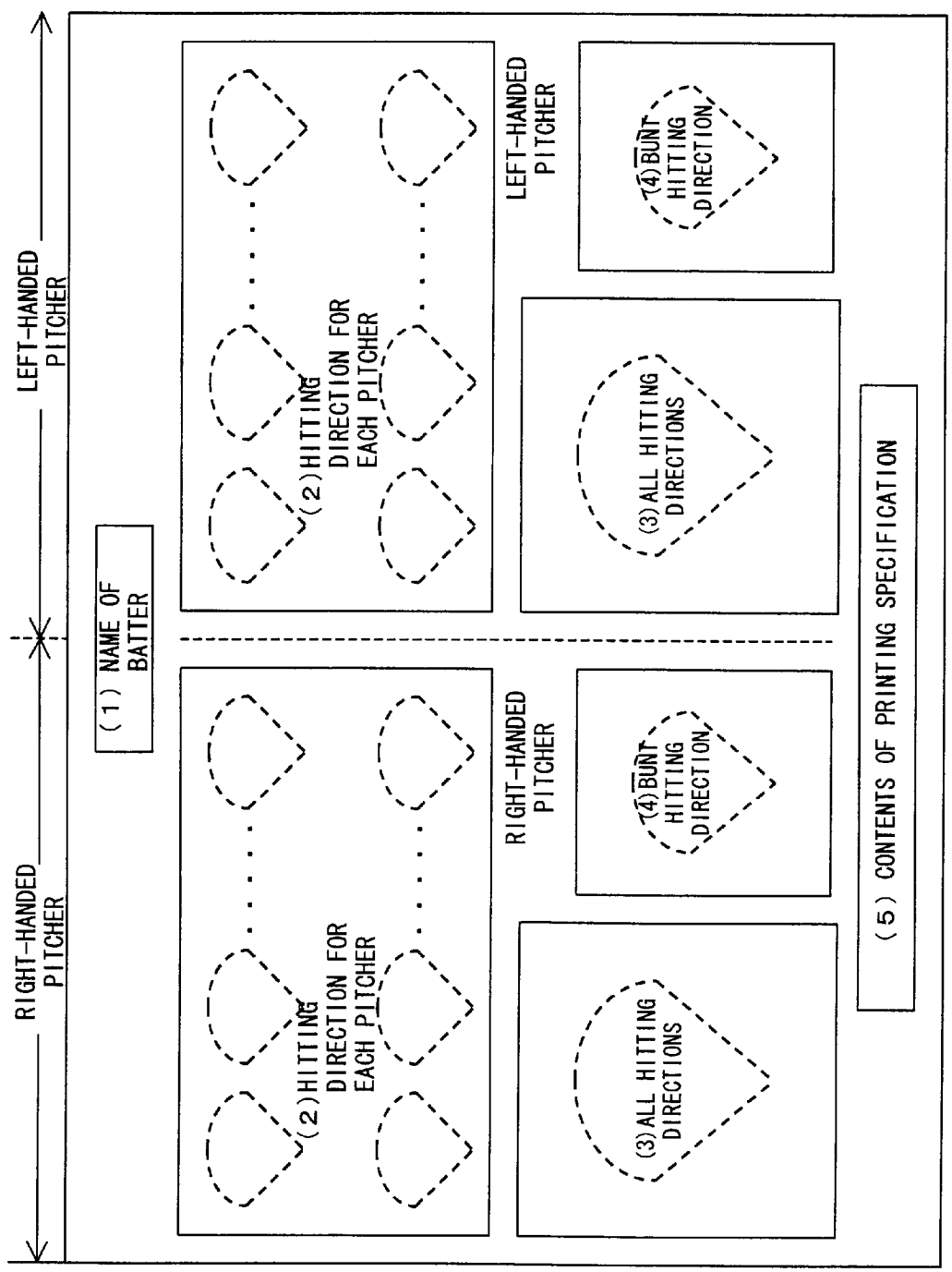
FIG. 46 shows an example of a hitting direction table for each batter which is one of the listings.

'Hitting chart' refers to a list of hitting directions for each batter. FIG. 46 shows an example. This listing shows ten pitchers who have played for a larger number of innings in the hitting direction table (hitting direction for each pitcher, all hitting directions, and bunt hitting directions) of 'specified pitcher' to 'specified batter'.

Figure 47:
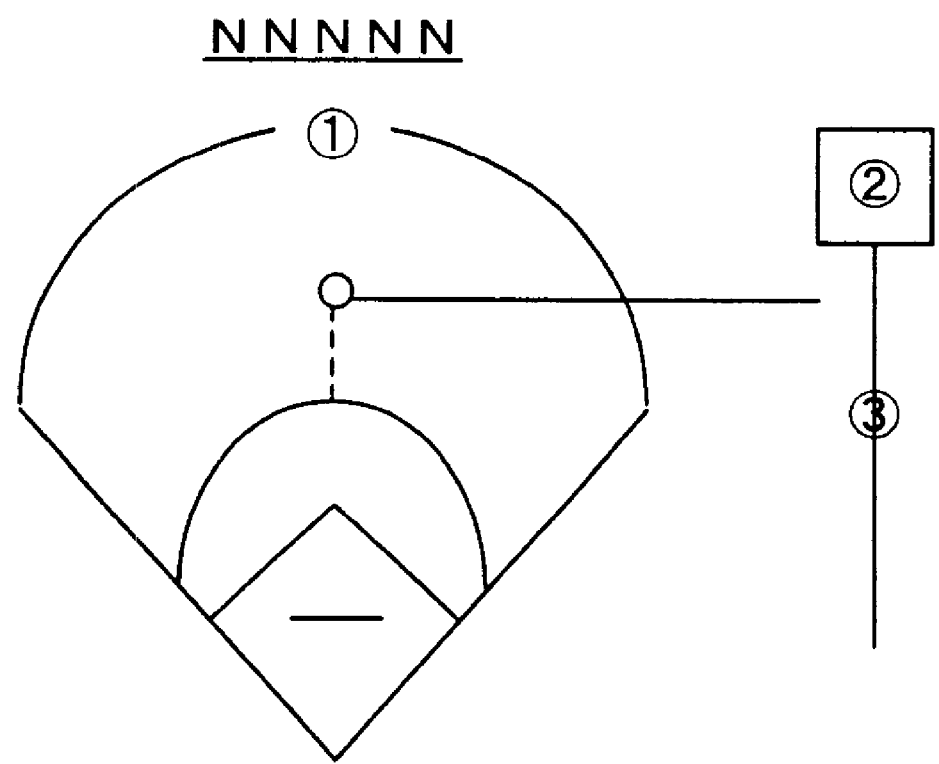
FIG. 47 shows an example of the format of a batting direction table for each pitcher.

The above mentioned table of hitting direction for each pitcher showing the hitting direction for each pitcher is output in the format shown in FIG. 47, for example. FIG. 47 shows 1. name of pitcher, 2. delivery symbol, and 3. hitting locus.

Figure 48:
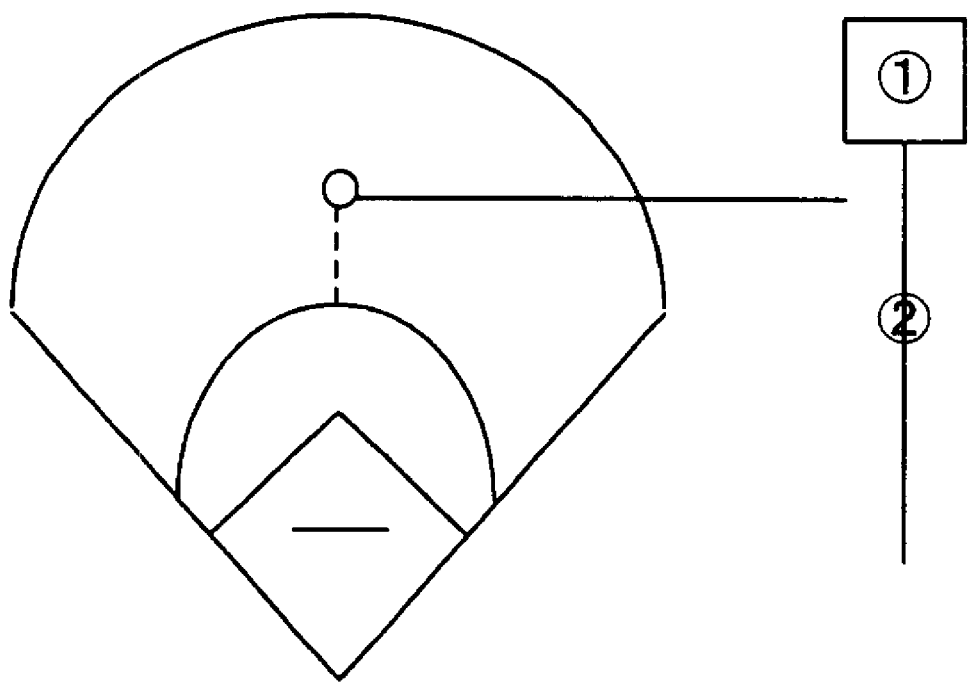
FIG. 48 shows an example of the format of an all batting direction table.
Figure 49:
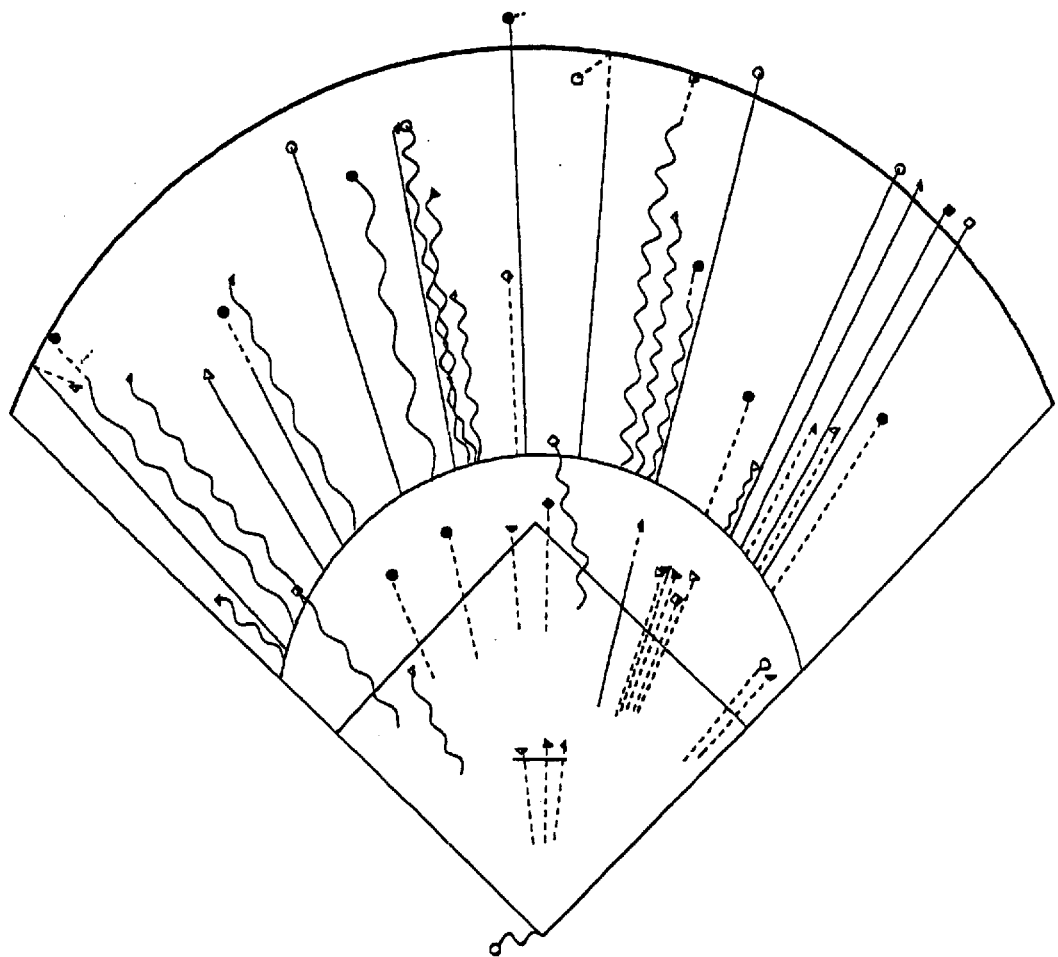
FIG. 49 shows a practical example of an all batting direction table.

The above mentioned all hitting direction table indicating the hitting directions except bunt hitting of all pitcher-to-batter results is output in the format shown in FIG. 48. FIG. 48 shows 1. delivery symbol, and 2. hitting locus. For information, FIG. 49 shows a practical example of the all hitting direction table. The delivery symbol and the hitting locus shown in FIG. 49 are shown in FIGS. 33 and 35.

As clearly shown in FIG. 49, the attribute information (course of a ball, delivery, result, etc.) is edited into graphics and displayed for each delivery. The attribute information in this case can especially refers to the course (hitting course), and also one or more of the delivery of a ball, the delivery result, and the state of play, for example.

The above mentioned bunt hitting direction table showing the bunt direction of all pitcher-to-batter results is output in the format shown in FIG. 50, for example. FIG. 50 shows 1. strategy, 2. delivery symbol, and 3. bunt locus. FIG. 51 shows an example of a symbol indicating a strategy.

(e3) Based on the selection in step S42, an SQL (structured query language) statement is issued to extract target information from a score table database (step S43).

(e4) According to the information extracted in step S43, the above mentioned listings (FIGS. 28, 30, 37, 39, 41, 43, and 46) are automatically generated and displayed. The attribute information (for example, date of game, ordinal number of game, total number of games, pitcher ID, batter ID, inning, number of pitches, etc.) is added to each delivery information, and linked with the corresponding picture data in the picture database (step S44).

Figure 52:
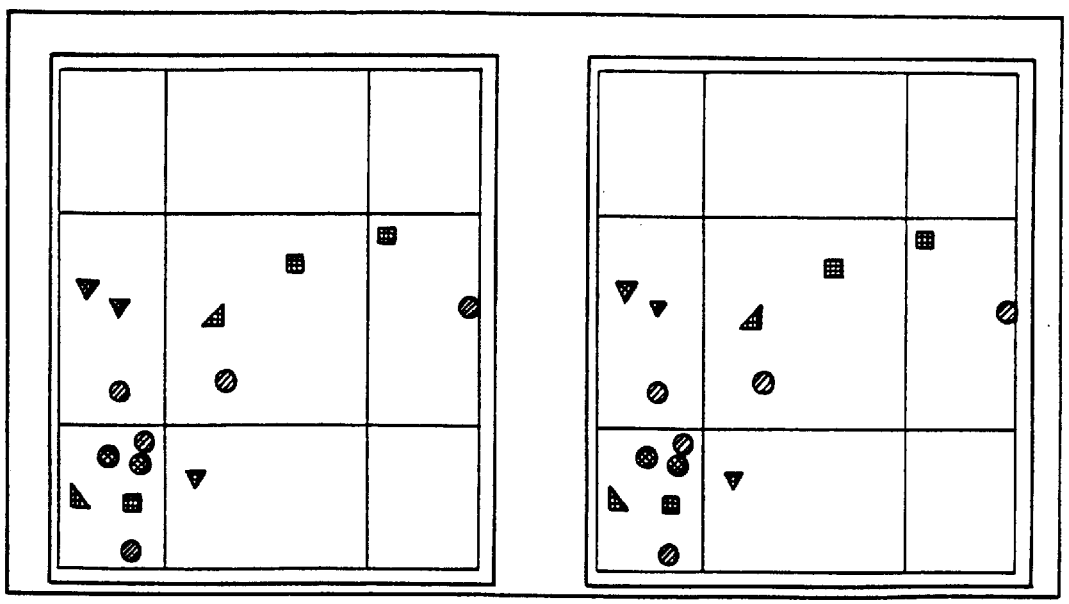
FIG. 52 shows an example of a listing display/delivery specification screen.

FIG. 52 shows an example of the listing display/delivery specification screen. In FIG. 52, an example of a delivery table is shown.

(e5) The attribute information is added to each delivery in the listing (listing display/delivery specification screen) shown on the Web terminal screen as described above. Therefore, the picture database is searched according to the attribute information added to each delivery by specifying one delivery from the listing (step S45).

(e6) By searching the picture database, the picture data for display of a stream linked according to the above mentioned attribute information, and the picture can be displayed as a stream on the Web screen (step S46).

Figure 53:
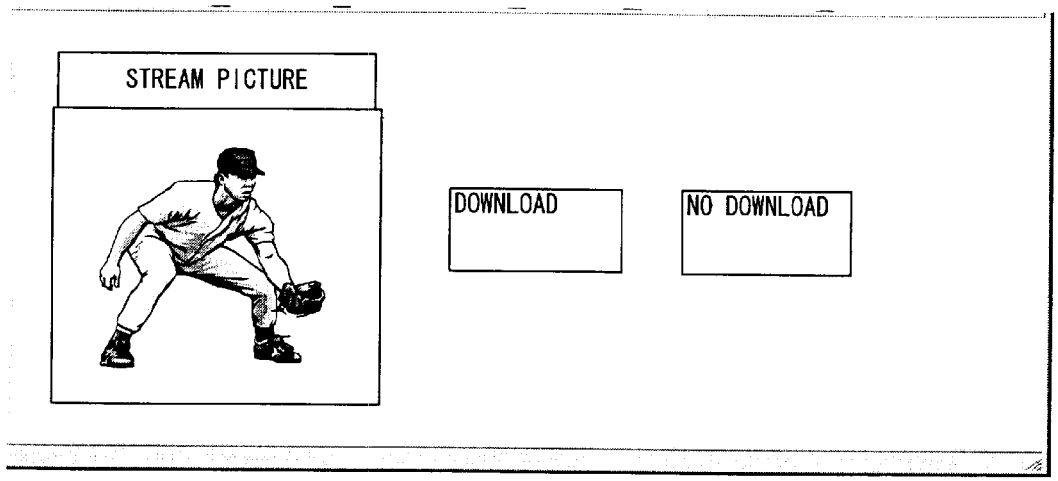
FIG. 53 shows an example of a steam display/download screen.

FIG. 53 shows an example of the stream display/download screen. On this screen, a button used in specifying whether or not a 'downloading' process is performed is provided.

(e7) By referring to the displayed stream, it is determined whether the picture is to be viewed furthermore in detail, or the next picture is to be viewed (step S47).

(e8) In step S47, if the next picture is to be viewed, then control is returned to step S45, the next delivery information is specified, and the picture of the next stream is viewed.

(e9) If the picture is viewed furthermore in detail in step S47, then the 'download' button is pressed on the stream display/download screen. Thus, the picture data in the MPEG 1 format or the MPEG 2 format is downloaded (step S47).

(e10) The downloaded MPEG data is viewed in detail through players (step S49).

Figure 54:
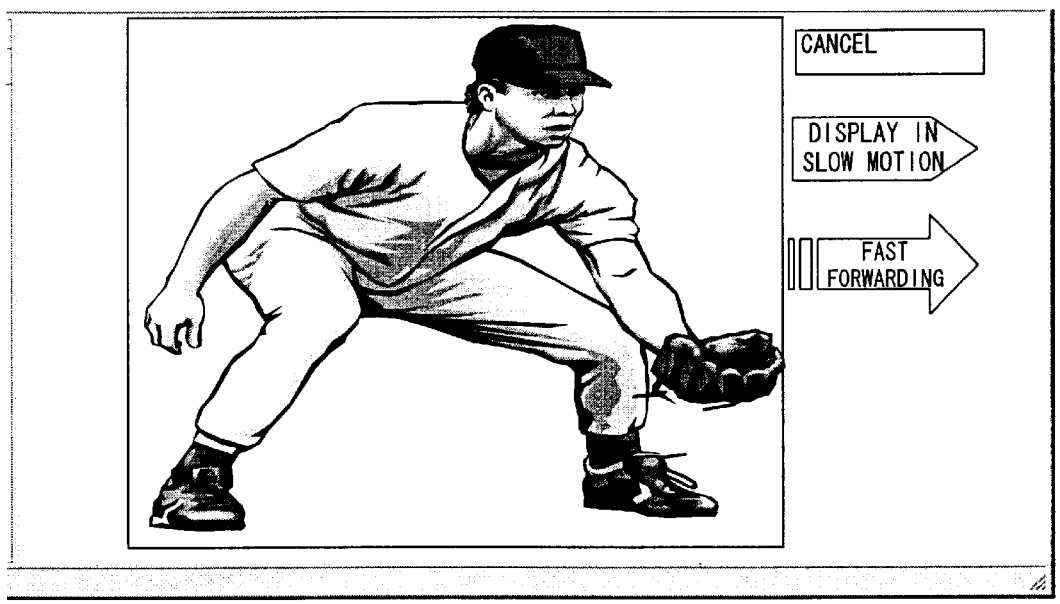
FIG. 54 shows an example of a picture display screen.

FIG. 54 shows an example of the picture display screen. On this screen, a picture can be slowly or fast forwarded.

Figure 55:
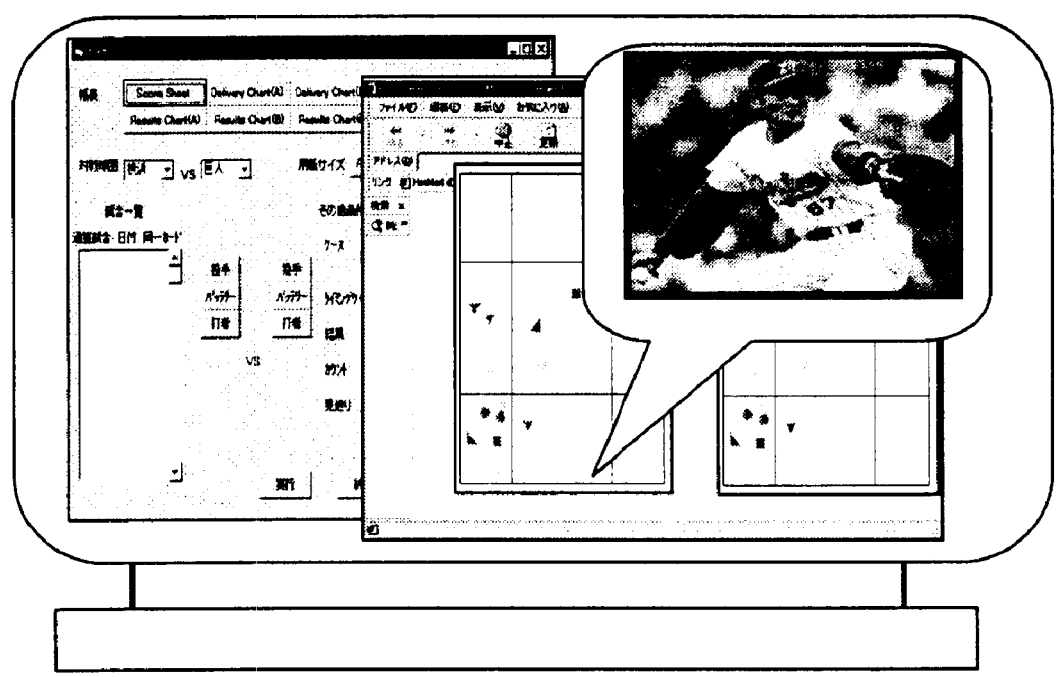
FIG. 55 shows an image of viewing a picture using a listing according to an embodiment of the present invention.

For information, the selection of the displayed screens in the above mentioned steps is described below again by referring to the screen image shown at the lower portion of FIG. 22. First, if a desired listing is selected on the listing selection specification screen (FIG. 27), the corresponding listing display/delivery specification screen (FIG. 52) is displayed. If a desired delivery (the attribute information, edited and displayed as graphics, is added to each delivery as described above) is specified from the listing, the picture data linked according to the attribute information added to the delivery is extracted, and displayed as a stream on the stream display/download screen (FIG. 53). If the downloading process is selected in this state, then a picture display screen (FIG. 54) is displayed, and a detailed picture can be viewed. That is, as shown in FIG. 55, a corresponding picture can be easily viewed only by specifying a desired delivery from a listing displayed on the screen.

Thus, according to the present embodiment, using a picture database and a score table database generated in advance, a listing to be viewed is selected and displayed on a personal computer (Web terminal), a delivery to be viewed and confirmed is specified by referring to the attribute information added thereto, and the picture data corresponding to the specified delivery can be displayed and viewed. That is, desired picture data can be easily retrieved from a visual listing automatically generated based on the store table database.

With the configuration shown in FIG. 22, the picture data and the store table are generated by separate input devices as separate databases, but these systems can be joined into one system.

Figure 56:
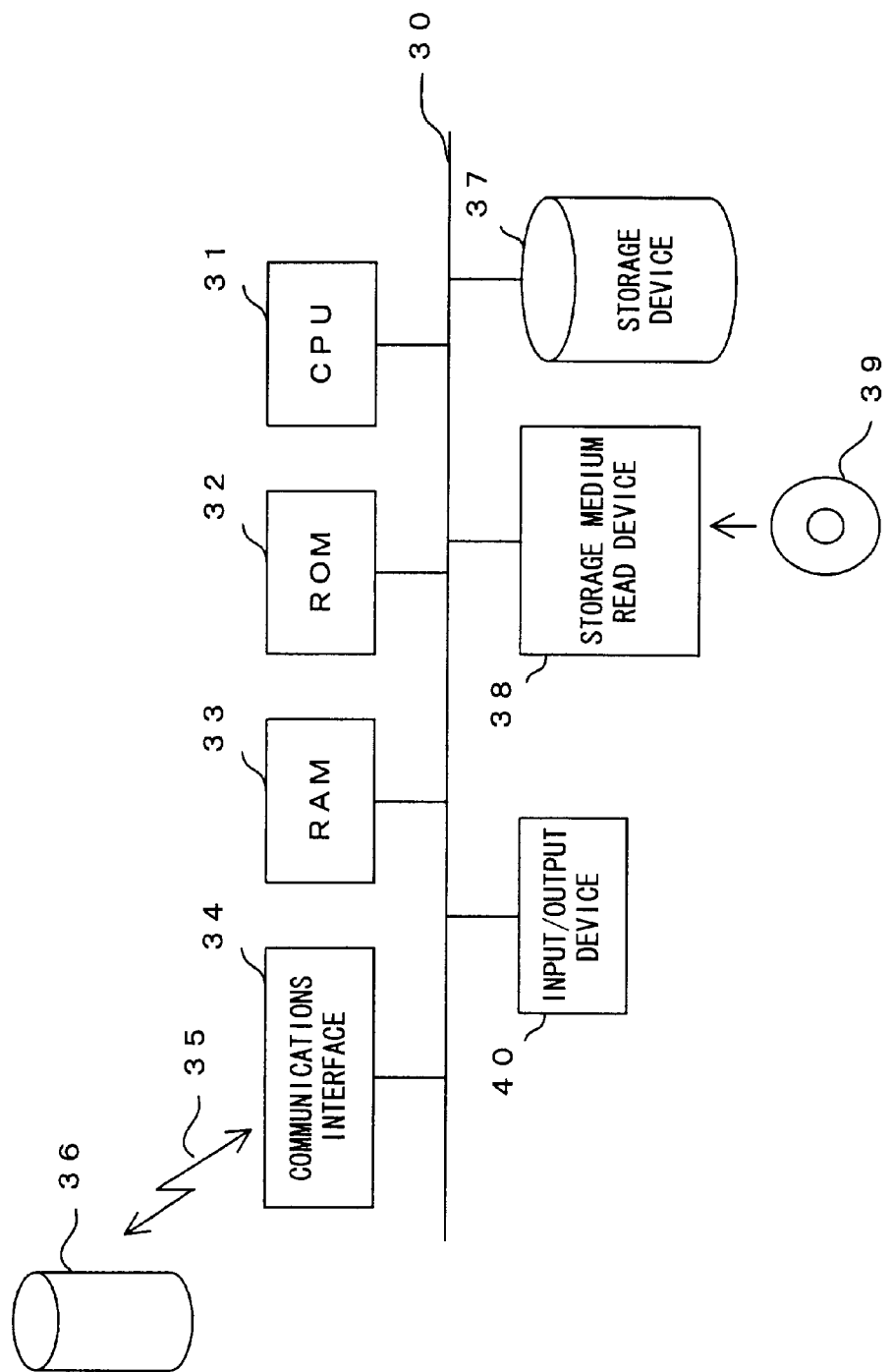
FIG. 56 shows an example of a hardware configuration required when the present invention is realized by a program.

FIG. 56 shows an example of the hardware configuration required when the present invention is realized by a program (software).

When the present invention is realized by a program, a typical device for executing the program can be configured by each device (ROM 32, RAM 33, a communications interface 34, a storage device 37, a storage medium read device 38, and an input/output device 40) connected to a CPU 31 through a bus 30. The ROM 32 stores a BIOS (basic input/output system), etc. When the power is applied to the device, the CPU 31 gains access to the ROM 32, the CPU 31 reads the BIOS, and each device can be controlled.

It is possible for the ROM 32 to store a program for realizing the present invention. Otherwise, the program is stored in the storage device 37, and is developed in the RAM 33 so that the CPU 31 can execute the program. In addition, the program can be stored in a portable storage medium 39, the storage medium read device 38 reads the program stored in the portable storage medium 39 to the RAM 33, and the CPU 31 can execute the program. Furthermore, the program stored in the portable storage medium 39 can be temporarily stored in the storage device 37, and then the CPU 31 executes the program.

Otherwise, the system can be connected to a network such as Internet, etc. using the communications interface 34 so that the program can be downloaded from an information provider 36. Furthermore, the program can also be executed without download through the network 35, or without download under the network environment.

As described above, the present invention is applicable to various picture data. For example, when the present invention is applied to soccer games, a 'subject' is a player before or after scoring a goal (including a set play such as a PK, etc.), and a 'play state' includes a player relating to a score, an assistant, a goalkeeper, a goal time (first half or second half), a position at which a ball is shot, and a scoring state. The type of shot can include a straight, right curve, and left curve. The 'course of shot' includes the course of a successful shot (left/center/right information and high/center/low information). In other ball games and sports, the rules and the features of ball games and sports can be similarly changed.

When the present invention is applied to a fashion show, the 'attribute' can contain any of, a combination of, or all of a brand name, a designer name, a place of a show (for example, Paris, Milan, or New York), a place of a show (for example, an ABC building), the date of a show (date of Anno Domini and the seasons of spring, summer, autumn, and winter), the order of appearance, the name of music in the background.

An embodiment of the present invention has been described above, but it is obvious that the present invention is not limited to this embodiment. Various configurations can be applied within a range of the gist of the present invention.

According to the present invention, desired picture data associated with the attribute information can be easily viewed only by selecting the attribute information displayed by graphics on the display screen.

Especially, in a ball game, an analysis listing is automatically generated according to score information, and is linked with the picture data for each play so that desired picture data can be easily viewed only by specifying a play by referring to the attribute information edited and displayed in graphics from the displayed analysis listing.

If the above mentioned system according to the present invention is used for support of a baseball team, etc., any player of the team can positively and actively use the system with the greatest contribution to the team.

What is claimed is:

1. A picture data process system which controls a display of picture data, comprising:
    a storage unit storing the picture data associated with attribute information about the data;
    an edition display unit editing the attribute information and displaying the information as graphics; and
    a display control unit displaying picture data associated with attribute information selected from a graphical display by said edition display unit.

2. A picture data process system which controls a display of picture data representing a record of a ball game, comprising:
    a storage unit storing the picture data and attribute information including data at least about courses of each ball moving in the ball game, the attribute information being associated with the picture data;
    an edition display unit displaying an analysis listing which indicates analysis data of each ball moving in the ball game, editing the attribute information graphically and assigning the graphically edited attribute information to each ball in the displayed analysis listing: and
    a display control unit displaying picture data associated with the attribute information assigned to a ball selected by a user from the displayed analysis listing.

3. The system according to claim 2, wherein said attribute information further contains a type of ball.

4. The system according to claim 2, wherein said attribute information further contains result information about a ball.

5. The system according to claim 2, wherein said attribute information further contains a play state using a ball.

6. The system according to claim 2, wherein said display control unit displays the picture data in a simple format, and enables the picture data to be viewed in detail corresponding to the simple format.

7. The system according to claim 2, wherein said storage unit is a portable storage medium.

8. The system according to claim 2, wherein said display control unit displays picture data by transmitting the picture data through a network.

9. A computer-readable storage medium storing a program for displaying picture data representing a record of a ball game, the picture data being associated with attribute information generated by a computer system, the attribute information including data at least about courses of each ball moving in the ball game, wherein said program controls a computer according to a process comprising:
    displaying an analysis listing which indicates analysis data of each ball moving in the ball game;
    editing the attribute information graphically and assigning the graphically edited attribute information to each ball in the displayed analysis listing;
    selecting a ball from the displayed analysis listing, according to a user input; and
    displaying picture data associated with the attribute information assigned to the user selected ball.

* * * * *

UNITED STATES PATENT AND TRADEMARK OFFICE
CERTIFICATE OF CORRECTION

PATENT NO. : 6,725,236 B2
DATED : April 20, 2004
INVENTOR(S) : Motoyoshi Suzuki

It is certified that error appears in the above-identified patent and that said Letters Patent is hereby corrected as shown below:

Column 22,
Line 6, delete "Claim 1" in its entirety.

Signed and Sealed this

Fourteenth Day of September, 2004

JON W. DUDAS
*Director of the United States Patent and Trademark Office*